United States Patent
Hamilton et al.

(10) Patent No.: US 10,700,942 B2
(45) Date of Patent: Jun. 30, 2020

(54) BUILDING MANAGEMENT SYSTEM WITH PREDICTIVE DIAGNOSTICS

(71) Applicant: Johnson Controls Technology Company, Plymouth, MI (US)

(72) Inventors: Samuel F. Hamilton, Fox Point, WI (US); Carlos Felipe Alcala Perez, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 583 days.

(21) Appl. No.: 15/188,824

(22) Filed: Jun. 21, 2016

(65) Prior Publication Data

US 2017/0366414 A1    Dec. 21, 2017

(51) Int. Cl.
| | |
|---|---|
| *H04L 12/24* | (2006.01) |
| *H04L 29/08* | (2006.01) |
| *G05B 15/02* | (2006.01) |
| *H04L 12/28* | (2006.01) |

(52) U.S. Cl.
CPC ............ *H04L 41/147* (2013.01); *G05B 15/02* (2013.01); *H04L 12/2823* (2013.01); *H04L 41/0618* (2013.01); *H04L 41/145* (2013.01); *H04L 67/12* (2013.01); *H04L 67/125* (2013.01); *G05B 2219/2642* (2013.01)

(58) Field of Classification Search
CPC . H04L 41/147; H04L 41/0618; H04L 41/145; H04L 12/28; H04L 67/12; H04L 67/125; G05B 15/02
See application file for complete search history.

(56) References Cited

U.S. PATENT DOCUMENTS

| | | | | |
|---|---|---|---|---|
| 2003/0109951 A1* | 6/2003 | Hsiung | ........... | G05B 15/02 700/108 |
| 2011/0047418 A1* | 2/2011 | Drees | ........... | G05B 15/02 714/57 |
| 2017/0091870 A1* | 3/2017 | Trainor | ........... | G08B 13/08 |

OTHER PUBLICATIONS

Raich, Anne, and Ali Çinar. "Diagnosis of process disturbances by statistical distance and angle measures." Computers & chemical engineering 21.6 (1997): 661-673. (Year: 1997).*
Lewin, D. R. "Predictive maintenance using PCA." Control Engineering Practice 3.3 (1995): 415-421. (Year: 1995).*

(Continued)

*Primary Examiner* — Omar F Fernandez Rivas
*Assistant Examiner* — Joshua E. Jensen
(74) *Attorney, Agent, or Firm* — Foley & Lardner LLP

(57) ABSTRACT

A building management system includes connected equipment and a predictive diagnostics system. The connected equipment is configured to measure a plurality of monitored variables. The predictive diagnostics system includes a communications interface, a principal component analysis (PCA) modeler, and a fault predictor. The communications interface is configured to receive samples of the monitored variables from the connected equipment. The PCA modeler is configured to construct PCA models for a plurality of operating states of the connected equipment using the samples of the monitored variables. Each PCA model defines a location of one of the operating states in a multidimensional modeling space. The fault predictor is configured to determine a proximity of a new sample of the monitored variables to one or more of the operating states using the PCA models and to predict a fault occurrence based on the proximity.

17 Claims, 17 Drawing Sheets

(56) References Cited

OTHER PUBLICATIONS

Alcala, Carlos F., and S. Joe Qin. "Reconstruction-based contribution for process monitoring." Automatica 45.7 (2009): 1593-1600. (Year: 2009).*

Ng, Yew Seng, and Rajagopalan Srinivasan. "Multi-agent based collaborative fault detection and identification in chemical processes." Engineering Applications of Artificial Intelligence 23.6 (2010): 934-949. (Year: 2010).*

Mnassri, Baligh, and Mustapha Ouladsine. "Reconstruction-based contribution approaches for improved fault diagnosis using principal component analysis." Journal of Process Control 33 (2015): 60-76. (Year: 2015).*

U.S. Appl. No. 14/744,761, filed Jun. 19, 2015, Johnson Controls Technology Company.

Alcala et al., Reconstruction-based Contribution for Process Monitoring, Proceedings of the 17th International Federation of Automatic Control World Congress, vol. 41, No. 2, Jul. 6-11, 2008, 6 pages.

Li et al., Generalized reconstruction-based contributions for output-relevant fault diagnosis with application to the Tennessee Eastman process, IEEE Transactions on Control Systems Technology, vol. 19, No. 5, Sep. 2011, 14 pages.

Mobley, K., Chapter 13: Operating Dynamics Analysis & Chapter 14: Failure-Mode Analysis in an Introduction to Predictive Maintenance, 2002, Butterworth-Heinemann, 60 pages.

Ng, et al., Multi-agent based collaborative fault detection and identification in chemical processes, Engineering Applications of Artificial Intelligence, vol. 23, No. 6, Sep. 2010, 16 pages.

Qin, S.J., Statistical process monitoring: basics and beyond, Journal of Chemometrics, vol. 17, Issue 8-9, Aug.-Sep. 2003, 23 pages.

Yue et al., Reconstruction based fault identification using a combined index, Industrial & Engineering Chemistry Research, vol. 40, No. 20, Oct. 2001, 12 pages.

* cited by examiner

BUILDING MANAGEMENT SYSTEM WITH PREDICTIVE DIAGNOSTICS

BACKGROUND

The present invention relates generally to building management systems. The present invention relates more particularly to fault detection and diagnostics in a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Systems and devices in a BMS often generate temporal (i.e., time-series) data that can be analyzed to determine the performance of the BMS and the various components thereof. The data generated by the BMS can include measured or calculated values that exhibit statistical characteristics and provide information about how the corresponding system or process (e.g., a temperature control process, a flow control process, etc.) is performing in terms of error from its setpoint. These data can be examined by a predictive diagnostics system to expose when the monitored system or process begins to degrade in performance and alert a user to repair the fault before it becomes more severe.

SUMMARY

One implementation of the present disclosure is a building management system including connected equipment and a predictive diagnostics system. The connected equipment is configured to measure a plurality of monitored variables. The predictive diagnostics system includes a communications interface, a principal component analysis (PCA) modeler, and a fault predictor. The communications interface is configured to receive samples of the monitored variables from the connected equipment. The PCA modeler is configured to construct PCA models for a plurality of operating states of the connected equipment using the samples of the monitored variables. Each PCA model defines a location of one of the operating states in a multidimensional modeling space. The fault predictor is configured to determine a proximity of a new sample of the monitored variables to one or more of the operating states using the PCA models and to predict a fault occurrence based on the proximity.

In some embodiments, the system includes a controller configured to receive the predicted fault occurrence from the fault predictor and automatically adjust an operation of the connected equipment in response to receiving the predicted fault occurrence.

In some embodiments, the fault predictor is configured to identify at least one of the operating states as a faulty operating state, generate a proximity metric indicating the proximity of the new sample to the faulty operating state, and predict the fault occurrence using a value of the proximity metric. In some embodiments, the fault predictor is configured to identify a fault associated with the faulty operating state and report the identified fault along with the predicted fault occurrence. In some embodiments, the fault predictor is configured to estimate a time of the predicted fault occurrence and report the estimated time along with the predicted fault occurrence.

In some embodiments, the operating states include a current monitoring state and a plurality of other operating states. The system may further include a direction extractor and a sample reconstructor. The direction extractor can be configured to use the locations of the operating states in the multidimensional modeling space to extract directions from the current monitoring state to each of the other operating states. The sample reconstructor can be configured to determine a reconstructed contribution of the new sample along each of the extracted directions.

In some embodiments, the fault predictor is configured to compare the reconstructed contributions of the new sample along each of the extracted directions, identify which of the reconstructed contributions has a largest value, and determine that the new sample is moving in the extracted direction along which the reconstructed contribution of the new sample has the largest value. In some embodiments, the fault predictor is configured to identify an operating state toward which the new sample is moving by comparing the reconstructed contributions of the new sample along each of the extracted directions.

In some embodiments, each of the PCA models describes a corresponding operating state using a plurality of model parameters. The model parameters can include a mean and standard deviation of a set of training samples associated with the corresponding operating state. The model parameters may further include a control limit for the corresponding operating state.

In some embodiments, the PCA modeler is configured to automatically identify an operating state associated with each of the samples of the monitored variables and organize the samples into separate sets. Each set may correspond to a different operating state and may contain only the samples associated with the corresponding operating state. The PCA modeler can be configured to construct each PCA model using one of the sets of samples such that each PCA model is uniquely associated with a single operating state.

Another implementation of the present disclosure is a method for predicting fault occurrences in a building management system. The method includes obtaining samples of a plurality of monitored variables from connected equipment of the building management system and constructing principal component analysis (PCA) models for a plurality of operating states of the connected equipment using the samples of the monitored variables. Each PCA model may define a location of one of the operating states in a multidimensional modeling space. The method includes obtaining a new sample of the monitored variables from the connected equipment, determining a proximity of the new sample to one or more of the operating states using the PCA models, and predicting a fault occurrence based on the proximity. In some embodiments, the method includes automatically adjusting an operation of the connected equipment in response to the predicted fault occurrence.

In some embodiments, the method includes identifying at least one of the operating states as a faulty operating state, generating a proximity metric indicating the proximity of the new sample to the faulty operating state, and predicting the fault occurrence using a value of the proximity metric. In some embodiments, the method includes identifying a fault associated with the faulty operating state and reporting the identified fault along with the predicted fault occurrence. In some embodiments, the method includes estimating a time of the predicted fault occurrence and reporting the estimated time along with the predicted fault occurrence.

In some embodiments, the operating states include a current monitoring state and a plurality of other operating states. The method can include using the locations of the operating states in the multidimensional modeling space to extract directions from the current monitoring state to each of the other operating states. The method can include determining a reconstructed contribution of the new sample along each of the extracted directions.

In some embodiments, the method includes comparing the reconstructed contributions of the new sample along each of the extracted directions, identifying which of the reconstructed contributions has a largest value, and determining that the new sample is moving in the extracted direction along which the reconstructed contribution of the new sample has the largest value. In some embodiments, the method includes identifying an operating state toward which the new sample is moving by comparing the reconstructed contributions of the new sample along each of the extracted directions.

In some embodiments, each of the PCA models describes a corresponding operating state using a plurality of model parameters. The model parameters can include a mean and standard deviation of a set of training samples associated with the corresponding operating state. The model parameters may further include a control limit for the corresponding operating state.

In some embodiments, the method includes automatically identifying an operating state associated with each of the samples of the monitored variables and organizing the samples into separate sets. Each set may correspond to a different operating state and may contain only the samples associated with the corresponding operating state. The method can include constructing each PCA model using one of the sets of samples such that each PCA model is uniquely associated with a single operating state Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
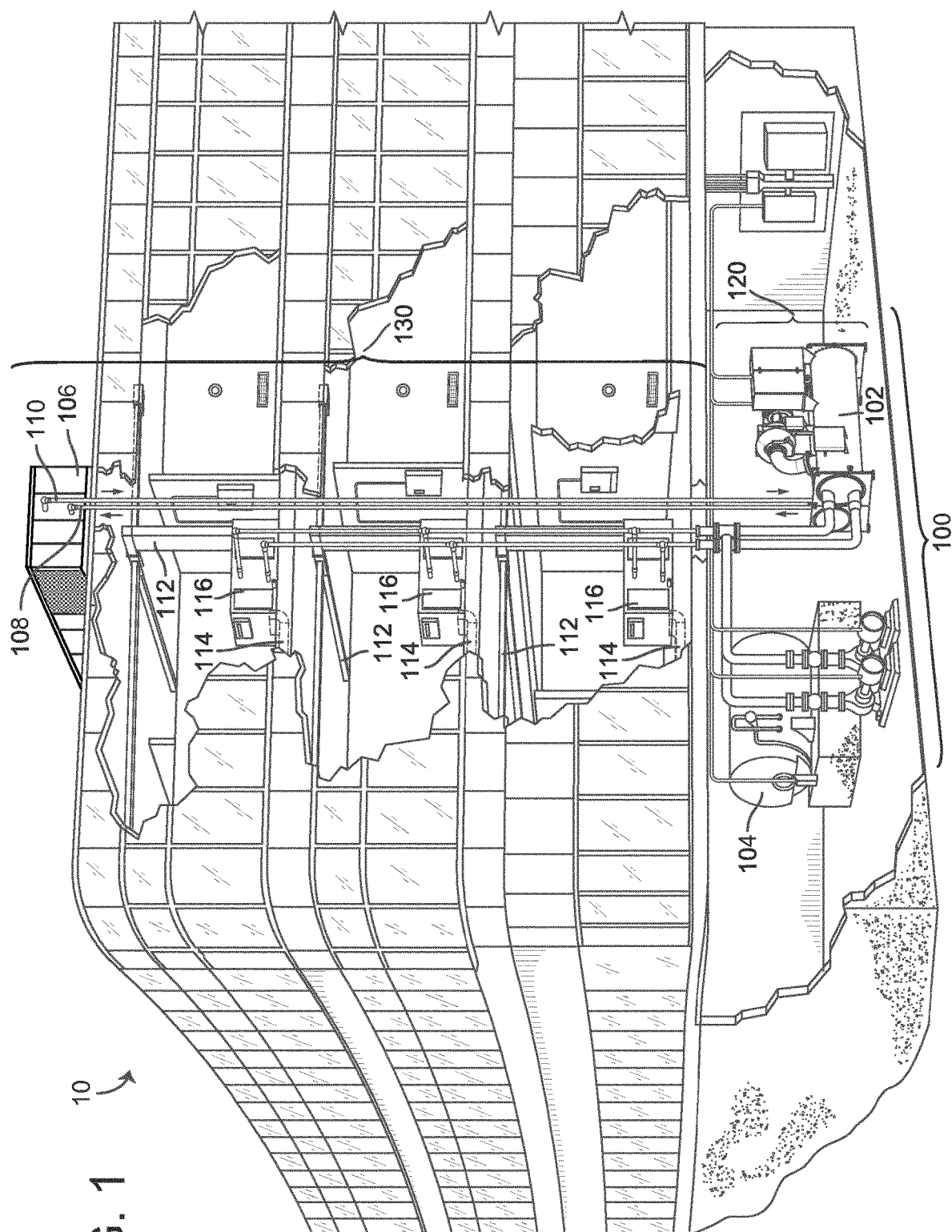
FIG. 1 is a drawing of a building equipped with a HVAC system, according to some embodiments.

Referring generally to the FIGURES, a building management system (BMS) and various components thereof are shown, according to some embodiments. The BMS includes sensors, building equipment, a building controller, and a predictive diagnostics system. The sensors monitor variables in or around a building and the building equipment operate to affect one or more of the monitored variables. The building controller generates control signals for the building equipment based on the monitored variables. The predictive diagnostics system uses principal component analysis (PCA) models to represent a plurality of distinct operating states for connected equipment controlled by the building controller. The predictive diagnostics system may use the PCA models to determine a current operating state for the connected equipment. The current operating state can be used by the building controller to generate the control signals.

In some embodiments, the predictive diagnostics system uses monitored variables to create a plurality of PCA models. PCA is a multivariate statistical technique that takes into account correlations between two or more monitored variables. In some embodiments, the PCA models define the locations of the operating states within a multidimensional modeling space. Each of the PCA models may characterize the behavior of the connected equipment in a particular operating state. The predictive diagnostics system may store the PCA models in a library of operating states (e.g., in memory or a database). In some embodiments, the PCA models do not distinguish between normal states and faulty states, but rather treat each state equally for purposes of fault detection and diagnostics. For example, the predictive diagnostics system may use the PCA models to determine which of a plurality of operating states is the current operating state. After the current operating state is identified, the predictive diagnostics system may determine whether the identified operating state is normal or faulty (e.g., based on a description of the state).

The predictive diagnostics system may use the library of operating states to determine whether new samples of the monitored variables correspond to any of the previously-stored operating states. For example, the predictive diagnostics system may calculate a fault detection index $I(x)$ for a new sample of the monitored variables. The fault detection index $I(x)$ can be a function of both the current values of the monitored variables and one or more parameters of the PCA model for a given operating state (i.e., state k).

The predictive diagnostics system may compare the fault detection index $I(x)$ to a control limit $\zeta^2$ for state k. If the fault detection index is within the control limit (e.g., $I(x) \leq \zeta^2$), the predictive diagnostics system may identify state k as the current operating state. If the fault detection index is not within the control limit (e.g., $I(x) > \zeta^2$), the predictive diagnostics system may recalculate the fault detection index $I(x)$ with respect to another of the stored operating states (i.e., state j) and compare the recalculated fault detection index to a control limit $\zeta^2$ for state j. The predictive diagnostics system may repeat this process (e.g., iterating through each of the stored operating states j=1 . . . m) until the current operating state is identified.

In some embodiments, the predictive diagnostics system uses a voting-based identification process to identify the current operating state. The predictive diagnostics system may perform the voting-based identification process if the iterative process described above fails to identify any of the stored operating states as the current operating state. In some embodiments, the voting-based identification process includes calculating a direction from a given operating state (i.e., state k) to each of the other operating states (i.e., state j). The direction can be the orientation of a vector pointing from state k toward state j.

The predictive diagnostics system may reconstruct the current sample of the monitored variables along each of the calculated directions (e.g., by subtracting a multiple of the vector from the current sample). If the reconstructed sample is within state k, the predictive diagnostics system may record a vote for state j as the current operating state. A vote for state j as the current operating state indicates that the vector pointing from state k toward state j is generally in the same direction as a vector pointing from state k toward the current sample of the monitored variables. In other words, from the perspective of state k, both state j and the current sample of the monitored variables have the same general direction. The predictive diagnostics system may repeat this process (e.g., iterating through each of the stored operating states k), recording a vote with each iteration. Once a vote has been recorded from the perspective of each operating state, the predictive diagnostics system may select the operating state with the most votes as the current operating state.

In some embodiments, the predictive diagnostics system generates reconstruction-based contributions (RBCs) of the samples of the monitored variables. Each reconstruction-based contribution $RBC_{jk}$ is the reconstructed contribution of a sample along the direction from the current monitoring state k to another state j for which a PCA model has been constructed. The direction with the largest RBC value indicates that the samples are moving in that direction. In some embodiments, the predictive diagnostics system compares the RBC values $RBC_{jk}$ calculated for each direction. The predictive diagnostics system may identify the direction with the largest RBC value $RBC_{jk}$ and select the operating state j corresponding to the identified direction as the operating state toward which the sample is moving.

The predictive diagnostics system can determine a proximity of the sample to one or more of the operating states j. In some embodiments, the predictive diagnostics system calculates the proximity (i.e., a proximity metric $p_j(x)$) of the sample to a particular operating state j in response to a determination that the sample is moving toward that operating state. The proximity metric $p_j(x)$ for a given operating state j indicates how close the sample is to that operating state j.

In some embodiments, the predictive diagnostics system uses the proximity metric $p_j(x)$ to predict the occurrence of a fault. For example, the predictive diagnostics system can predict a fault occurrence in response to the proximity metric $p_j(x)$ crossing a proximity threshold. If the operating state j toward which the samples are moving is a faulty state, the predictive diagnostics system can identify a particular fault associated with the faulty state j and can predict an occurrence of the identified fault.

In some embodiments, the predictive diagnostics system predicts the occurrence of a fault using the fault detection index $I(x)_j$ of a sample for the faulty state j. For example, the predictive diagnostics system can compare the fault detection index $I(x)_j$ to a threshold value. In some embodiments, the threshold value is the control limit $\zeta_j^2$ for faulty state j. If the fault detection index $I(x)_j$ is within the control limit $\zeta_j^2$ (i.e., $I(x) \leq \zeta_j^2$), the predictive diagnostics system can determine that faulty state j is the current operating state and can predict the occurrence of a fault associated with faulty state j.

In some embodiments, the predictive diagnostics system predicts when a particular fault will occur. For example, the predictive diagnostics system can extrapolate a series of values of the proximity metric $p_j(x)$ to determine when the proximity metric $p_j(x)$ will cross a threshold value. In some embodiments, the threshold value is the value of the proximity metric $p_j(x)$ at which the fault previously occurred in the training data used to construct the PCA model for the faulty state j. The predictive diagnostics system can predict that the fault will occur at a time when the proximity metric $p_j(x)$ is estimated to reach the threshold value based on the extrapolation.

In some embodiments, the threshold value is a value of the proximity metric $p_j(x)$ that occurs in the training data before the connected equipment reports the fault. The predictive diagnostics system can use the training data to determine a time interval $\Delta T$ between a time $t_1$ at which the proximity metric $p_j(x)$ crosses the threshold value and a time $t_2$ at which the fault occurs (i.e., $\Delta T = t_2 - t_1$). When the predictive diagnostics system determines that the proximity metric $p_j(x)$ crosses the threshold value at a new time $t_3$, the predictive diagnostics system can estimate the time $t_4$ at which the fault will occur as the time $t_3$ plus the time interval $\Delta T$ (i.e., fault time $t_4 = t_3 + \Delta T$).

In some embodiments, the predictive diagnostics system generates fault predictions. Fault predictions may identify a particular fault, a particular device of the connected equipment in which the fault is predicted to occur, and/or an estimated time at which the fault is estimated to occur. Fault predictions can include fault indications as well as recommended actions to repair the connected equipment to prevent the fault from occurring. In some embodiments, the predictive diagnostics system provides the fault predictions to a building controller. The building controller can use the fault predictions to perform an automated control action. For example, the building controller can perform automated preventative actions to prevent the identified faults from occurring. These and other features of the predictive diagnostics system are described in greater detail below.

Building HVAC Systems and Building Management Systems

Figure 2:
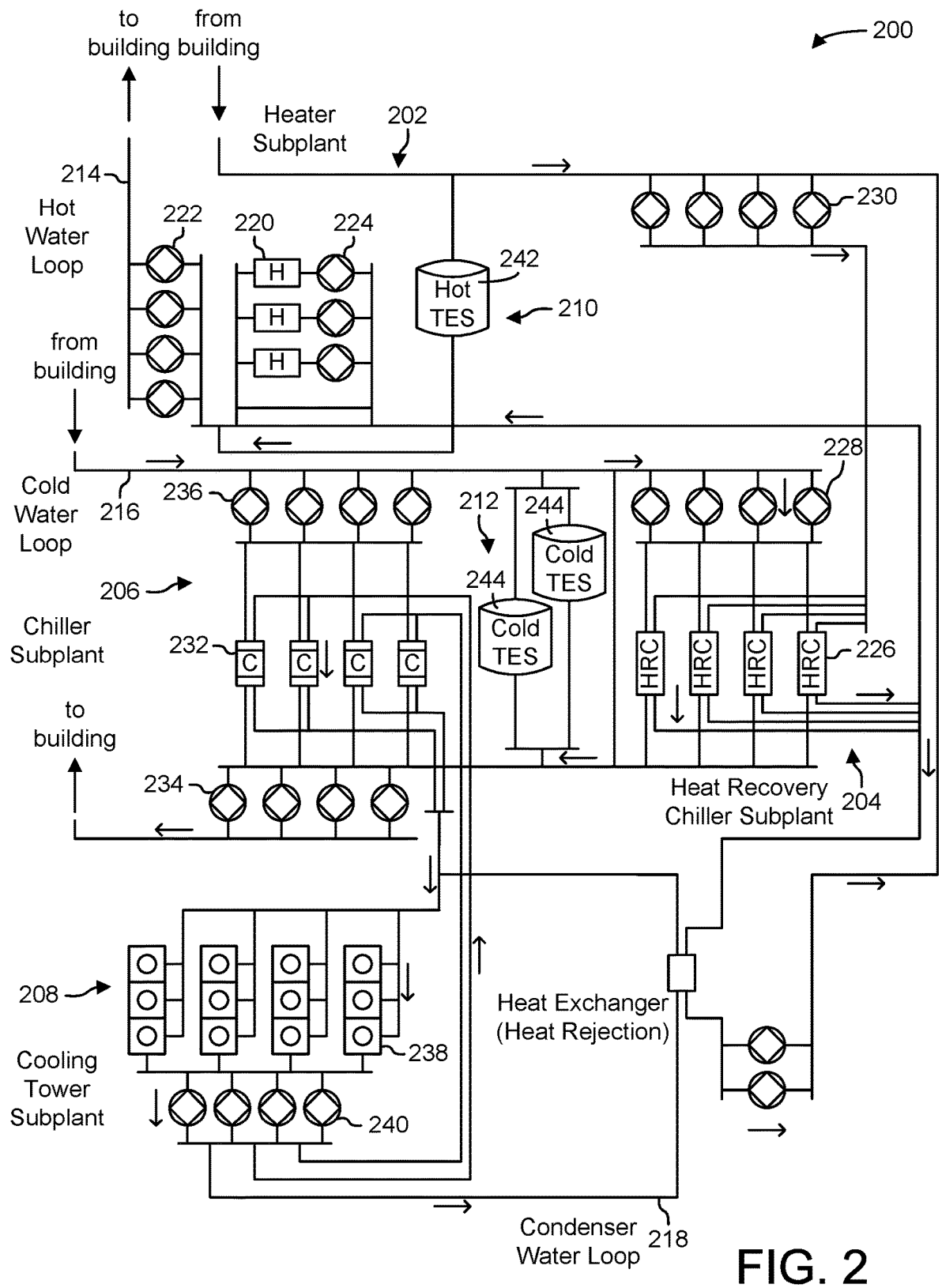
FIG. 2 is a schematic diagram of a waterside system which can be used in conjunction with the building of FIG. 1, according to some embodiments.
Figure 3:
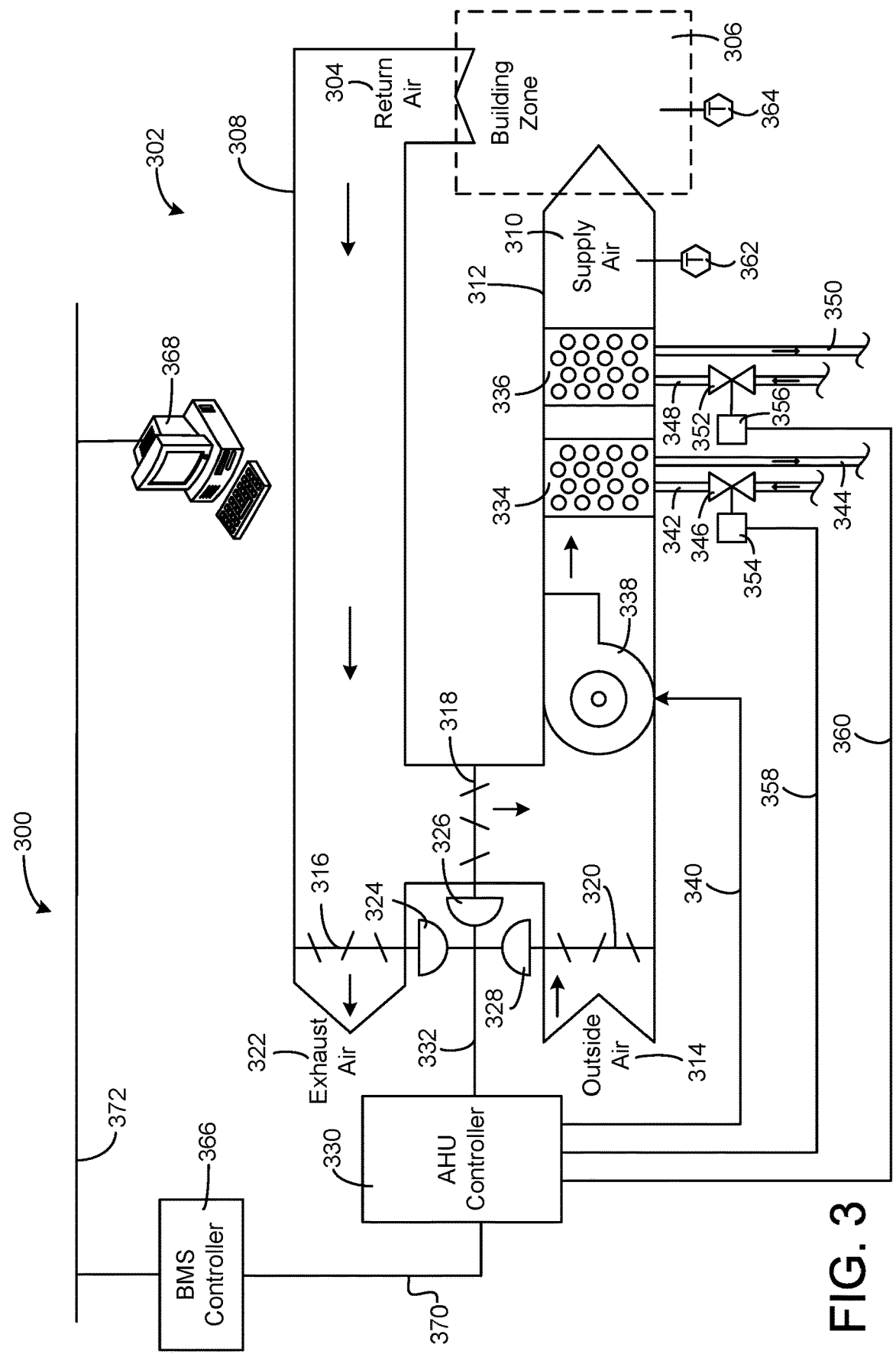
FIG. 3 is a schematic diagram of an airside system which can be used in conjunction with the building of FIG. 1, according to some embodiments.
Figure 4:
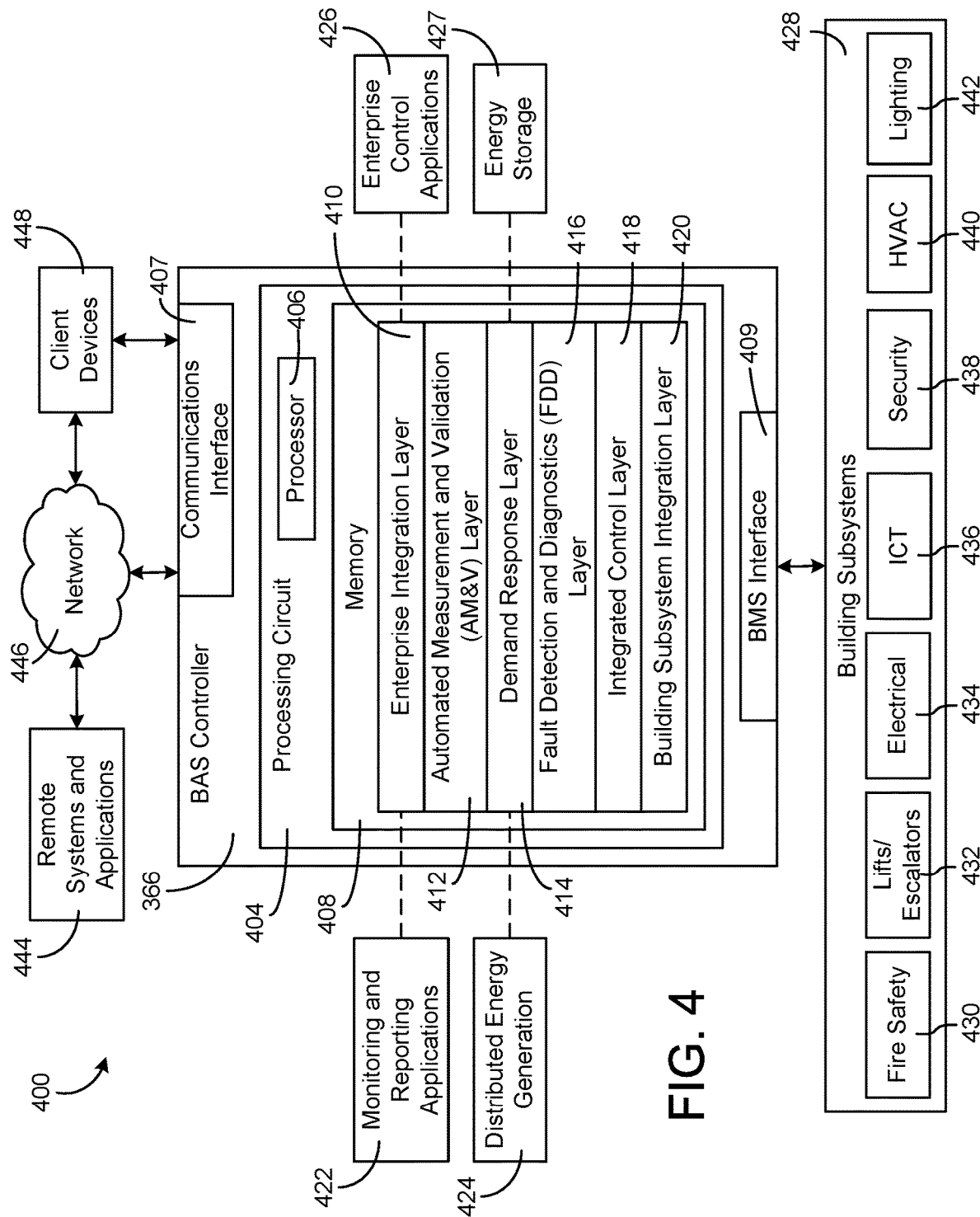
FIG. 4 is a block diagram of a building management system (BMS) which can be used to monitor and control the building of FIG. 1, according to some embodiments.
Figure 5:
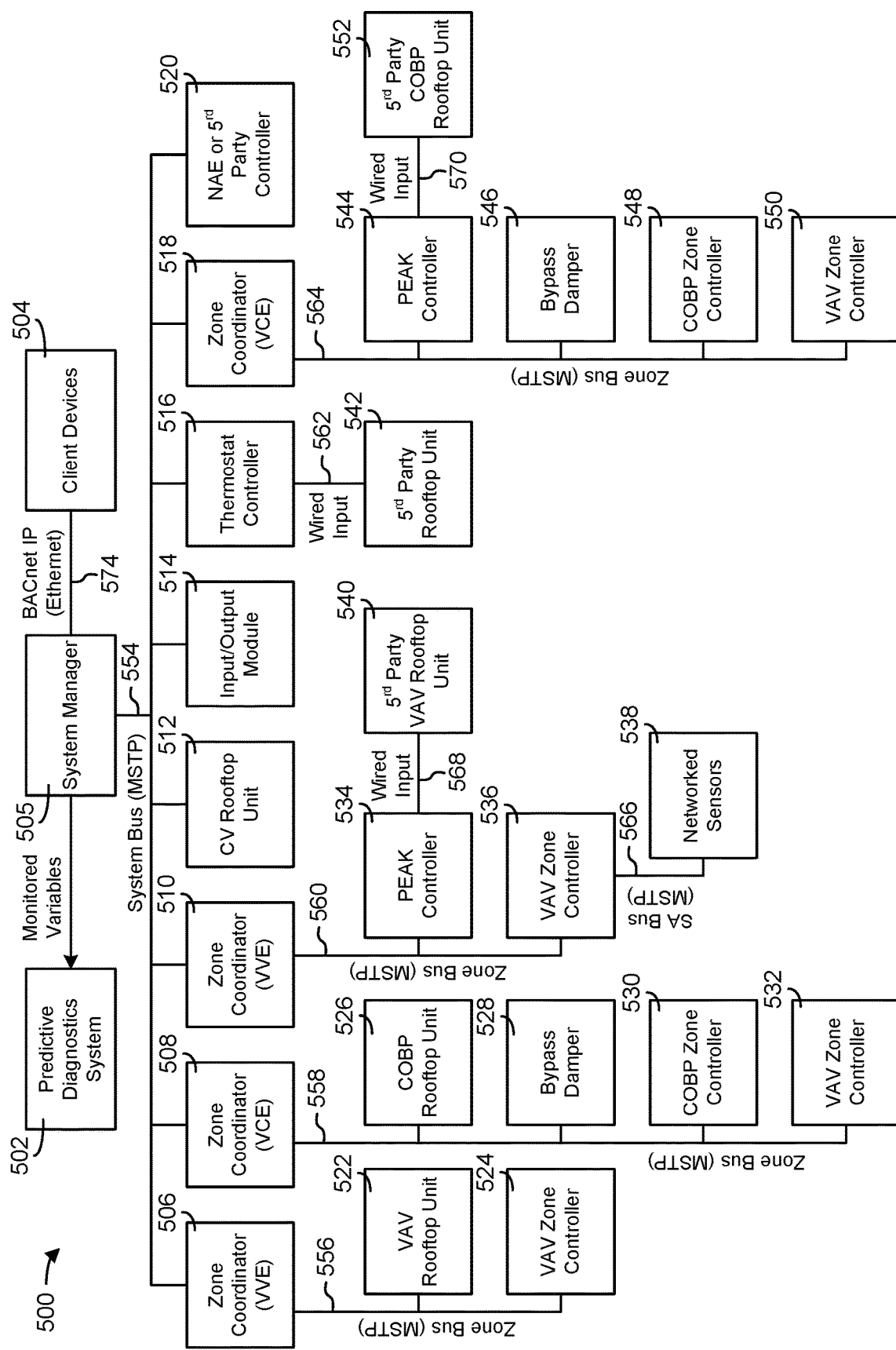
FIG. 5 is a block diagram of another BMS including a predictive diagnostics system which can be used to detect and diagnose faults in the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building 10 and HVAC System 100

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System 400

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System 500

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a predictive diagnostics system 502, a system manager 503; several zone coordinators 506, 508, 510 and 518; and several zone controllers 524, 530, 532, 536, 548, and 550. System manager 503 can monitor various data points in BMS 500 and report monitored variables to predictive diagnostics system 502. System manager 503 can communicate with client devices 504 (e.g., user devices, desktop computers, laptop computers, mobile devices, etc.) via a data communications link 574 (e.g., BACnet IP, Ethernet, wired or wireless communications, etc.). System manager 503 can provide a user interface to client devices 504 via data communications link 574. The user interface may allow users to monitor and/or control BMS 500 via client devices 504.

In some embodiments, system manager 503 is connected with zone coordinators 506-510 and 518 via a system bus 554. System manager 503 can be configured to communicate with zone coordinators 506-510 and 518 via system bus 554 using a master-slave token passing (MSTP) protocol or any other communications protocol. System bus 554 can also connect system manager 503 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 503 and can be connected directly to system bus 554. Other RTUs can communicate with system manager 503 via an intermediate device. For example, a wired input 562 can connect a third-party RTU 542 to thermostat controller 516, which connects to system bus 554.

System manager 503 can provide a user interface for any device containing an equipment model. Devices such as zone coordinators 506-510 and 518 and thermostat controller 516 can provide their equipment models to system manager 503 via system bus 554. In some embodiments, system manager 503 automatically creates equipment models for connected devices that do not contain an equipment model (e.g., IOM 514, third party controller 520, etc.). For example, system manager 503 can create an equipment model for any device that responds to a device tree request. The equipment models created by system manager 503 can be stored within system manager 503. System manager 503 can then provide a user interface for devices that do not contain their own equipment models using the equipment models created by system manager 503. In some embodiments, system manager 503 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Connected Equipment and Predictive Diagnostics

Figure 6A:
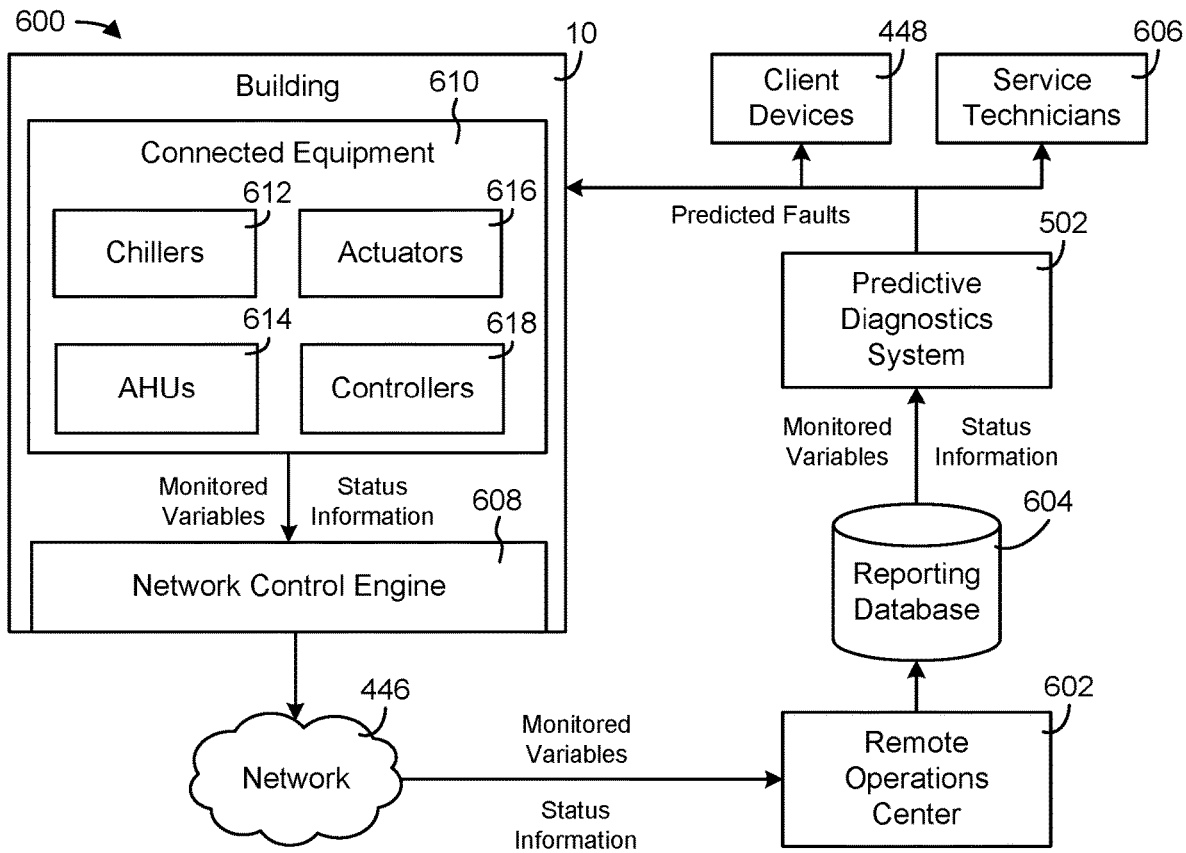
FIG. 6A is a block diagram of yet another BMS including the predictive diagnostics system, according to some embodiments.

Referring now to FIG. 6A, a block diagram of another building management system (BMS) 600 is shown, according to some embodiments. BMS 600 can include many of the same components as BMS 400 and BMS 500 as described with reference to FIGS. 4-5. For example, BMS 600 is shown to include building 10, network 446, client devices 448, and predictive diagnostics system 502. Building 10 is shown to include connected equipment 610, which can include any type of equipment used to monitor and/or control building 10. Connected equipment 610 can include connected chillers 612, connected AHUs 614, connected actuators 616, connected controllers 618, or any other type of equipment in a building HVAC system (e.g., boilers, economizers, valves, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Connected equipment 610 can be outfitted with sensors to monitor particular conditions of the connected equipment 610. For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 650 which can be used as one of chillers 612 is described in greater detail with reference to FIG. 6B. Similarly, AHUs 616 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 monitor and report variables that characterize the performance of the connected equipment 610. Each monitored variable can be forwarded to network control engine 608 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, a safety fault code, or any other information that indicates the current status of connected equipment 610. In some embodiments, each device of connected equipment 610 includes a control panel (e.g., control panel 660 shown in FIG. 6B). The control panel can use the sensor data to shut down the device if the control panel determines that the device is operating under unsafe conditions. For example, the control panel can compare the sensor data (or a value derived from the sensor data) to predetermined thresholds. If the sensor data or calculated value crosses a safety threshold, the control panel can shut down the device. The control panel can generate a data point when a safety shut down occurs. The data point can include a safety fault code which indicates the reason or condition that triggered the shut down.

Connected equipment 610 can provide monitored variables and equipment status information to a network control engine 608. Network control engine 608 can include a building controller (e.g., BMS controller 366), a system manager (e.g., system manager 503), a network automation engine (e.g., NAE 520), or any other system or device of building 10 configured to communicate with connected equipment 610. In some embodiments, the monitored variables and the equipment status information are provided to network control engine 608 as data points. Each data point can include a point ID and a point value. The point ID can identify the type of data point or a variable measured by the data point (e.g., condenser pressure, refrigerant temperature, fault code). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.).

Network control engine 608 can broadcast the monitored variables and the equipment status information to a remote operations center (ROC) 602. ROC 602 can provide remote monitoring services and can send an alert to building 10 in the event of a critical alarm. ROC 602 can push the monitored variables and equipment status information to a reporting database 604, where the data is stored for reporting and analysis. Predictive diagnostics system 502 can access database 604 to retrieve the monitored variables and the equipment status information.

In some embodiments, predictive diagnostics system 502 is a component of BMS controller 366 (e.g., within FDD layer 416). For example, predictive diagnostics system 502 can be implemented as part of a METASYS® brand building automation system, as sold by Johnson Controls Inc. In other embodiments, predictive diagnostics system 502 can be a component of a remote computing system or cloud-based computing system configured to receive and process data from one or more building management systems. For example, predictive diagnostics system 502 can be implemented as part of a PANOPTIX® brand building efficiency platform, as sold by Johnson Controls Inc. In other embodiments, predictive diagnostics system 502 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Predictive diagnostics system 502 may use the monitored variables to identify a current operating state of connected equipment 610. The current operating state can be examined by predictive diagnostics system 502 to expose when connected equipment 610 begins to degrade in performance and/or to predict when faults will occur. In some embodiments, predictive diagnostics system 502 determines whether the current operating state is a normal operating state or a faulty operating state. Predictive diagnostics system 502 may report the current operating state and/or the predicted faults to client devices 448, service technicians 606, building 10, or any other system or device. Communications between predictive diagnostics system 502 and other systems or devices can be direct or via an intermediate communications network, such as network 446. If the current operating state is identified as a faulty state or moving toward a faulty state, predictive diagnostics system 502 may generate an alert or notification for service technicians 606 to repair the fault or potential fault before it becomes more severe. In some embodiments, predictive diagnostics system 502 uses the current operating state to determine an appropriate control action for connected equipment 610.

In some embodiments, predictive diagnostics system 502 uses principal component analysis (PCA) models to identify the current operating state. PCA is a multivariate statistical technique that takes into account correlations between two or more monitored variables. Predictive diagnostics system 502 may use the monitored variables to create a plurality of PCA models. Each of the PCA models may characterize the behavior of the monitored system, device, or process in a particular operating state. Predictive diagnostics system 502 may store the PCA models in a library of operating states (e.g., in memory or a database).

Predictive diagnostics system 502 may use the library of operating states to determine whether new samples of the monitored variables correspond to any of the previously-stored operating states. For example, predictive diagnostics system 502 may calculate a fault detection index $I(x)$ for a new sample of the monitored variables. The fault detection index $I(x)$ can be a function of both the current values of the monitored variables and one or more parameters of the PCA model for a given operating state (i.e., state k). Predictive diagnostics system 502 may compare the fault detection index $I(x)$ to a control limit $\zeta^2$ for state k. If the fault detection index is within the control limit (e.g., $I(x) \leq \zeta^2$), predictive diagnostics system 502 may identify state k as the current operating state. If the fault detection index is not within the control limit (e.g., $I(x) > \zeta^2$), predictive diagnostics system 502 may recalculate the fault detection index $I(x)$ with respect to another of the stored operating states (i.e., state j) and compare the recalculated fault detection index to a control limit $\zeta^2$ for state j. Predictive diagnostics system 502 may repeat this process (e.g., iterating through each of the stored operating states j=1 . . . m) until the current operating state is identified.

In some embodiments, predictive diagnostics system 502 uses a voting-based identification process to identify the current operating state. Predictive diagnostics system 502 may perform the voting-based identification process if the iterative process described above fails to identify any of the stored operating states as the current operating state. In some embodiments, the voting-based identification process includes calculating a direction between a given operating state (i.e., state k) and each of the other operating states (i.e., state j). The direction can be the orientation of a vector pointing from state k toward state j (described in greater detail with reference to FIG. 7B).

Predictive diagnostics system 502 may reconstruct the current sample of the monitored variables along each of the calculated directions (e.g., by subtracting a multiple of the vector from the current sample). If the reconstructed sample is within state k, predictive diagnostics system 502 may record a vote for state j as the current operating state. A vote for state j as the current operating state indicates that the vector pointing from state k toward state j is generally in the same direction as a vector pointing from state k toward the current sample of the monitored variables. In other words, from the perspective of state k, both state j and the current sample of the monitored variables have the same general direction. Predictive diagnostics system 502 may repeat this process (e.g., iterating through each of the stored operating states k), recording a vote with each iteration. Once a vote has been recorded from the perspective of each operating state, predictive diagnostics system 502 may select the operating state with the most votes as the current operating state. In some embodiments, predictive diagnostics system 502 uses the current operating state to generate a control signal for the connected equipment 610.

In some embodiments, predictive diagnostics system 502 includes a data analytics and visualization platform. Predictive diagnostics system 502 can analyze the monitored variables to predict when a fault will occur in the connected equipment 610. Predictive diagnostics system 502 can predict the type of fault and a time at which the fault will occur. For example, predictive diagnostics system 502 can predict when connected equipment 610 will next report a safety fault code that triggers a device shut down. Advantageously, the faults predicted by predictive diagnostics system 502 can be used to determine that connected equipment 610 is in need of preventative maintenance to avoid an unexpected shut down due to the safety fault code. Predictive diagnostics system 502 can provide the predicted faults to service technicians 606, client devices 448, building 10, or other systems or devices.

In some embodiments, predictive diagnostics system 502 provides a web interface which can be accessed by service technicians 606, client devices 448, and other systems or devices. The web interface can be used to access the raw data in reporting database 604, view the results of the predictive diagnostics, identify which equipment is in need of preventative maintenance, and otherwise interact with predictive diagnostics system 502. Service technicians 606 can access the web interface to view a list of equipment for which faults are predicted by predictive diagnostics system 502. Service technicians 606 can use the predicted faults to proactively repair connected equipment 610 before a fault and/or an unexpected shut down occurs. These and other features of predictive diagnostics system 502 are described in greater detail below.

Connected Equipment Example: Centrifugal Chiller

Figure 6B:
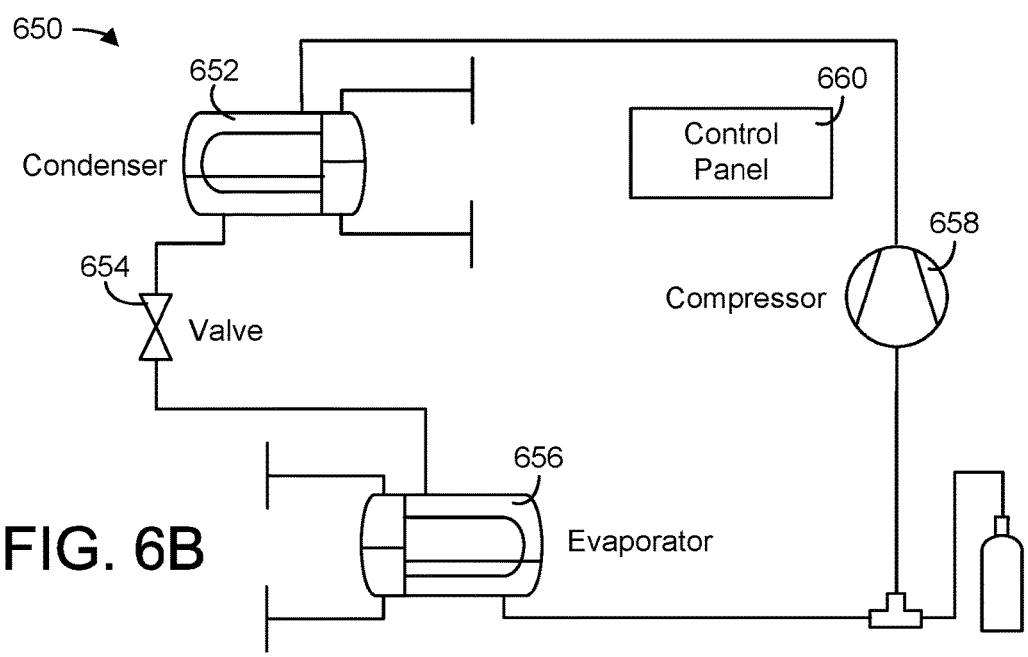
FIG. 6B is a schematic diagram of a chiller, which is an example of a type of connected equipment which can report monitored variables and status information to the predictive diagnostics system, according to some embodiments.

Referring now to FIG. 6B, a schematic diagram of a centrifugal chiller 650 is shown, according to some embodiments. Chiller 650 is an example of a type of connected equipment 610 which can report monitored variables and status information to predictive diagnostics system 502. Chiller 650 is shown to include a refrigeration circuit having a condenser 652, an expansion valve 654, an evaporator 656, a compressor 658, and a control panel 660. In some embodiments, chiller 650 includes sensors that measure a set of monitored variables at various locations along the refrigeration circuit. Table 1 below describes an exemplary set of monitored variables that can be measured in chiller 650. Predictive diagnostics system 502 can use these or other variables to detect the current operating state of chiller 650 and predict faults.

TABLE 1

Monitored Chiller Variables

| Number | ID | Description | Units |
|---|---|---|---|
| 1 | $F_{cw}$ | Condenser water flow rate | kg/s |
| 2 | $F_r$ | Refrigerant charge | kg |
| 3 | $F_{ew}$ | Evaporator water flow rate | kg/s |
| 4 | $T_{cir}$ | Condenser inlet refrigerant temperature | K |
| 5 | $A_v$ | Valve position | m$^2$ |
| 6 | $P_e$ | Evaporator pressure | Pa |
| 7 | $P_c$ | Condenser pressure | Pa |
| 8 | $W_{com}$ | Compressor power | Watts |
| 9 | $T_{eow}$ | Evaporator outlet water temperature | K |
| 10 | $T_{cow}$ | Condenser outlet water temperature | K |
| 11 | $T_{eiw}$ | Evaporator inlet water temperature | K |
| 12 | $T_{ciw}$ | Condenser inlet water temperature | K |
| 13 | $T_{eor}$ | Evaporator outlet refrigerant temperature | K |
| 14 | $T_{cor}$ | Condenser outlet refrigerant temperature | K |
| 15 | $T_{eir}$ | Evaporator inlet refrigerant temperature | K |

Chiller 650 can be configured to operate in multiple different operating states. For example, chiller 650 can be operated in a low load state, a medium load state, and a high load state. These three states represent the normal operating states or conditions of chiller 650. The evaporator inlet water temperature $T_{eiw}$ can be different in the normal operating states. For example, the value for $T_{eiw}$ may have a first value in the low load state (e.g., 280K), a second value in the medium load state (e.g., 282K), and a third value in the high load state (e.g., 284K).

Faults in chiller 650 may cause the operation of chiller 650 to deviate from the normal operating states. For example, three types of faults may occur in each of the normal operating states. These correspond to leaks in the condenser water flow $F_{cw}$, the evaporator water flow $F_{ew}$, and the refrigerant charge $F_r$. For each type of fault, several different fault levels may exist. For example, the fault levels may correspond to reductions in the values of the affected flow variables by 10%, 20%, 30%, and 40%. The combination of the three normal chiller load states, the three fault types for each normal load state, and the four fault levels for each fault type leads to a total of 39 operating states. Table 2 illustrates these operating states.

TABLE 2

Chiller Operating States

| Load | | | | Leak Percent | | |
|---|---|---|---|---|---|---|
| Low | Medium | High | | | | |
| State ID | | | Type | $F_{cw}$ | $F_r$ | $F_{ew}$ |
| 1 | 14 | 27 | Normal | 0 | 0 | 0 |
| 2 | 15 | 28 | | 10 | 0 | 0 |
| 3 | 16 | 29 | | 20 | | |
| 4 | 17 | 30 | | 30 | | |
| 5 | 18 | 31 | | 40 | | |
| 6 | 19 | 32 | | 0 | 10 | |
| 7 | 20 | 33 | | | 20 | |
| | | | Faulty | | | |
| 8 | 21 | 34 | | | 30 | |
| 9 | 22 | 35 | | | 40 | |
| 10 | 23 | 36 | | | 0 | 10 |
| 11 | 24 | 37 | | | | 20 |
| 12 | 25 | 38 | | | | 30 |
| 13 | 26 | 39 | | | | 40 |

Predictive diagnostics system 502 may build principal component analysis (PCA) models of the operating states by collecting samples of the monitored variables. For example, predictive diagnostics system 502 may collect 1000 samples of the monitored variables at a rate of one sample per second. The samples taken at each sampling time can be organized into a vector, as shown in the following equation:

$$x = [F_{cw} F_r \ldots T_{eir}]^T$$

The samples x of monitored variables can be passed to a data scaler, PCA modeler, and/or other components of predictive diagnostics system 502 and used to construct PCA models for each of the operating states, as described with reference to FIGS. 11-12. After the state models are built, new samples x of the monitored variables can be processed by predictive diagnostics system 502 to determine the current operating state of chiller 650, as described with reference to FIGS. 11 and 13-14. Predictive diagnostics system 502 can determine how close the current operating state is to each of the operating states represented by the PCA models. Predictive diagnostics system 502 can use the proximity of the current operating to states to each of the modeled operating states to predict when a fault will occur.

Principal Component Analysis (PCA) Models

Figure 7A:
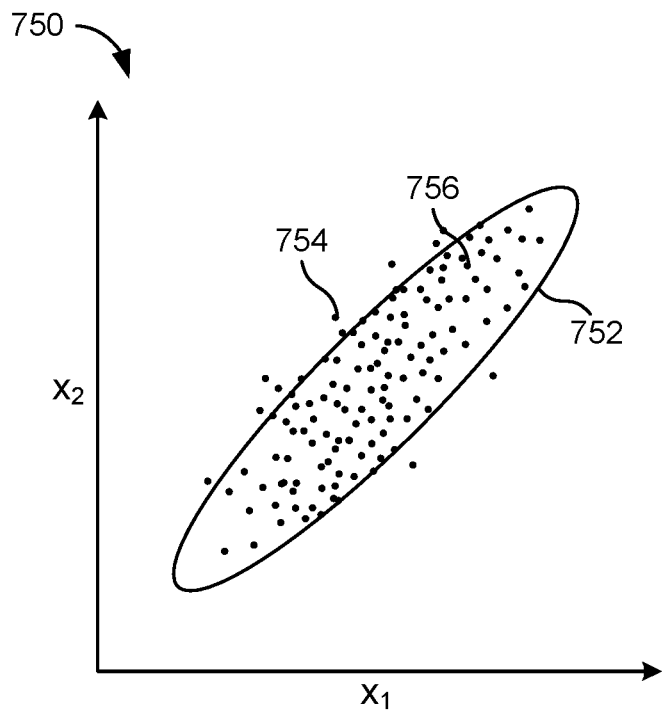
FIG. 7A is a graph of a principal component analysis (PCA) model which can be used to model an operating state of the connected equipment, according to some embodiments.

Referring now to FIG. 7A, a graph 750 illustrating a PCA model 752 is shown, according to some embodiments. PCA model 752 can be constructed by predictive diagnostics system 502 to facilitate the data-driven fault detection, fault diagnostics, and fault prediction performed by predictive diagnostics system 502. PCA model 752 captures a correlation between two or more of the monitored variables by transforming the monitored variables into principal components, shown in FIG. 7A as $x_1$ and $x_2$. The first principal component has the largest variance (accounting for the largest variability in the data), whereas the successive principal components have decreasing variances. Each principal component can be constructed as a linear combination of the original monitored variables. Formally, PCA transforms the original coordinate system of the monitored variables into a new coordinate system, where each axis lies along its respective principal component. This produces a mapping between the original coordinate system and the PCA coordinate system. In two-dimensional space, PCA model 752 can be conceptualized as an ellipse that spans the principal components $x_1$ and $x_2$.

Although only two principal components are shown in FIG. 7A, it should be understood that any number of the monitored variables and/or principal components can be modeled by PCA model 752. For example, if a third principal component is added, PCA model 752 can be conceptualized as an ellipsoid in three-dimensional space. In general, PCA model 752 may have any number of dimensions to accommodate any number of the monitored variables. PCA model 752 can be represented as a multi-dimensional ellipsoid in multi-dimensional space. Each sample of the monitored variables can be represented by a point in the multi-dimensional space. Points that lie within the ellipsoid (e.g., point 756) indicate normal samples, whereas points that lie outside the ellipsoid (e.g., point 754) indicate abnormal or faulty samples.

When a fault occurs, the faulty samples may lie outside PCA model 752 (e.g., outside the ellipsoid). Predictive diagnostics system 502 may characterize the fault by collecting a set of faulty samples and extracting the direction of the fault with respect to the PCA model 752 of the normal state. In some embodiments, predictive diagnostics system 502 uses the faulty samples to build a PCA model of the faulty state. Advantageously, building a new PCA model allows predictive diagnostics system 502 to identify a correlation structure for the faulty samples, which can be different from the correlation structure of the normal PCA model 752.

Figure 7B:
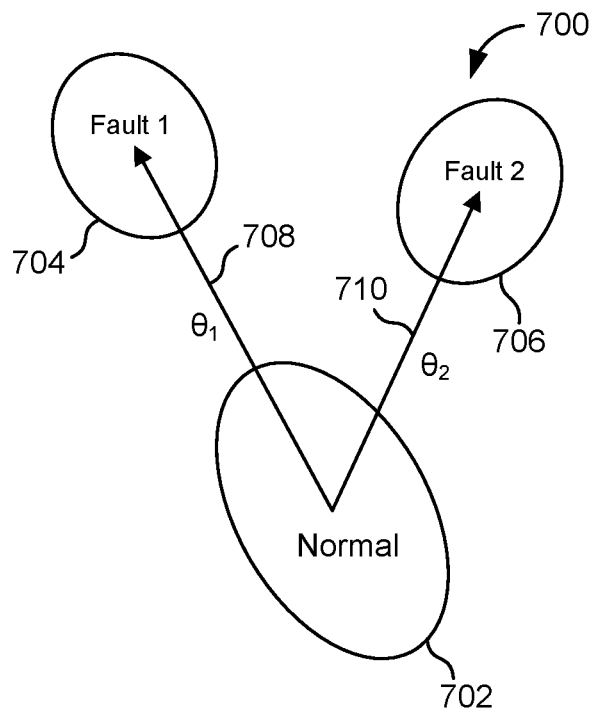
FIG. 7B is an illustration of a PCA model with a normal state and two faulty states with respect to the normal state, according to some embodiments.

Referring now to FIG. 7B, another PCA model 700 is shown, according to some embodiments. PCA model 700 represents a monitored system, device, or process that has one normal state 702 and two faulty states 704-706. Predictive diagnostics system 502 may construct normal state 702 and faulty states 704-706 using samples of the monitored variables. When only one normal state 702 exists, each faulty state 704-706 can be characterized with respect to the single normal state 702. For example, vector 708 indicates the direction $\theta_1$ of faulty state 704 with respect to normal state 702, whereas vector 710 indicates the direction $\theta_2$ of faulty state 706 with respect to normal state 702. In some embodiments, $\theta_1$ and $\theta_2$ are n-dimensional vectors, where n is the number of the monitored variables characterized by each state. Throughout this disclosure, boldface variables are used to represent vectors and/or matrices.

Figure 8:
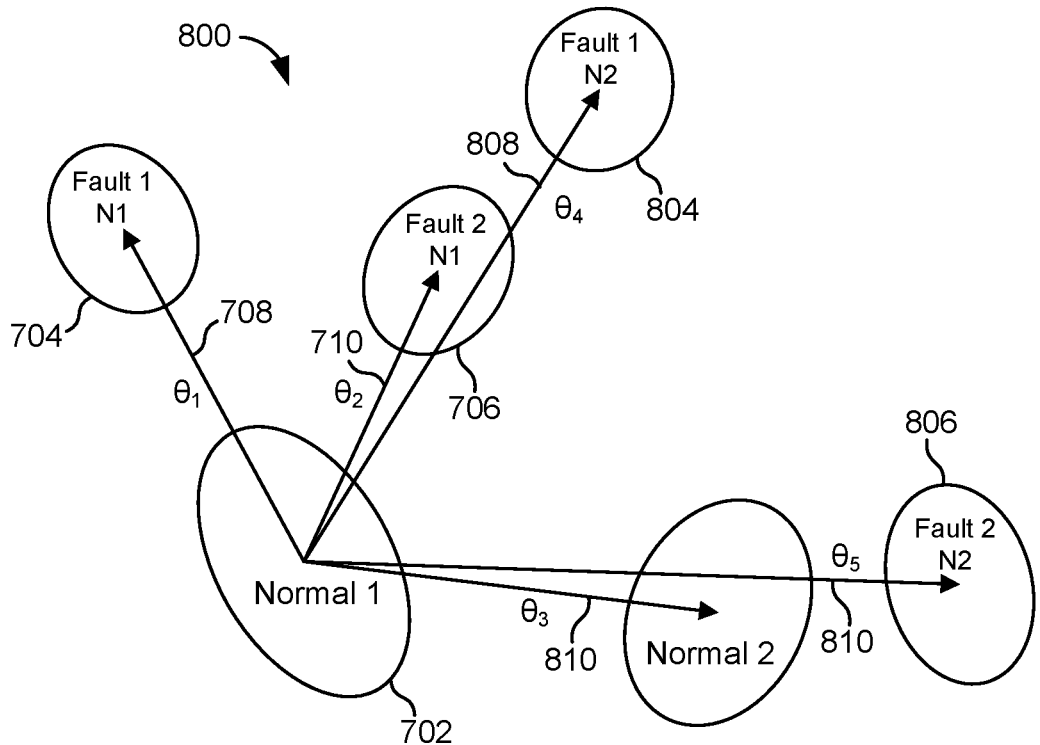
FIG. 8 is an illustration of a PCA model with multiple normal states and faulty states which describes all of the inactive states with respect to a single active state, according to some embodiments.

Referring now to FIG. 8, another PCA model 800 is shown, according to some embodiments. PCA model 800 represents a monitored system, device, or process that has two normal states 702 and 802. Each of normal states 702 and 802 has two corresponding faulty states. For example, normal state 702 has faulty states 704-706, whereas normal state 802 has faulty states 804-806. Faulty states 704-706 can be constructed by predictive diagnostics system 502 based on faulty samples of the monitored variables when the monitored system, device, or process was operating in normal state 702. Similarly, faulty states 804-806 can be constructed by predictive diagnostics system 502 based on faulty samples of the monitored variables when the monitored system, device, or process was operating in normal state 802.

Predictive diagnostics system 502 can be configured to characterize any of the normal or faulty operating states with respect to any of the other normal or faulty operating states. For example, vector 708 indicates the direction $\theta_1$ of faulty state 704 with respect to normal state 702. Vector 710 indicates the direction $\theta_2$ of faulty state 706 with respect to normal state 702. Vector 808 indicates the direction $\theta_4$ of faulty state 804 with respect to normal state 702. Vector 810 indicates the direction $\theta_5$ of faulty state 806 with respect to normal state 702. Vector 812 indicates the direction $\theta_3$ of normal state 802 with respect to normal state 702. Any of the normal or faulty states can be characterized in a similar manner with respect to normal state 802 or any of the faulty states 704-706 and 804-806.

In some embodiments, predictive diagnostics system 502 characterizes new values of the monitored variables with respect to the most recent normal operating state. For example, if normal state 702 is the current operating state, new values of the monitored variables can be characterized with respect to normal state 702. When the monitored system, device, or process transitions from normal state 702 to normal state 802, predictive diagnostics system 502 may flag normal state 802 as a faulty state with respect to normal state 702 because the new values of the monitored variables are not within state 702. It can be difficult for predictive diagnostics system 502 to distinguish between normal state 802 and faulty state 806 from the perspective of normal state 702 since the directions $\theta_3$ and $\theta_5$ are similar. The same is true for distinguishing between faulty state 706 and faulty state 804 since the directions $\theta_2$ and $\theta_4$ are similar.

Figure 9:
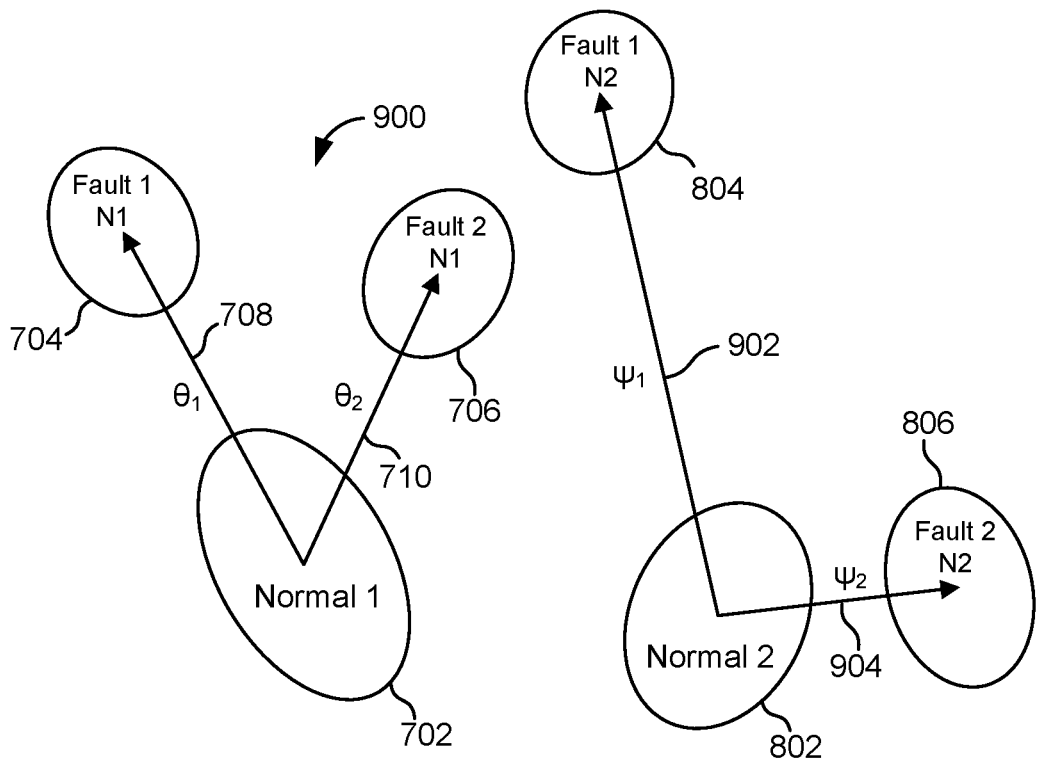
FIG. 9 is an illustration of a PCA model with multiple normal states and faulty states which describes each group of faulty states with respect to the normal state that was active when the faulty behavior occurred, according to some embodiments.

Referring now to FIG. 9, another PCA model 900 is shown, according to some embodiments. Predictive diagnostics system 502 may generate PCA model 900 by characterizing each faulty state with respect to a particular normal state. For example, when the monitored system, device, or process is operating in normal state 702, predictive diagnostics system 502 may use faulty values of the monitored variables to characterize faulty states 704 and 706 with respect to normal state 702. Vector 708 indicates the direction $\theta_1$ of faulty state 704 with respect to normal state 702. Vector 710 indicates the direction $\theta_2$ of faulty state 706 with respect to normal state 702. Similarly, when the monitored system, device, or process is operating in normal state 802, predictive diagnostics system 502 may use faulty values of the monitored variables to characterize faulty states 804 and 806 with respect to normal state 802. Vector 902 indicates the direction $\psi_1$ of faulty state 804 with respect to normal state 802. Vector 904 indicates the direction $\psi_2$ of faulty state 806 with respect to normal state 802.

When the normal state changes, predictive diagnostics system 502 may switch to the PCA model representing the new normal state (i.e., normal state 702 or 802) and identify faults with respect to the new normal state. Advantageously, this allows predictive diagnostics system 502 to more easily distinguish between various faulty states since the direction $\theta_1$ is clearly distinguishable from the direction $\theta_2$, and the direction $\psi_1$ is clearly distinguishable from the direction $\psi_2$. However, if faulty states 704-706 occur while operating in normal state 802, the fault may not be identified since PCA model 900 does not include information identifying either of faulty states 704-706 from the perspective of normal state 802 (i.e., vectors and/or directions from normal state 802 to faulty states 704-706). The same is true for identifying faulty states 804-806 from the perspective of normal state 702.

Figure 10A:
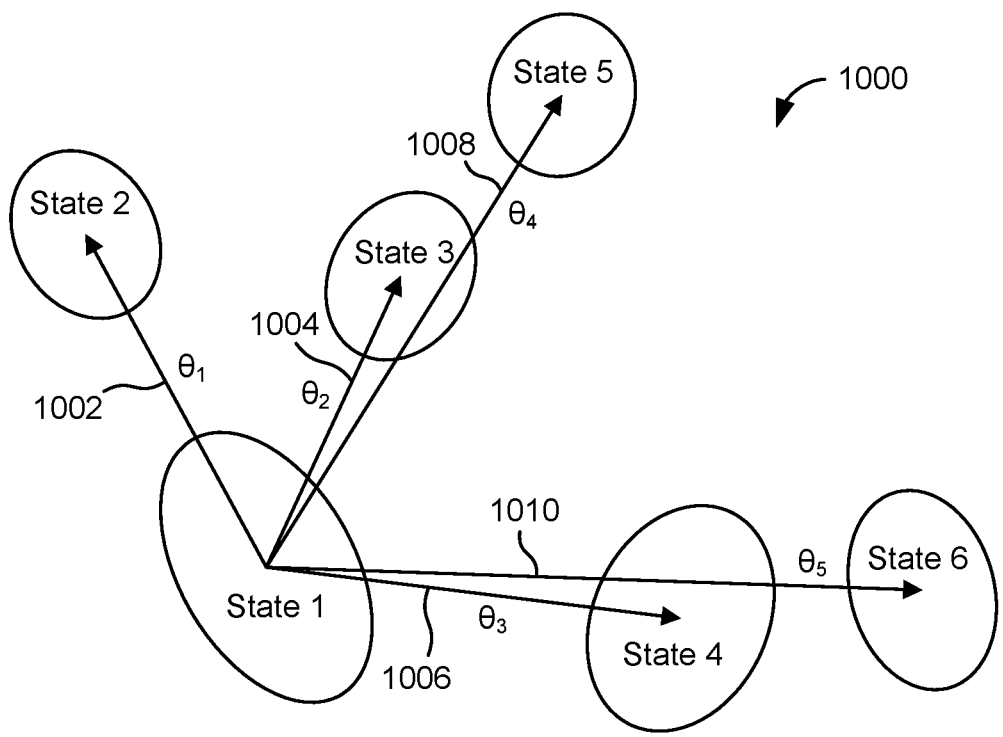
FIGS. 10A-10B are illustrations of a PCA model which does not characterize the operating states as normal or faulty and which is capable of describing any state with respect to any of the other states, according to some embodiments.
Figure 10B:
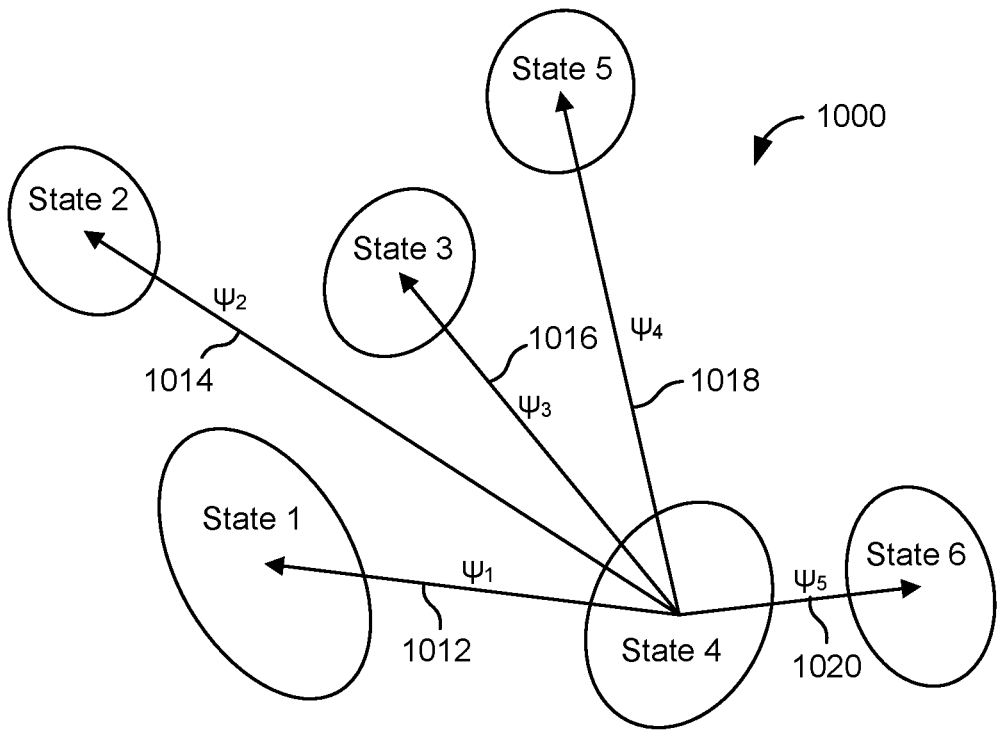

Referring now to FIGS. 10A-10B, another PCA model 1000 is shown, according to some embodiments. PCA model 1000 represents a monitored system, device, or process that has five operating states (i.e., states 1-5). PCA model 1000 does not distinguish between normal states and faulty states, but rather treats each state equally for purposes of fault detection and diagnosis. For example, predictive diagnostics system 502 may use PCA model 1000 to determine which of states 1-5 is the current operating state. After the current operating state is identified, predictive diagnostics system 502 may determine whether the identified operating state is normal or faulty (e.g., based on a description of the conditions under which the state was created).

Advantageously, PCA model 1000 characterizes each of states 1-5 with respect to whichever state is the current operating state. For example, FIG. 10A shows state 1 as the current operating state with vectors 1002-1010 pointing from state 1 to the other states 2-4. Vector 1002 indicates the direction $\theta_1$ from state 1 to state 2. Vector 1004 indicates the direction $\theta_2$ from state 1 to state 3. Vector 1006 indicates the direction $\theta_3$ from state 1 to state 4. Vector 1008 indicates the direction $\theta_4$ from state 1 to state 5. Vector 1010 indicates the direction $\theta_5$ from state 1 to state 6. Predictive diagnostics system 502 may use a history of values for the monitored variables to calculate each of vectors 1002-1010 and directions $\theta_1$-$\theta_5$.

When the current operating state changes, predictive diagnostics system 502 may recalculate the vectors and directions with respect to the new operating state. For example, FIG. 10B shows state 4 as the current operating state with vectors 1012-1020 pointing from state 4 to the other states 1-3 and 5. Vector 1012 indicates the direction $\psi_1$ from state 4 to state 1. Vector 1014 indicates the direction $\psi_2$ from state 4 to state 2. Vector 1016 indicates the direction $\psi_3$ from state 4 to state 3. Vector 1018 indicates the direction $\psi_4$ from state 4 to state 5. Vector 1020 indicates the direction $\psi_5$ from state 4 to state 6. Predictive diagnostics system 502 may use a history of values for the monitored variables to calculate each of vectors 1012-1020 and directions $\psi_1$-$\psi_5$.

Predictive diagnostics system 502 may recalculate the vectors and directions in PCA model 1000 with respect to whichever state is the current operating state, regardless of whether the state is normal or faulty. For example, if state 1 is the current operating state and a known fault occurs, predictive diagnostics system 502 may transition into the operating state corresponding to the known fault (e.g., state 2, state 3, etc.). Predictive diagnostics system 502 may use the PCA model for the faulty state to monitor the system or process while the problem is fixed. For example, if the faulty state is state 2, predictive diagnostics system 502 may recalculate the vectors and directions with respect to state 2. Predictive diagnostics system 502 may then perform regular fault detection and diagnostics using the PCA model for state 2. When the problem is fixed and the monitored system or process returns to state 1, predictive diagnostics system 502 may detect the change as a deviation from state 2. Predictive diagnostics system 502 may then identify state 1 as the current operating state and recalculate the vectors and directions with respect to state 1. If state 1 is a faulty state, predictive diagnostics system 502 may trigger an alarm or notification. Otherwise, predictive diagnostics system 502 may continue with normal FDD operations without triggering an alarm or notification.

In some embodiments, predictive diagnostics system 502 uses PCA model 1000 to identify and model known transition states that are not representative of normal operation, but do not represent a fault that needs to be addressed or repaired. For example, chillers may have a startup period during which the chiller is approaching steady-state operation. This is a transition state which is not representative of normal chiller operation, but should not be considered a fault for purposes of fault detection and diagnostics. Predictive diagnostics system 502 may use samples of the monitored variables during the startup period to develop a PCA model for a startup state. When the startup state is subsequently identified, predictive diagnostics system 502 may determine that the chiller is operating in a known transition state rather than a faulty state indicative of a problem with the chiller.

In some embodiments, predictive diagnostics system 502 uses PCA model 1000 to calculate fault detection indices and state directions with respect to multiple different operating states. Advantageously, this flexibility allows predictive diagnostics system 502 to perform fault diagnosis using any state model. For example, predictive diagnostics system 502 may perform multiple independent diagnoses of which operating state is the current operating state. Each diagnosis may use the PCA model for a particular operating state to calculate a direction to the current operating state from the perspective of the particular operating state. Predictive diagnostics system 502 may use the diagnosis given by one state model to confirm the diagnosis given by another state model. In some embodiments, the diagnosis provided by each state model represents a vote for the current operating state. Predictive diagnostics system 502 may perform multiple independent diagnoses using a variety of different state models to cast votes for the current operating state. Predictive diagnostics system 502 may then select the operating state with the most votes as the current operating state.

Predictive Diagnostics System

Figure 11:
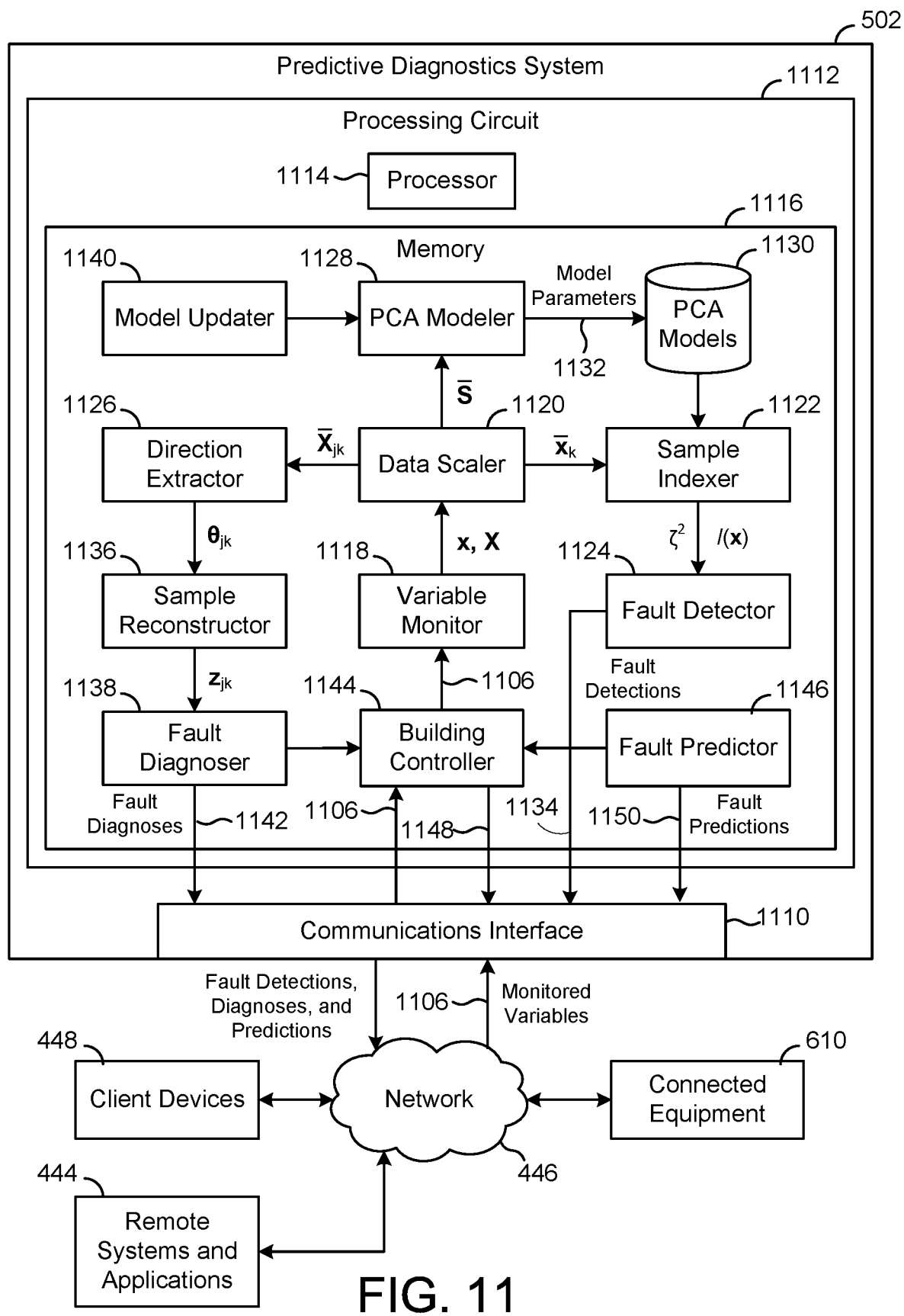
FIG. 11 is a block diagram illustrating the predictive diagnostics system in greater detail, according to some embodiments.

Referring now to FIG. 11, a block diagram illustrating predictive diagnostics system 502 in greater detail is shown, according to some embodiments. Predictive diagnostics system 502 is shown to include a communications interface

1110 and a processing circuit 1112. Communications interface 1110 may facilitate communications between predictive diagnostics system 502 and various external systems or devices. For example, predictive diagnostics system 502 may receive the monitored variables from connected equipment 610 and provide control signals to connected equipment 610 via communications interface 1110. Communications interface 1110 may also be used to communicate with remote systems and applications 444, client devices 448, and/or any other external system or device. For example, predictive diagnostics system 502 may provide fault detections, diagnoses, and fault predictions to remote systems and applications 444, client devices 448, service technicians 606, or any other external system or device via communications interface 1110.

Communications interface 1110 can include any number and/or type of wired or wireless communications interfaces (e.g., jacks, antennas, transmitters, receivers, transceivers, wire terminals, etc.). For example, communications interface 1110 can include an Ethernet card and port for sending and receiving data via an Ethernet-based communications link or network. As another example, communications interface 1110 can include a WiFi transceiver, a NFC transceiver, a cellular transceiver, a mobile phone transceiver, or the like for communicating via a wireless communications network. In some embodiments, communications interface 1110 includes RS232 and/or RS485 circuitry for communicating with BMS devices (e.g., chillers, controllers, etc.). Communications interface 1110 can be configured to use any of a variety of communications protocols (e.g., BACNet, Modbus, N2, MSTP, Zigbee, etc.). Communications via interface 1110 can be direct (e.g., local wired or wireless communications) or via an intermediate communications network 446 (e.g., a WAN, the Internet, a cellular network, etc.). Communications interface 1110 can be communicably connected with processing circuit 1112 such that processing circuit 1112 and the various components thereof can send and receive data via communications interface 1110.

Processing circuit 1112 is shown to include a processor 1114 and memory 1116. Processor 1114 can be implemented as a general purpose processor, an application specific integrated circuit (ASIC), one or more field programmable gate arrays (FPGAs), a group of processing components, or other suitable electronic processing components. Memory 1116 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1116 can be or include volatile memory or non-volatile memory. Memory 1116 can include database components, object code components, script components, or any other type of information structure for supporting the various activities and information structures described in the present application. According to some embodiments, memory 1116 is communicably connected to processor 1114 via processing circuit 1112 and includes computer code for executing (e.g., by processing circuit 1112 and/or processor 1114) one or more processes described herein.

Still referring to FIG. 11, memory 1116 is shown to include a variable monitor 1118. Variable monitor 1118 can be configured to monitor one or more variables (i.e., monitored variables 1106) that indicate the performance of connected equipment 610. For example, monitored variables 1106 can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. The monitored variables 1106 can be received from connected equipment 610 and/or from various devices thereof. For example, the monitored variables 1106 can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428.

In some embodiments, the monitored variables 1106 include n different time-series variables. Variable monitor 1118 may gather measurements or other values (e.g., calculated or estimated values) of the n time-series variables in a sample vector x, where $x \in \mathfrak{R}^n$. Variable monitor 1118 can be configured to collect m samples of each of the n time-series variables. Variable monitor 1118 may generate a sample matrix X, where $X \in \mathfrak{R}^{m \times n}$. The sample matrix X can include m samples of each of then time-series variables, as shown in the following equation:

$$X = [x_1 x_2 \ldots x_m]^T$$

where each of the m sample vectors x (e.g., $x_1$, $x_2$, etc.) includes a value for each of the n time-series variables.

In some embodiments, variable monitor 1118 groups sample vectors x based on an operating state during which the sample vectors x were collected. For example, variable monitor 1118 may group the sample vectors x collected during a first operating state (e.g., state 1) into a first sample matrix $X_1$, and group the sample vectors x collected during a second operating state (e.g., state 2) into a second sample matrix $X_2$. Each of the sample matrices X can include values of the monitored variables that represent a particular operating state. During a training period, the operating states associated with each of the sample vectors x can be specified by a user or indicated by another data source. In some embodiments, variable monitor 1118 automatically identifies the operating states based on the equipment status information received from connected equipment 610. Each of the sample matrices X can be used by predictive diagnostics system 502 to generate a PCA model for a different operating state. Once the PCA models are generated, new sample vectors x (or samples) can be collected and automatically identified by predictive diagnostics system 502 as belonging to a particular operating state or moving toward a particular operating state using the PCA models.

Still referring to FIG. 11, memory 1116 is shown to include a data scaler 1120. Data scaler 1120 is shown receiving the sample vectors x and the sample matrices X from variable monitor 1118. Data scaler 1120 can be configured to calculate the mean and standard deviation of the sample vectors x for each of the operating states. For example, data scaler 1120 may calculate the mean b of a set of sample vectors x using the following equation:

$$b = \frac{1}{m}\sum_{i=1}^{m} x_i = \frac{1}{m}X^T 1_m$$

where $x_i$ represents the ith sample vector x for a particular operating state, $1_m$ is a vector of size m whose elements are all 1 (i.e., $1_m=[1\ 1\ \ldots\ 1]$), and $X^T$ is sample matrix that includes a set of m sample vectors x representing the same operating state.

Data scaler 1120 may calculate the standard deviation of the sample vectors x for a particular operating state from the covariance matrix S of the sample matrix X for the operating state. For example, data scaler 1120 may calculate the covariance matrix S using the following equation:

$$S = \frac{1}{m}\sum_{i=1}^{m}(x_i-b)(x_i-b)^T$$
$$S = \frac{1}{m}(X-1_m b^T)(X-1_m b^T)^T$$
$$S = \frac{1}{m}(X^T X - mbb^T)$$

Data scaler 1120 may then calculate the standard deviation V by taking the square root of the diagonal matrix that contains the diagonal elements of the covariance matrix S, as shown in the following equation:

$$V=\sqrt{\text{diag}(S)}$$

Data scaler 1120 may repeat these calculations for each of the operating states (e.g., using the sample vectors x and/or the sample matrix X for a particular operating state) to determine the mean b and standard deviation V for each of the operating states.

In some embodiments, data scaler 1120 uses the mean b and standard deviation V for a particular operating state (i.e., state k) to scale new samples of the monitored variables with respect to that operating state. For example, data scaler 1120 may scale a new sample vector x with respect to operating state k using the following equation:

$$\bar{x}_k V_k^{-1}(x-b_k)$$

where $V_k$ is the standard deviation for state k, $b_k$ is the mean for state k, and the vector $\bar{x}_k$ is the sample vector x scaled with respect to state k. In some embodiments, data scaler 1120 scales each new sample with respect to each of the operating states. For example, data scaler 1120 may iteratively scale a new sample vector x with respect each operating state k, where $k \in \Re^N$ and N is the total number of operating states. Data scaler 1120 may provide the scaled sample vector(s) $\bar{x}_k$ to sample indexer 1122 and fault detector 1124 for use in determining whether the new sample qualifies as a fault with respect to state k (described in greater detail below).

In some embodiments, data scaler 1120 uses the mean b and standard deviation V for a particular operating state (i.e., state k) to scale the sample matrix X for the same operating state. For example, data scaler 1120 may scale the sample matrix $X_k$ using the following equation:

$$\bar{X}=(X_k-1_m b_k^T)V_k^{-1}$$

where $V_k$ is the standard deviation for state k, $b_k$ is the mean for state k, and the matrix $\bar{X}$ is the scaled sample matrix X for state k. In some embodiments, data scaler 1120 determines the scaled sample matrix $\bar{X}$ for each of the operating states. For example, data scaler 1120 may iteratively calculate the scaled sample matrix $\bar{X}$ for each operating state k, where $k \in \Re^N$ and N is the total number of operating states.

In some embodiments, data scaler 1120 uses the mean b and standard deviation V for a particular operating state (i.e., state k) to scale a sample matrix $X_j$ for a different operating state. The sample matrix $X_j$ may consist of m samples of the n monitored variables (i.e., $X_j \in \Re^{m \times n}$). In some embodiments, the sample matrix $X_j$ represents another of the operating states (i.e., state j). In other embodiments, the sample matrix $X_j$ represents a set of samples that have not yet been identified as belonging to any particular operating state. Data scaler 1120 may scale the sample matrix $X_j$ with respect to operating state k using the following equation:

$$\bar{X}_{jk}=(X_j-1_m b_k^T)V_k^{-1}$$

where $V_k$ is the standard deviation for state k, $b_k$ is the mean for state k, and the matrix $\bar{X}_{jk}$ is the sample matrix $X_j$ scaled with respect to operating state k. In some embodiments, data scaler 1120 scales each sample matrix X with respect to each of the operating states. For example, data scaler 1120 may iteratively scale sample matrix $X_j$ from each operating state $j \in \Re^N$ with respect to each of the other operating states $k \in \Re^{N-1}$, where N is the total number of operating states. Data scaler 1120 may provide the scaled sample matrices $\bar{X}_{jk}$ to direction extractor 1126 for use in determining the direction $\theta_{jk}$ of state j from the perspective of state k (described in greater detail below).

In some embodiments, data scaler 1120 uses the mean b and/or standard deviation V for a particular operating state (i.e., state k) to scale the covariance matrix S for the same operating state. For example, data scaler 1120 may scale the covariance matrix $S_k$ using the following equation:

$$\bar{S}=\frac{1}{m}\bar{X}^T\bar{X}$$
$$\bar{S}=\frac{1}{m}V_k^{-1}(X^T X - mb_k b_k^T)V_k^{-1}$$
$$\bar{S}=V_k^{-1}S_k V_k^{-1}$$

where $V_k$ is the standard deviation for state k, $b_k$ is the mean for state k, and the matrix $\bar{S}$ is the scaled covariance matrix S for state k. In some embodiments, data scaler 1120 determines the scaled covariance matrix $\bar{S}$ for each of the operating states. For example, data scaler 1120 may iteratively calculate the scaled covariance matrix $\bar{S}$ for each operating state k, where $k \in \Re^N$ and N is the total number of operating states. Data scaler 1120 may provide the scaled covariance matrices $\bar{S}$ to PCA modeler 1128 for use in generating a PCA model 1130 for each operating state.

Still referring to FIG. 11, memory 1116 is shown to include a principal component analysis (PCA) modeler 1128. PCA modeler 1128 can be configured to generate model parameters 1132 for the PCA models 1130 used by predictive diagnostics system 502 to perform the fault detection and diagnostic processes described herein. In some embodiments, PCA modeler 1128 generates model parameters 1132 by performing singular value decomposition (SVD) on the scaled covariance matrices $\bar{S}$ generated by data scaler 1120. SVD is a statistical technique in which a factorization of the form $\bar{S}=UDU^T$ is obtained from a real or complex matrix (i.e., the scaled covariance matrix $\bar{S}$). PCA modeler 1128 may factor each of the scaled covariance matrices $\bar{S}$ as shown in the following equation:

$$\bar{S} = UDU^T$$

$$\bar{S} = [P \quad \tilde{P}] \begin{bmatrix} \Lambda & 0 \\ 0 & \tilde{\Lambda} \end{bmatrix} [P \quad \tilde{P}]^T$$

$$\bar{S} = P\Lambda P^T + \tilde{P}\tilde{\Lambda}\tilde{P}^T$$

where the matrix P represents the loadings of the PCA model and consists of the first 1 singular vectors in U that correspond to the largest 1 singular values in D. These singular values are represented in $\Lambda$. The residuals of the singular values are stored in $\tilde{\Lambda}$ and the residuals of the vectors are stored in $\tilde{P}$. In some embodiments, the singular values $\Lambda$ and $\tilde{\Lambda}$ and the vectors P and $\tilde{P}$ are the model parameters 1132.

In some embodiments, the SVD process performed by PCA modeler 1128 uses only the scaled covariance matrix $\bar{S}$ for a given state to generate the model parameters 1132 for the corresponding PCA model 1130. Advantageously, this feature allows PCA modeler 1128 to generate model parameters 1132 for PCA models 1130 without requiring the sample data (i.e., the sample vectors x and/or the sample matrices X) to be stored or maintained in memory once the scaled covariance matrices $\bar{S}$ are generated. The PCA models 1130 generated by PCA modeler 1128 can be used to reconstruct the original scaled covariance matrices $\bar{S}$. If the means b and standard deviations V of the sample data are known, the original covariance matrices S can also be reconstructed. The reconstruction of these matrices can be used by various components of predictive diagnostics system 502 for fault detection and diagnostics.

PCA modeler 1128 can be configured to generate and store a PCA model 1130 for each of a plurality of operating states. The stored PCA models 1130 define a library of operating states that can be identified for new samples of the monitored variables. For example, when a new sample x of the monitored variables is obtained, the sample x can be scaled by data scaler 1120 and indexed by sample indexer 1122 with respect to one or more of the stored operating states (e.g., using the PCA model parameters 1132 for the operating state). Fault detector 1124 may determine whether the sample is associated with a particular operating state by comparing the sample index I(x) with control limits $\zeta^2$ for the operating state. If the sample index I(x) is not within the control limits $\zeta^2$ for any of the stored operating states, fault diagnoser 1138 may perform a voting-based fault diagnosis to determine which of the operating states is the current operating state. The indexing, fault detection, and diagnostic processes are described in greater detail below.

Still referring to FIG. 11, memory 1116 is shown to include a sample indexer 1122. Sample indexer 1122 can be configured to generate fault detection indices for samples x of the monitored variables. Sample indexer 1122 is shown receiving the scaled sample vectors x from data scaler 1120. In some embodiments, sample indexer 1122 uses the scaled sample vectors to generate fault detection indices. For example, sample indexer 1122 may generate fault detection indices using the following equation:

$$I(x) = x^T M x$$

where I(x) is the fault detection index, x is the scaled sample vector $\bar{x}$ generated by data scaler 1120, and M is a matrix of the detection index for a particular operating state.

In some embodiments, the matrix M is a function of the model parameters 1132 for a given PCA model 1130 (i.e., for a particular operating state). For example, sample indexer 1122 may calculate the matrix M using the following equation:

$$M = \frac{P\Lambda^{-1}P^T}{\tau^2} + \frac{\tilde{P}\tilde{P}^T}{\delta^2}$$

where P, $\Lambda$, and $\tilde{P}$ are model parameters 1132 generated by PCA modeler 1128 for the operating state. The parameters $\tau^2$ and $\delta^2$ can be control limits of the Hotelling's $T^2$ statistic and the squared prediction error (SPE), respectively. Sample indexer 1122 may calculate $\tau^2$ using the following equation:

$$\tau^2 = \chi_\alpha^2(l)$$

where the term $\chi_\alpha^2(l)$ represents the inverse value of a chi square distribution with l degrees of freedom and a confidence level of $(1-\alpha) \times 100\%$. Sample indexer 1122 may calculate the control limit $\delta^2$ using the following equation:

$$\delta^2 = g_s \chi_\alpha^2(h_s)$$

where $$g_s = \frac{\omega_2}{\omega_1}, \quad h_s = \frac{\omega_1^2}{\omega_2}, \quad \omega_1 = \sum_{i=l+1}^{n} \lambda_i, \text{ and } \omega_2 = \sum_{i=l+1}^{n} \lambda_i^2.$$

$\omega_1 = \sum_{i=l+1}^{n} \lambda_i$, and $\omega_2 = \sum_{i=l+1}^{n} \lambda_i^2$. The parameter $\lambda_i$ can be the ith singular value of the scaled covariance matrix $\bar{S}$ for the operating state. In some embodiments, sample indexer 1122 calculates the matrix of the detection index $M_k$ and the corresponding fault detection index $I(x)_k$ for each operating state $k \in \mathfrak{R}^N$.

Sample indexer 1122 may generate control limits $\zeta^2$ for the fault detection indices I(x). In some embodiments, the control limit $\zeta^2$ is a function of the model parameters 1132 for a given PCA model 1130 (i.e., for a particular operating state). For example, sample indexer 1122 may calculate the control limit $\zeta^2$ using the following equation:

$$\zeta^2 = g_z \chi_\alpha^2(h_z)$$

where $g_z$ and $h_z$ are defined as follows:

$$g_z = \frac{tr\{\bar{S}M\}^2}{tr\{\bar{S}M\}},$$

$$h_z = \frac{[tr\{\bar{S}M\}]^2}{tr\{\bar{S}M\}^2}$$

and the term tr{ } denotes the trace operator. The trace operator tr{ } can be defined as the sum of the elements along the main diagonal (i.e., from upper left to bottom right) of the matrix within the brackets (i.e., the product matrix $\bar{S}M$). In some embodiments, sample indexer 1122 calculates the control limit $\zeta_k^2$ for each operating state $k \in \mathfrak{R}^N$. Sample indexer 1122 may provide the fault detection indices I(x) and the control limits $\zeta^2$ to fault detector 1124.

Still referring to FIG. 11, memory 1116 is shown to include a fault detector 1124. Fault detector 1124 can be configured to determine whether a given sample x is normal or faulty with respect to a particular operating state. Fault detector 1124 is shown receiving the fault detection indices I(x) and the control limits $\zeta^2$ from sample indexer 1122. As described above, both the fault detection index I(x) and the control limit $\zeta^2$ can be a function of the model parameters 1132 for a particular operating state (e.g., state k). The fault detection index I(x) may also be a function of the sample vector x scaled to the particular operating state (e.g., $\bar{x}_k$).

Fault detector 1124 may determine whether a given sample x is normal or faulty with respect to an operating state by comparing the fault detection index I(x) for the sample with the control limit $\zeta^2$. For example, fault detector 1124 may determine that the sample x is normal with respect to state k if the fault detection index for the sample (scaled to state k) is within the control limit $\zeta^2$ for state k (i.e., $I(x)_k \leq \zeta_k^2$). A sample that is normal with respect to state k indicates that the monitored system, device, or process is operating in state k when the sample is obtained. Fault detector 1124 may determine that the sample x is faulty with respect to state k if the fault detection index for the sample (scaled to state k) is not within the control limit $\zeta^2$ for state k (i.e., $I(x)_k > \zeta_k^2$). A sample that is faulty with respect to state k indicates that the monitored system, device, or process is not operating in state k when the sample is obtained.

In some embodiments, fault detector 1124 iterates through each of the operating states $k \in \Re^N$, comparing the fault detection index $I(x)_k$ of the sample for the sample with the control limit $\zeta_k^2$. Fault detector 1124 may identify state k as the current operating state in response to a determination that the fault detection index $I(x)_k$ is within the control limit $\zeta_k^2$. If fault detector 1124 is unable to identify a current operating state, fault diagnoser 1138 may perform a voting-based diagnosis to identify the current operating state. This may occur when the fault detection index $I(x)_k$ is not within the control limit $\zeta_k^2$ for any of the stored operating states $k \in \Re^N$. For example, if fault detector 1124 determines that the fault detection index $I(x)_k$ is not within the corresponding control limit $\zeta_k^2$ for any of the stored operating states, fault detector 1124 may trigger fault diagnoser 1138 to perform the voting-based diagnosis.

Once a current operating state has been identified (by fault detector 1124 and/or fault diagnoser 1138), fault detector 1124 may determine whether the identified operating state is normal or faulty. For example, fault detector 1124 may access a stored list, database, or other mapping that indicates which operating states are normal and which operating states are faulty. If the identified operating state is a normal operating state, fault detector 1124 may not output a fault detection 1134. However, if the identified operating state is a faulty operating state, fault detector 1124 may output a fault detection 1134. Fault detections 1134 can be stored in memory and/or communicated to client devices 448, remote systems and applications 444, building subsystems 428, or any other external system or device.

Still referring to FIG. 11, memory 1116 is shown to include a direction extractor 1126. Direction extractor 1126 can be configured to determine directions between various sets of the monitored variables. In some embodiments, the directions include vectors that indicate the direction $\theta_{jk}$ of a given operating state (e.g., state j characterized by sample matrix $X_j$) from the perspective of another operating state (e.g., state k characterized by sample matrix $X_k$). Several examples of such vectors are shown in FIGS. 7B-10B. In some embodiments, the directions include vectors that indicate the direction $\theta_{jk}$ of a set of faulty samples $X_f$ that have not yet been identified as belonging to a particular operating state.

Direction extractor 1126 is shown receiving the scaled sample matrices $\bar{X}_{jk}$ from data scaler 1120. As previously described, the scaled sample matrix $\bar{X}_{jk}$ denotes the sample matrix $X_j$ from state j that has been scaled with respect to state k (i.e., using the mean $b_k$ and standard deviation $V_k$ from state k). For example, data scaler 1120 may calculate the scaled sample matrix $\bar{X}_{jk}$ using the following equation:

$$\bar{X}_{jk} = (X_j - 1_m b_k^T) V_k^{-1}$$

where $V_k$ is the standard deviation for state k, $b_k$ is the mean for state k, and the matrix $\bar{X}_{jk}$ is the sample matrix $X_j$ scaled with respect to operating state k. The scaled sample matrix $\bar{X}_{jk}$ may also represent the sample matrix $X_f$ that has been scaled with respect to state k by substituting $X_f$ for $X_j$ in the previous equation.

In some embodiments, direction extractor 1126 determines the direction $\theta_{jk}$ by performing singular value decomposition (SVD) on the scaled sample matrix $\bar{X}_{jk}$. For example, direction extractor 1126 may factor the scaled sample matrix $\bar{X}_{jk}$ as shown in the following equation:

$$\bar{X}_{jk} = L_{jk} D_{jk} L_{jk}^T$$

where the matrix $L_{jk}$ consists of n singular vectors $L_{jk} = [I_1 \ I_2 \ \ldots \ I_n]$. Direction extractor 1126 may extract the direction $\theta_{jk}$ from the matrix $L_{jk}$. In some embodiments, direction extractor 1126 selects the left or right singular vector in $L_{jk}$ as the direction $\theta_{jk}$ (e.g., $\theta_{jk} = [I_1]$ or $\theta_{jk} = [I_n]$).

In some embodiments, direction extractor 1126 selects the first l singular vectors in $L_{jk}$ as the direction $\theta_{jk}$, where l is the number of singular vectors that brings the fault detection index of all of the reconstructed samples $z_{jk}$ within the control limit $\zeta_k^2$ (e.g., $\theta_{jk} = [I_1 \ I_2 \ \ldots \ I_l]$). The reconstructed samples $z_{jk}$ can be generated by sample reconstructor 1136 by reconstructing each of the samples in $\bar{X}_{jk}$ along the direction $\theta_{jk}$ (e.g., by subtracting a multiple of $\theta_{jk}$ from each sample, described in greater detail below). The notation $z_{jk}$ indicates that a sample $x_j$ from state j is scaled with respect to state k and reconstructed along the direction $\theta_{jk}$ of state j from the perspective of state k.

In some embodiments, direction extractor 1126 augments $\theta_{jk}$ with the next singular vector in $L_{jk}$ until the direction $\theta_{jk}$ causes the fault detection indices of all the reconstructed samples $z_{jk}$ to be within the control limit $\zeta_k^2$. For example, direction extractor 1126 may initially select $\theta_{jk} = [I_1]$. Sample reconstructor 1136 may reconstruct all of the samples $\bar{X}_{jk}$ along the direction $\theta_{jk} = [I_1]$ to generate reconstructed samples $z_{jk}$. Sample indexer 1122 may calculate fault detection indices $I(z_{jk})$ of the reconstructed samples $z_{jk}$, which can be compared with the control limit by fault detector 1124. If the fault detection indices $I(z_{jk})$ of all the reconstructed samples are within the control limit $\zeta_k^2$, direction extractor 1126 may determine that $\theta_{jk} = [I_1]$. If the fault detection indices $I(z_{jk})$ of all the reconstructed samples are not within the control limit $\zeta_k^2$, direction extractor 1126 may augment $\theta_{jk}$ with the next singular vector in $L_{jk}$ (e.g., $\theta_{jk} = [I_1 \ I_2]$). This process can be repeated until the fault detection indices of all of the samples $z_{jk}$ reconstructed along direction $\zeta_{jk}$ are within the control limit $\zeta_k^2$.

In some embodiments, direction extractor 1126 simplifies the direction extraction process based on the observation that the right singular vectors of $\bar{X}_{jk}$ and $\bar{X}_{jk}^T \bar{X}_{jk}$ are the same. For example, direction extractor 1126 can be configured to calculate the product $\bar{X}_{jk}^T \bar{X}_{jk}$ of the scaled sample matrix $\bar{X}_{jk}$ using the following equation:

$$\bar{X}_{jk}^T \bar{X}_{jk} = V_k^{-1}(X_j^T - b_k 1_{mj}^T)(X_j - 1_{mj} b_k^T) V_k^{-1}$$

$$\bar{X}_{jk}^T \bar{X}_{jk} = V_k^{-1}(X_j^T + m_j(b_j - b_k)(b_j - b_k)^T - m_j b_j b_j^T) V_k^{-1}$$

Direction extractor 1126 may perform singular value decomposition on the smaller matrix $\overline{X}_{jk}^T \overline{X}_{jk}$ as shown in the following equation:

$$\overline{X}_{jk}^T \overline{X}_{jk} = L_{jk} D_{jk}^2 L_{jk}^T$$

where the matrix $L_{jk}$ consists of n singular vectors $L_{jk}=[I_1\ I_2\ \ldots\ I_n]$. Direction extractor 1126 may extract the direction $\theta_{jk}$ from the matrix $L_{jk}$ as previously described. For example, direction extractor 1126 may initially select $\theta_{jk}=[I_1]$ and iteratively augment $\theta_{jk}$ with the next singular vector in $L_{jk}$ (e.g., $\theta_{jk}=[I_1\ I_2]$, $\theta_{jk}=[I_1\ I_2\ I_3]$, etc.) until the direction $\theta_{jk}$ causes the fault detection indices of all the reconstructed samples $z_{jk}$ to be within the control limit $\zeta_k^2$.

In some embodiments, direction extractor 1126 further simplifies the direction extraction process based on the observation that when all of the fault detection indices $I(z_{jk})$ of the reconstructed samples are less than or equal to the control limit $\zeta_k^2$, the sum of all these indices will be less than the control limit $\zeta_k^2$ multiplied by the number of samples m in the scaled sample matrix $\overline{X}_{jk}$. This relationship is shown in the following equation:

$$\sum_{k=1}^{m} x_k^T Q_{jk} x_k \leq m\zeta_k^2$$

where the product $x_k^T Q_{jk} x_k = I(z_{jk})$. Direction extractor 1126 may calculate the matrix $Q_{jk}$ as follows:

$$Q_{jk} = M - M\theta_{jk}(\theta_{jk}^T M \theta_{jk})^{-1} \theta_{jk}^T M$$

where M is calculated based on the model parameters 1132 for state k, as described with respect to sample indexer 1122.

Direction extractor 1126 may apply the trace operator to the sum $\Sigma_{k=1}^{m} x_k^T Q_{jk} x_k$ and simplify the preceding inequality as follows:

$$tr\left\{\sum_{k=1}^{m} x_k^T Q_{jk} x_k\right\} \leq m\zeta_k^2$$

$$\sum_{k=1}^{m} tr\{x_k^T Q_{jk} x_k\} \leq m\zeta_k^2$$

$$\sum_{k=1}^{m} tr\{Q_{jk} x_k x_k^T\} \leq m\zeta_k^2$$

$$tr\left\{Q_{jk} \sum_{k=1}^{m} x_k x_k^T\right\} \leq m\zeta_k^2$$

$$tr\{Q_{jk} \overline{X}_{jk}^T \overline{X}_{jk}\} \leq m\zeta_k^2$$

$$tr\{Q_{jk} \overline{S}_{jk}\} \leq \zeta_k^2$$

where $\overline{S}_{jk}$ is the covariance of the scaled sample matrix $$\overline{X}_{jk} \left(\text{i.e., } \overline{S}_{jk} = \frac{1}{m} \overline{X}_{jk}^T \overline{X}_{jk}\right).$$

Advantageously, this formulation allows direction extractor 1126 to determine the number l of singular vectors in $\theta_{jk}$ using only the trace of the product $Q_{jk} \overline{S}_{jk}$ and the control limit $\zeta_k^2$. For example, direction extractor 1126 may initially select $\theta_{jk}=[I_1]$ and iteratively augment $\theta_{jk}$ with the next singular vector in $L_{jk}$ (e.g., $\theta_{jk}=[I_1\ I_2]$, $\theta_{jk}=[I_1\ I_2\ I_3]$, etc.) until the direction $\theta_{jk}$ causes the trace of $Q_{jk}\overline{S}_{jk}$ to be within the control limit $\zeta_k^2$ (i.e., $tr\{Q_{jk}\overline{S}_{jk}\} \leq \zeta_k^2$).

Still referring to FIG. 11, memory 1116 is shown to include a sample reconstructor 1136. Sample reconstructor 1136 can be configured to reconstruct samples of the monitored variables along the directions to various operating states. For example, sample reconstructor 1136 may receive samples $\overline{x}_k$ of the monitored variables from data scaler 1120, where the notation $\overline{x}_k$ indicates that the samples have been scaled with respect to state k. The scaled samples $\overline{x}_k$ may have an unknown operating state (e.g., new samples of the monitored variables that have not yet been classified as belonging to any operating state) or a known operating state (e.g., training values of the monitored variables that are specified as belonging to a particular operating state j). Sample reconstructor 1136 can be configured to reconstruct the samples $\overline{x}_k$ along the directions $\theta_{jk}$ to each of the other stored operating states $j \in \Re^{N-1}$.

In some embodiments, sample reconstructor 1136 characterizes samples $\overline{x}_k$ of the monitored variables as having a fault-free part $x_k^*$ and a faulty part $f\theta$ with respect to a particular operating state. The fault-free part $x_k^*$ resides within the operating state k, whereas the faulty part $f\theta$ resides outside the operating state k. For example, each sample can be broken into parts, as shown in the following equation:

$$\overline{x}_k = x_k^* + f\theta$$

where the fault-free part $x_k^*$ is representative of a sample from the operating state (e.g., the mean $b_k$ of state k) and the faulty part consists of a fault magnitude f and a fault direction $\theta$.

Sample reconstructor 1136 may receive the directions $\theta_{jk}$ from direction extractor 1126 and the scaled samples $\overline{x}_k$ from data scaler 1120. In some embodiments, sample reconstructor 1136 receives multiple scaled values of the same sample, where each scaled value is scaled to a different operating state. For example, data scaler 1120 may provide sample reconstructor 1136 with a sample $\overline{x}_k$ scaled to each operating state $k \in \Re$. Similarly, direction extractor 1126 may provide sample reconstructor 1136 with directions $\theta_{jk}$ from each known operating state k to each other known operating state $j \in \Re^{N-1}$.

Sample reconstructor 1136 may reconstruct the samples $\overline{x}_k$ along the directions $\theta_{jk}$. Reconstructing a sample $\overline{x}_k$ along a direction $\theta_{jk}$ can include finding the value $f_{jk}$ that minimizes the fault detection index of the reconstructed measurement $z_{jk}$, where $z_{jk}$ is defined as follows:

$$z_{jk} = \overline{x}_k - f_{jk}\theta_{jk}$$

The value $f_{jk}$ that minimizes the fault detection index of the reconstructed measurement $z_{jk}$ can be calculated using the following equation:

$$f_{jk} = (\theta_{jk}^T M \theta_{jk})^{-1} \theta_{jk}^T M \overline{x}_k$$

In the preceding two equations, $\theta_{jk}$ is the assumed direction of the fault from the perspective of state k. However, it should be understood that the assumed direction $\theta_{jk}$ does not necessarily correspond to the actual direction of the fault (i.e., the actual direction of the deviation of the sample relative to state k). In some embodiments, sample reconstructor 1136 reconstructs each sample $\overline{x}_k$ along multiple different directions $\theta_{jk}$, where each direction represents a direction from state k to one of the other operating states j. For example, sample reconstructor 1136 may reconstruct the sample $\overline{x}_k$ along each direction $\theta_{jk}$, where $j \in \Re^{N-1}$.

Sample reconstructor 1136 may calculate the reconstructed contribution of the sample $\bar{x}_k$ along each direction $\theta_{jk}$. In some embodiments, sample reconstructor 1136 calculates the reconstructed contribution of the sample $\bar{x}_k$ using the following equation:

$$RBC_{jk} = \bar{x}_k^T M \theta_{jk} (\theta_{jk}^T M \theta_{jk})^{-1} \theta_{jk}^T M \bar{x}_k$$

where $RBC_{jk}$ is the reconstruction-based contribution (RBC) of the sample $\bar{x}_k$ along the direction $\theta_{jk}$. Sample reconstructor 1136 may provide the reconstruction-based contributions $RBC_{jk}$ to fault predictor 1146 for use in predicting faults that have not yet occurred.

Sample reconstructor 1136 may use sample indexer 1122 to calculate the fault detection index $I(z_{jk})$ of each reconstructed sample. In some embodiments, sample indexer 1122 calculates the fault detection indices $I(z_{jk})$ using the following equation:

$$I(z_{jk}) = \bar{x}_k^T (M - M\theta_{jk}(\theta_{jk}^T M\theta_{jk})^{-1}\theta_{jk}^T M)\bar{x}_k = \bar{x}_k^T Q_{jk} \bar{x}_k$$

where $Q_{jk} = M - M\theta_{jk}(\theta_{jk}^T M \theta_{jk})^{-1}\theta_{jk}^T M$. Sample indexer 1122 may provide the fault detection indices $I(z_{jk})$ to fault diagnoser 1138.

Still referring to FIG. 11, memory 1116 is shown to include a fault diagnoser 1138. Fault diagnoser 1138 can be configured to perform a voting-based fault diagnosis to determine the operating state for a sample x of the monitored variables. In some embodiments, the voting-based fault diagnosis is performed when fault detector 1124 fails to identify the current operating state of a new sample x of the monitored variables. For example, each new sample x of the monitored variables can be scaled with respect to each operating state $k \in \mathfrak{R}^N$ by data scaler 1120. Sample indexer 1122 may index each scaled sample $\bar{x}_k$ to produce a fault detection index $I(x)$ with respect to state k. Fault detector 1124 may iteratively compare each fault detection index $I(x)$ to the control limit $\zeta_k^2$ for the corresponding state. For each state k, if the fault detection index $I(x)$ is within the control limit $\zeta_k^2$ (i.e., $I(x) \leq \zeta_k^2$), fault detector 1124 may determine that state k is the current operating state. However, if the fault detection index $I(x)$ is not within the control limit $\zeta_k^2$ (i.e., $I(x) > \zeta_k^2$), fault detector 1124 may determine that state k is not the current operating state. Fault detector 1124 may iterate through each state k until the current operating state is identified or all of the operating states are exhausted. If fault detector 1124 fails to identify the current operating state, fault diagnoser 1138 may perform the voting-based fault diagnosis.

In some embodiments, the voting-based fault diagnosis includes determining which of the stored operating states $j \in \mathfrak{R}^{N-1}$ has the same or similar direction $\theta_{jk}$ as the new sample x of the monitored variables from the perspective of each operating state $k \in \mathfrak{R}^N$. Each operating state k may generate a vote for one of the other operating states j (or for an unknown operating state) based on the directions $\theta_{jk}$ of the other operating states j from the perspective of state k. As described above, each new sample x of the monitored variables can be scaled with respect to each operating state k by data scaler 1120. This results in a set of N scaled samples $\bar{x}_k$ for each actual sample x of the monitored variables. Each scaled sample $\bar{x}_k$ can be reconstructed by sample reconstructor 1136 along the directions $\theta_{jk}$ to each of the other operating states j. This results in a set of N×(N−1) reconstructed samples $z_{jk}$ for each actual sample x of the monitored variables. Each reconstructed sample $z_{jk}$ can be indexed by sample indexer 1122, producing a set of N×(N−1) fault detection indices $I(z_{jk})$.

Fault diagnoser 1138 may compare each fault detection index $I(z_{jk})$ to the control limit $\zeta_k^2$ for the corresponding state k. If the fault detection index $I(z_{jk})$ is within the control limit $\zeta_k^2$ ((i.e., $I(z_{jk}) \leq \zeta_k^2$), fault diagnoser 1138 may determine that the direction $\theta_{jk}$ is the actual direction of the fault from the perspective of state k. In response to determining that the direction $\theta_{jk}$ is the actual direction of the fault from the perspective of state k, fault diagnoser 1138 may record a vote for state j (e.g., incrementing a stored value associated with state j). However, if the fault detection index $I(z_{jk})$ is not within the control limit $\zeta_k^2$ (i.e., $I(z_{jk}) > \zeta_k^2$), fault diagnoser 1138 may determine that the direction $\theta_{jk}$ is not the actual direction of the fault from the perspective of state k and may not record a vote for state j. In some embodiments, fault diagnoser 1138 records votes using the following voting algorithm:

$$V_{jk} = \begin{cases} 1, & \text{if } I(z_{jk}) \leq \zeta_k^2 \\ 0, & \text{otherwise} \end{cases}$$

where $V_{jk}$ is a variable indicating a vote for state j from the perspective of state k. A value of $V_{jk}=1$ indicates that an affirmative vote was recorded for state j from the perspective of state k, whereas a value of $V_{jk}=0$ indicates that a non-affirmative vote was recorded for state j from the perspective of state k.

Fault diagnoser 1138 may repeat this process for each of the stored operating states k, recording a vote from the perspective of each operating state k. Each state k may vote for one or more of the other stored states j or for an unknown state. A state k may vote for an unknown state if none of the fault detection indices $I(z_{jk})$ are within the control limit $\zeta_k^2$ for the corresponding state k. Once the votes are recorded from the perspective of each state k, fault diagnoser 1138 may determine which of the operating states has the most votes. Fault diagnoser 1138 may determine that the state with the most votes is the current operating state and may provide such information as fault diagnoses 1142. In some embodiments, fault diagnoser 1138 counts votes using the following counting algorithm:

$$V_j^T = \sum_{k=1}^{N} V_{jk}$$

where $V_j^T$ is a variable representing the total number of votes for state j from each of states k $\mathfrak{R}^N$ and $V_{jk}$ is either 1 (if state k voted for state j) or 0 (if state k did not vote for state j).

Still referring to FIG. 11, predictive diagnostics system 502 is shown to include a fault predictor 1146. Fault predictor 1146 uses a PCA-based prediction technique to predict future faults. Fault predictor 1146 can determine a direction in which a series of samples x are moving and can predict whether the samples x will reach a known operating state (e.g., a known fault state, a known normal state, etc.). Fault predictor 1146 can determine a proximity of a sample x to the known operating state and can estimate how long it will take the samples x to reach the known operating state. If the samples x are moving toward a known faulty state, fault predictor 1146 can generate a fault prediction that provides advance warning of a fault associated with the known faulty state, along with an estimated time at which the fault is predicted to occur.

In some embodiments, fault predictor 1146 performs the fault prediction when fault detector 1124 fails to identify the current operating state of a new sample x of the monitored variables 1106. For example, each new sample x of the monitored variables 1106 can be scaled with respect to each operating state $k \in \mathfrak{R}^N$ by data scaler 1120. Sample indexer 1122 may index each scaled sample $\bar{x}_k$ to produce a fault detection index I(x) with respect to state k. Fault detector 1124 may iteratively compare each fault detection index I(x) to the control limit $\zeta_k^2$ for the corresponding state. For each state k, if the fault detection index I(x) is within the control limit $\zeta_k^2$ (i.e., $I(x) \leq \zeta_k^2$), fault detector 1124 may determine that state k is the current operating state. However, if the fault detection index I(x) is not within the control limit $\zeta_k^2$ (i.e., $I(x) > \zeta_k^2$), fault detector 1124 may determine that state k is not the current operating state. Fault detector 1124 may iterate through each state k until the current operating state is identified or all of the operating states are exhausted. If fault detector 1124 fails to identify the current operating state, fault predictor 1146 may perform the fault prediction.

In some embodiments, fault predictor 1146 uses the reconstruction-based contributions (RBCs) generated by sample reconstructor 1136 to predict fault occurrences. As described above, each reconstruction-based contribution $RBC_{jk}$ is the reconstructed contribution of the sample $\bar{x}_k$ along the direction $\theta_{jk}$ (i.e., the direction from the current monitoring state k to another state j for which a PCA model has been constructed). The direction $\theta_{jk}$ with the largest RBC value indicates that the sample x is moving in that direction. In some embodiments, fault predictor 1146 compares the RBC values $RBC_{jk}$ calculated for each direction $\theta_{jk}$ ($j \in \mathfrak{R}^{N-1}$) with respect to the current monitoring state k. Fault predictor 1146 may identify the direction $\theta_{jk}$ with the largest RBC value $RBC_{jk}$ and select the operating state j corresponding to the direction $\theta_{jk}$ as the operating state toward which sample x is moving. In some embodiments, fault predictor 1146 calculates a set of RBC values $RBC_{jk}$ ($j \in \mathfrak{R}^{N-1}$) for multiple consecutive samples of the monitored variables 1106. If the same direction $\theta_{jk}$ has the largest RBC value for multiple consecutive samples, fault predictor 1146 may select the operating state j corresponding to the direction $\theta_{jk}$ as the operating state toward which sample x is moving.

Fault predictor 1146 can determine a proximity of the sample x to one or more of the operating states j. In some embodiments, fault predictor 1146 calculates the proximity of the sample x to a particular operating state j in response to a determination that the sample x is moving toward that operating state. In some embodiments, fault predictor 1146 calculates the proximity of sample x to each operating state $j \in \mathfrak{R}^{N-1}$. The proximity metric for a given operating state j indicates how close the sample x is to that operating state j. In some embodiments, fault predictor 1146 calculates the proximity metric using the following equation:

$$p_j(x) = -\log(I(x)_j)$$

where $p_j(x)$ is the proximity of sample x to operating state j, and $I(x)_j$ is the fault detection index of the sample x with respect to operating state j. The fault detection index $I(x)_j$ can be calculated by sample indexer 1122 as previously described. The values for the proximity metric $p_j(x)$ range from negative infinity to negative one (i.e., $-\infty \leq p_j(x) \leq 1$). If the sample x is already inside the operating state j, fault predictor 1146 may set the proximity metric $p_j(x)$ equal to negative one. Larger values of the proximity metric $p_j(x)$ indicate that the sample x is closer to the operating state j, whereas smaller values of the proximity metric $p_j(x)$ indicate that the sample x is further from the operating state j.

In some embodiments, fault predictor 1146 uses the proximity metric $p_j(x)$ to determine whether the sample x is moving toward a particular operating state j. For example, fault predictor 1146 can calculate the proximity metric $p_j(x)$ for multiple consecutive samples x of the monitored variables 1106. If the proximity metric $p_j(x)$ for a given operating state j increases from one sample to the next, fault predictor 1146 can determine that the samples are moving toward the operating state j. In some embodiments, fault predictor 1146 determines that the samples x are moving toward the operating state j in response to a determination that the proximity metric $p_j(x)$ for operating state j is greater than a threshold value. In some embodiments, fault predictor 1146 determines that the samples x are moving toward the operating state j in response to a determination that multiple consecutive samples x have a proximity metric $p_j(x)$ greater than a threshold value.

In some embodiments, fault predictor 1146 calculates the proximity metric $p_j(x)$ for each operating state $j \in \mathfrak{R}^{N-1}$ for a given sample x. Fault predictor 1146 can compare the proximity metrics $p_j(x)$ to each other to determine which operating state j is most proximate to the sample x. For example, fault predictor 1146 can identify the operating state j with the largest proximity metric $p_j(x)$ as the operating state most proximate to the sample x. In some embodiments, fault predictor 1146 determines that the samples are moving toward a particular operating state j in response to a determination that the same operating state j is most proximate to multiple consecutive samples x of the monitored variables 1106.

In some embodiments, fault predictor 1146 uses the proximity metric $p_j(x)$ to predict the occurrence of a fault. For example, fault predictor 1146 can determine that a fault is likely to occur in response to the proximity metric $p_j(x)$ crossing a proximity threshold. If the operating state j toward which the samples x are moving is a faulty state, fault predictor 1146 can identify a particular fault associated with the faulty state j. Each faulty state j can be associated with a fault that occurs in a set of training data used to model the faulty state j. For example, predictive diagnostics system 502 may construct a PCA model for the faulty state j using a set of training data collected immediately prior to the connected equipment 610 providing a particular fault code. Predictive diagnostics system 502 can associate the fault code and/or fault identified by the fault code with the operating state j constructed from the set of training data collected prior to the fault code. When fault predictor 1146 determines that the samples x are moving toward the faulty state j, fault predictor 1146 can identify the fault associated with faulty state j and predict another occurrence of the identified fault.

In some embodiments, fault predictor 1146 predicts the occurrence of a fault using the fault detection index $I(x)_j$ of a sample x for the faulty state j. For example, fault predictor 1146 can compare the fault detection index $I(x)_j$ to a threshold value. In some embodiments, the threshold value is the control limit $\zeta_j^2$ for faulty state j. If the fault detection index $I(x)_j$ is within the control limit $\zeta_j^2$ (i.e., $I(x) \leq \zeta_j^2$), fault predictor 1146 can determine that faulty state j is the current operating state and can predict the occurrence of a fault associated with faulty state j.

In some embodiments, fault predictor 1146 predicts when a particular fault will occur. For example, fault predictor 1146 can extrapolate a series of values of the proximity metric $p_j(x)$ to determine when the proximity metric $p_j(x)$ will cross a threshold value. In some embodiments, the threshold value is the value of the proximity metric $p_j(x)$ at which the fault previously occurred in the training data used to construct the PCA model for the faulty state j. Fault predictor 1146 can predict that the fault will occur at a time when the proximity metric $p_j(x)$ is estimated to reach the threshold value based on the extrapolation.

In some embodiments, the threshold value is a value of the proximity metric $p_j(x)$ that occurs in the training data before the connected equipment 610 reports the fault. Fault predictor 1146 can use the training data to determine a time interval $\Delta T$ between a time $t_1$ at which the proximity metric $p_j(x)$ crosses the threshold value and a time $t_2$ at which the fault occurs (i.e., $\Delta T = t_2 - t_1$). When fault predictor 1146 determines that the proximity metric $p_j(x)$ crosses the threshold value at a new time $t_3$, fault predictor 1146 can estimate the time $t_4$ at which the fault will occur as the time $t_3$ plus the time interval $\Delta T$ (i.e., fault time $t_4 = t_3 + \Delta T$).

In some embodiments, fault predictor 1146 generates fault predictions 1150. Fault predictions 1150 may identify a particular fault, a particular device of connected equipment 610 in which the fault is predicted to occur, and/or an estimated time at which the fault is estimated to occur. Fault predictions 1150 can include fault indications as well as recommended actions to repair connected equipment 610 to prevent the fault from occurring. In some embodiments, fault predictor 1146 provides the fault predictions 1150 to building controller 1144. Building controller 1144 can use the fault predictions to perform an automated control action. For example, building controller 1144 can perform automated preventative actions to prevent the identified faults from occurring (described in greater detail below).

Still referring to FIG. 11, memory 1116 is shown to include a model updater 1140. Model updater 1140 can be configured to update the PCA models 1130 with new samples of the monitored variables. For example, a given state k can be modeled by PCA modeler 1128 with an existing data set $X_j$ which includes $m_1$ samples of the monitored variables. Model updater 1140 may add a new set of data $X_2$ with $m_2$ samples to the existing data set. The updated data set becomes $X_u = [X_1^T \ X_2^T]$ with $m_u = m_1 + m_2$.

Model updater 1140 may calculate the product matrix $X_u^T X_u$ and mean $b_u$ of the updated data set $X_u$ using the following equations:

$$X_u^T X_u = X_1^T X_1 + X_2^T X_2$$

$$b_u = \frac{1}{m_u} X_u^T 1_{m_u}$$

where $1_{m_u} = [1_{m_1} \ 1_{m_2}]^T$. Accordingly, the mean $b_u$ can be simplified as follows:

$$b_u = \frac{1}{m_u} X_1^T 1_{m_1} + \frac{1}{m_u} X_2^T 1_{m_2}$$

$$b_u = \frac{m_1}{m_u} b_1 + \frac{m_2}{m_u} b_2$$

Data scaler 1120 may use the product matrix $X_u^T X_u$ to calculate the covariance matrix $S_u$ and standard deviation $V_u$ of the updated data set $X_u$ as shown in the following equations:

$$S_u = \frac{1}{m_u}(X_u^T X_u - m_u b_u b_u^T)$$

$$V_u = \sqrt{\mathrm{diag}(S_u)}$$

PCA modeler 1128 may use these variables as updated model parameters 1132 to update PCA models 1130.

Still referring to FIG. 11, memory 1116 is shown to include a building controller 1144. Building controller 1144 can be configured to control one or more buildings, building systems, or building subsystems. For example, building controller 1144 may utilize closed loop control, feedback control, PI control, model predictive control, or any other type of automated building control methodology to generate control signals for the connected equipment 610. In some embodiments, building controller 1144 uses the fault detections, fault diagnoses, and/or detected operating states to determine an appropriate control signal 1148 for the connected equipment 610. In other words, the control signals generated by building controller 1144 can be based on the current operating state, as determined by fault detector 1124 and/or fault diagnoser 1138. [0200] In some embodiments, building controller 1144 receives the fault predictions 1150 from fault predictor 1146. Building controller 1144 can use the fault predictions 1150 to perform automated control actions to prevent the predicted faults from occurring. For example, building controller 1144 can automatically cause connected equipment 610 to enter a safety mode or shut down when a fault is predicted to occur (e.g., by providing a control signal 1148 to connected equipment 610).

In some embodiments, building controller 1144 controls connected equipment 610 using an automated staging algorithm. For example, connected equipment 610 can include array of chillers which can be staged automatically to accommodate varying loads. In response to a predicted fault in a particular chiller, building controller 1144 can remove the chiller from the array of chillers in the control algorithm so that the automatic staging does not include the chiller for which the fault is predicted. This allows the chiller to be taken offline for maintenance without affecting the performance of the staging algorithm.

In some embodiments, building controller 1144 automatically compensates for the fault before the fault occurs. For example, building controller 1144 can identify a decrease in performance or efficiency estimated to result from the predicted fault. Building controller 1144 can automatically adjust the efficiency or expected performance of the connected equipment in an automated control algorithm that uses the efficiency or expected performance to determine an appropriate control signal for the connected equipment. For example, if the predicted fault is expected to reduce chiller output by 25%, building controller 1144 can automatically increase the control signal provided to the chiller by 25% to preemptively compensate for the expected decrease in performance. If the predicted fault is expected to increase chilled water temperature by a predetermined number of degrees, building controller 1144 can automatically reduce the chilled water setpoint by the predetermined number of degrees so that the actual chilled water temperature will remain at the desired temperature.

Building controller 1144 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 1110. In some embodiments, building controller 1144 receives samples of the monitored variables. Building controller 1144 may apply the monitored variables and/or other inputs to a control algorithm or model (e.g., a building energy use model) to determine an output for one or more building control devices (e.g., dampers, air handling units, chillers, boilers, fans, pumps, etc.) in order to affect a variable state or condition within the building (e.g., zone temperature, humidity, air flow rate, etc.). Building controller 1144 may operate the building control devices to maintain building conditions within a setpoint range, to optimize energy performance (e.g., to minimize energy consumption, to minimize energy cost, etc.), and/or to satisfy any constraint or combination of constraints as can be desirable for various implementations.

State Modeling Process

Figure 12:
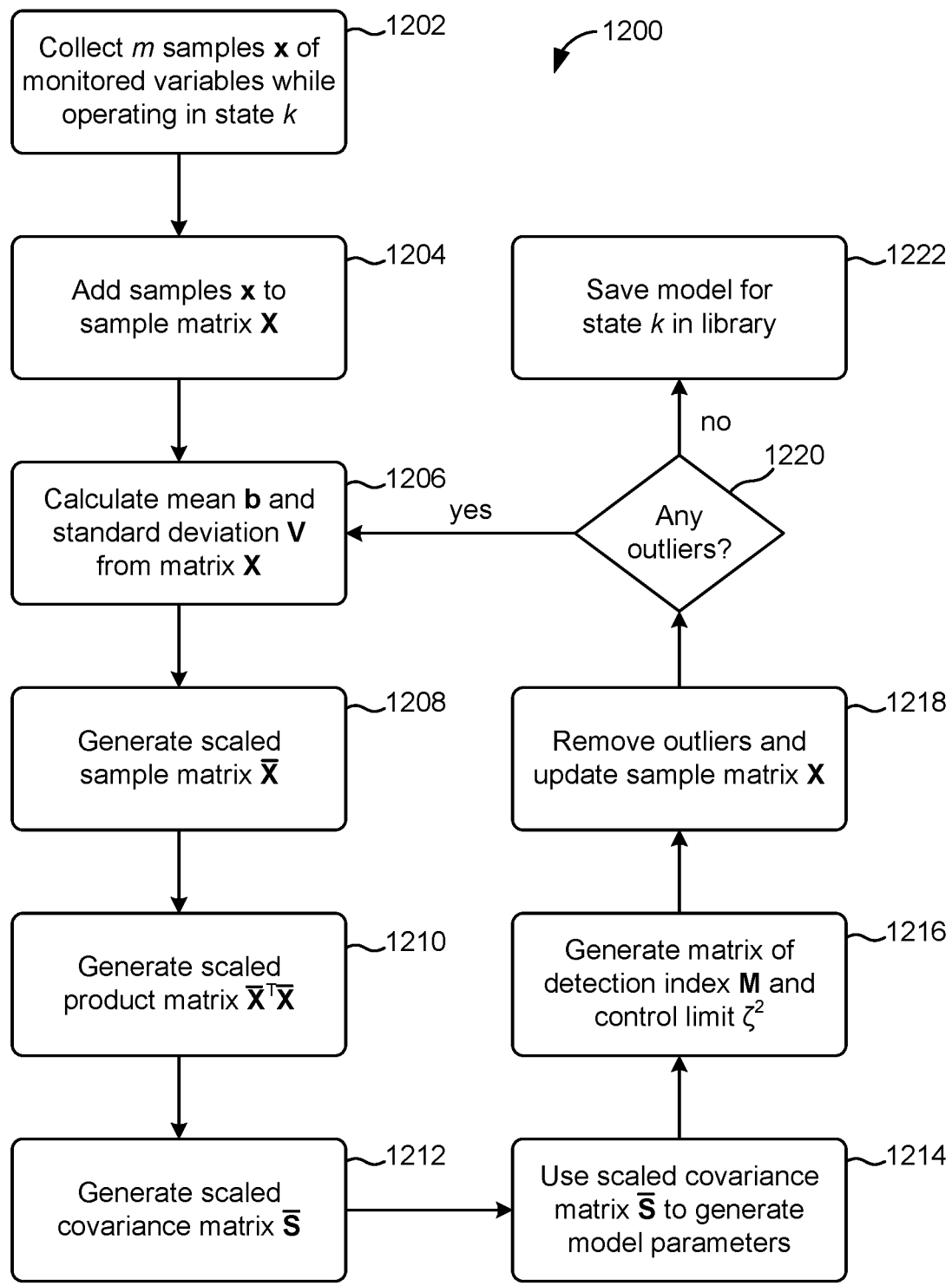
FIG. 12 is a flow diagram of a technique which can be used by the predictive diagnostics system to generate a PCA model of a state, according to some embodiments.

Referring now to FIG. 12, a flowchart of a process 1200 for generating a PCA model of a state is shown, according to some embodiments. Process 1200 can be performed by predictive diagnostics system 502 and/or various components thereof to generate and store PCA models 1130 for a plurality of operating states. In some embodiments, process 1200 is performed once for each operating state to generate a PCA model for that state. Process 1200 can be repeated any number of times to generate any number of PCA models.

Process 1200 is shown to include collecting m samples x of monitored variables while operating in state k (step 1202). In some embodiments, step 1202 is performed by variable monitor 1118, as described with reference to FIG. 11. The monitored variables may indicate the performance of a monitored system, device, or process. For example, the monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1202 can include organizing samples of the n time-series variables in a sample vector x, where $x \in \mathfrak{R}^n$. The values of the monitored variables in a sample vector x can be recorded or collected at the same time (e.g., measurements of the monitored variables at a particular time). Step 1202 can include collecting m samples of each of the n time-series variables (e.g., at n different times).

Still referring to FIG. 12, process 1200 is shown to include adding the samples x to a sample matrix X (step 1204). Step 1204 can include generating sample matrix X, where $X \in \mathfrak{R}^{m \times n}$. The sample matrix X can include m samples of each of the n time-series variables, as shown in the following equation:

$$X = [x_1 x_2 \ldots x_m]^T$$

where each of the m sample vectors x (e.g., $x_1$, $x_2$, etc.) includes a value for each of the n time-series variables.

In some embodiments, step 1204 includes grouping sample vectors x based on an operating state during which the sample vectors x were collected. For example, step 1204 can include grouping sample vectors x collected during a first operating state (e.g., state 1) into a first sample matrix $X_1$, and grouping the sample vectors x collected during a second operating state (e.g., state 2) into a second sample matrix $X_2$. Each of the sample matrices X can include values of the monitored variables that represent a particular operating state. During a training period, the operating states associated with each of the sample vectors x can be specified by a user or indicated by another data source.

Process 1200 is shown to include calculating a mean b and standard deviation V from the matrix X (step 1206). In some embodiments, step 1206 is performed by data scaler 1120, as described with reference to FIG. 11. The mean b of a set of sample vectors x can be calculated using the following equation:

$$b = \frac{1}{m} \sum_{i=1}^{m} x_i = \frac{1}{m} X^T 1_m$$

where $x_i$ represents the ith sample vector x for a particular operating state, $1_m$ is a vector of size m whose elements are all $1_m$ (i.e., $=[1\ 1\ \ldots\ 1]$), and $X^T$ is the transpose of the sample matrix X generated in step 1204.

The standard deviation V can be calculated from the covariance matrix S of the sample matrix X generated in step 1204. For example, step 1206 can include calculating the covariance matrix S using the following equation:

$$S = \frac{1}{m} \sum_{i=1}^{m} (x_i - b)(x_i - b)^T$$

$$S = \frac{1}{m} (X - 1_m b^T)(X - 1_m b^T)^T$$

$$S = \frac{1}{m} (X^T X - mbb^T)$$

The standard deviation V may then be calculated by taking the square root of the diagonal matrix that contains the diagonal elements of the covariance matrix S, as shown in the following equation:

$$V = \sqrt{\mathrm{diag}(S)}$$

Still referring to FIG. 12, process 1200 is shown to include generating a scaled sample matrix $\overline{X}$ (step 1208), a scaled product matrix $\overline{X}^T \overline{X}$ (step 1210), and a scaled covariance matrix $\overline{S}$ (step 1212). Step 1208 can include using the mean b and standard deviation V calculated in step 1206 to scale the sample matrix X generated in step 1204. For example, step 1208 can include scaling the sample matrix X using the following equation:

$$\overline{X} = (X - 1 b^T) V^{-1}$$

Step 1210 can include using the mean b and standard deviation V calculated in step 1206 to calculate the scaled product matrix $\overline{X}^T \overline{X}$ according to the following equation:

$$\overline{X}^T \overline{X} = V^{-1} (X^T X - mbb^T) V^{-1}$$

Step 1212 can include scale the covariance matrix S calculated in step 1206 using the following equation:

$$\overline{S} = \frac{1}{m}\overline{X}^T\overline{X}$$

$$\overline{S} = \frac{1}{m}V^{-1}(X^TX - mbb^T)V^{-1}$$

$$\overline{S} = V^{-1}SV^{-1}$$

Still referring to FIG. 12, process 1200 is shown to include using the scaled covariance matrix $\overline{S}$ to generate model parameters for the PCA model (step 1214). In some embodiments, step 1214 is performed by PCA modeler 1128, as described with reference to FIG. 11. Step 1214 can include performing singular value decomposition (SVD) on the scaled covariance matrices $\overline{S}$ generated in step 1212. SVD is a statistical technique in which a factorization of the form $\overline{S}=UDU^T$ is obtained from a real or complex matrix (i.e., the scaled covariance matrix $\overline{S}$). Step 1214 can include factoring the scaled covariance matriz $\overline{S}$ as shown in the following equation:

$$\overline{S} = UDU^T$$

$$\overline{S} = [P \ \tilde{P}]\begin{bmatrix}\Lambda & 0 \\ 0 & \tilde{\Lambda}\end{bmatrix}[P \ \tilde{P}]^T$$

$$\overline{S} = P\Lambda P^T + \tilde{P}\tilde{\Lambda}\tilde{P}^T$$

where the matrix P represents the loadings of the PCA model and consists of the first l singular vectors in U that correspond to the largest l singular values in D. These singular values are represented in $\Lambda$. The residuals of the singular values are stored in $\tilde{\Lambda}$ and the residuals of the vectors are stored in $\tilde{P}$. In some embodiments, the singular values $\Lambda$ and $\tilde{\Lambda}$ and the vectors P and $\tilde{P}$ are the model parameters generated in step 1214.

In some embodiments, step 1214 uses only the scaled covariance matrix $\overline{S}$ for a given state to generate the model parameters for the corresponding PCA model. Advantageously, this allows process 1200 to generate the model parameters without requiring the sample data (i.e., the sample vectors x and/or the sample matrices X) to be stored or maintained in memory once the scaled covariance matrix $\overline{S}$ is generated. For example, in some embodiments, process 1200 includes deleting or discarding the original sample data once the scaled covariance matrix $\overline{S}$ is generated. The PCA models can be used to reconstruct the original scaled covariance matrices $\overline{S}$. If the means b and standard deviations V of the sample data are known, the original covariance matrices S can also be reconstructed.

Process 1200 is shown to include generating a matrix of a detection index M and a control limit $\zeta^2$ (step 1216). In some embodiments, step 1216 is performed by sample indexer 1122, as described with reference to FIG. 11. The matrix M can be a function of the model parameters generated in step 1214. For example, step 1216 can include calculating the matrix M using the following equation:

$$M = \frac{P\Lambda^{-1}P^T}{\tau^2} + \frac{\tilde{P}\tilde{P}^T}{\delta^2}$$

where P, $\Lambda$, and $\tilde{P}$ are the model parameters generated in step 1214. The parameters $\tau^2$ and $\delta^2$ can be control limits of the Hotelling's $T^2$ statistic and the squared prediction error (SPE), respectively. Step 1216 can include calculating $\tau^2$ using the following equation:

$$\tau^2 = \chi_\alpha^2(l)$$

where the term $\chi_\alpha^2(l)$ represents the inverse value of a chi square distribution with l degrees of freedom and a confidence level of $(1-\alpha)\times 100\%$. Step 1216 can include calculating the control limit $\delta^2$ using the following equation:

$$\delta^2 = g_s\chi_\alpha^2(h_s)$$

where $$g_s = \frac{\omega_2}{\omega_1}, \ h_s = \frac{\omega_1^2}{\omega_2}, \ \omega_1 = \sum_{i=l+1}^n \lambda_i, \text{ and } \omega_2 = \sum_{i=l+1}^n \lambda_i^2.$$

The parameter $\lambda_i$ can be the ith singular value of the scaled covariance matrix $\overline{S}$ for the operating state.

The control limit $\zeta^2$ may also be a function of the model parameters generated in step 1214. In some embodiments, step 1216 includes calculating the control limit $\zeta^2$ using the following equation:

$$\zeta^2 = g_z\chi_\alpha^2(h_z)$$

where $g_z$ and $h_z$ are defined as follows:

$$g_z = \frac{tr\{\overline{S}M\}^2}{tr\{\overline{S}M\}},$$

$$h_z = \frac{[tr\{\overline{S}M\}]^2}{tr\{\overline{S}M\}^2}$$

and the term tr{ } denotes the trace operator. The trace operator tr{ } can be defined as the sum of the elements along the main diagonal (i.e., from upper left to bottom right) of the matrix within the brackets (i.e., the product matrix $\overline{S}M$).

Still referring to FIG. 12, process 1200 is shown to include removing outliers and updating the sample matrix X (step 1218). Step 1218 can include scaling each of the samples x in the sample matrix X and calculating an index of each scaled sample. Samples x can be scaled using the mean b and standard deviation V calculated in step 1206. For example, step 1218 can include scaling a sample vector x using the following equation:

$$\overline{x} = V^{-1}(x-b)$$

In some embodiments, the sample indices are calculated from the scaled samples $\overline{x}$ as described with reference to sample indexer 1122. For example, step 1218 can include using the scaled sample vectors $\overline{x}$ to generate fault detection indices according to the following equation:

$$I(x) = \overline{x}^T M \overline{x}$$

where I(x) is the fault detection index, $\overline{x}$ is the scaled sample vector $\overline{x}$ and M is the matrix generated in step 1216.

Step 1218 can include comparing the index I(x) of each scaled sample with the control limit $\zeta^2$ calculated in step 1216. If the index for a particular sample x is greater than the control limit (i.e., I(x)>$\zeta^2$), step 1218 can include determining that the sample x is an outlier. If the index for a particular sample x is not greater than the control limit (i.e., $I(x) \leq \zeta^2$), step 1218 can include determining that the sample x is not an outlier.

Process 1200 is shown to include determining whether any outliers have been detected (step 1220). If any outliers are detected, the outlier samples can be removed from the sample matrix X. Steps 1206-1220 may then be repeated using the updated sample matrix X. For example, the updated sample matrix X can be used to calculate an updated mean b and standard deviation V, an updated product matrix $\overline{X}^T\overline{X}$, an updated scaled covariance matrix $\overline{S}$, updated model parameters $\Lambda$ and $\tilde{\Lambda}$ and the vectors P and $\tilde{P}$, an updated matrix M, and an updated control limit $\zeta^2$. Steps 1206-1220 can be repeated until no outliers are detected in step 1220.

Process 1200 is shown to include saving the model for state k in a library (step 1222). Step 1222 can be performed in response to a determination in step 1220 that no outliers are detected. Step 1222 can include storing some or all of the variables and/or parameters generated during process 1200 in the library. For example, step 1222 can include storing the sample matrix X, the mean b and standard deviation V, the product matrix $\overline{X}^T\overline{X}$, the scaled covariance matrix $\overline{S}$, the model parameters $\Lambda$ and $\tilde{\Lambda}$ and the vectors P and $\tilde{P}$, the matrix M, and/or the control limit $\zeta^2$. The model can be stored with an indication of a particular operating state.

State Identification

Figure 13:
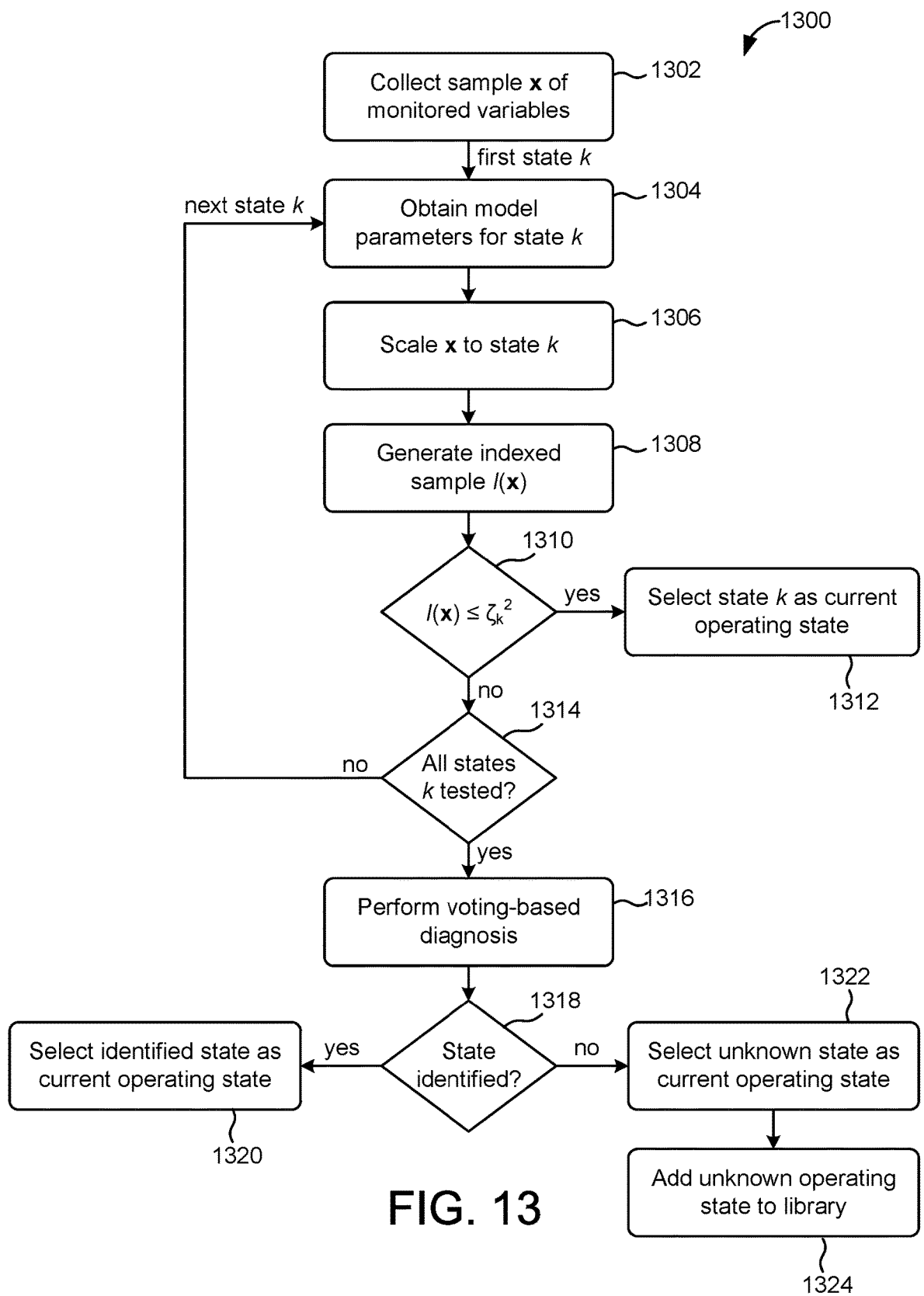
FIG. 13 is a flow diagram of a technique which can be used by the predictive diagnostics system to identify an operating state associated with a sample of one or more monitored variables, according to some embodiments.

Referring now to FIG. 13, a flowchart of a process 1300 for identifying an operating state associated with a sample x of one or more monitored variables is shown, according to some embodiments. Process 1300 can be performed by predictive diagnostics system 502 and/or various components thereof. In some embodiments, process 1300 is performed each time a new sample x is received to determine an operating state associated with the sample x.

Process 1300 is shown to include collecting a sample x of monitored variables (step 1302). In some embodiments, step 1302 is performed by variable monitor 1118, as described with reference to FIG. 11. The monitored variables may indicate the performance of a monitored system, device, or process. For example, the monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1202 can include organizing samples of the n time-series variables in a sample vector x, where $x \in \mathfrak{R}^n$. The values of the monitored variables in a sample vector x can be recorded or collected at the same time (e.g., measurements of the monitored variables at a particular time).

Still referring to FIG. 13, process 1300 is shown to include obtaining model parameters for a first operating state k (step 1304). Operating state k can be any of the operating states for which a model is stored in the library. Models for various operating states can be generated and stored using process 1200, as described with reference to FIG. 12. Step 1304 can include accessing the library of stored models and retrieving the model parameters associated with the model. The model parameters retrieved in step 1304 can include, for example, the mean $b_k$, the standard deviation $V_k$, the scaled covariance matrix $\overline{S}_k$, the model parameters $\Lambda_k$ and $\tilde{\Lambda}_k$, the vectors $P_k$ and $\tilde{P}_k$, the matrix $M_k$, and/or the control limit $\zeta_k^2$. All of these parameters are given with the subscript k indicating that they describe the PCA model generated for state k.

Process 1300 is shown to include scaling the sample x to state k (step 1306) and generating a sample index I(x) (step 1308). Step 1306 can include scaling the sample x using the following equation:

$$\overline{x}_k = V_k^{-1}(x - b_k)$$

where $\overline{x}_k$ is the sample vector x scaled to state k. Step 1308 can include using the scaled sample vector $\overline{x}_k$ to generate a fault detection index according to the following equation:

$$I(x) = x^T M x$$

where I(x) is the fault detection index, x is the scaled sample $\overline{x}_k$ and M is the matrix $M_k$ retrieved as a parameter of the model for state k.

Still referring to FIG. 13, process 1300 is shown to include comparing the fault detection index I(x) to the control limit $\zeta_k^2$ for state k (step 1310). If the index I(x) for a particular scaled sample $\overline{x}_k$ is within the control limit for operating state k (i.e., $I(x) \leq \zeta_k^2$), process 1300 can include selecting state k as the current operating state (step 1312). However, if the index I(x) of the scaled sample $\overline{x}_k$ is not within the control limit for operating state k (i.e., $I(x) > \zeta_k^2$), process 1300 may determine that state k is not the current operating state and proceed to step 1314.

Process 1300 is shown to include determining whether all of the stored operating states k have been tested (step 1314). Testing a stored operating state k can include performing steps 1304-1312 with respect to the operating state k. Steps 1304-1312 can be repeated until each of the stored operating states k have been tested. In other words, steps 1304-1312 can be repeated for each operating state k to determine whether any of the stored states k are the current operating state. If all of the stored operating states k have been tested without identifying any of them as the current operating state (i.e., the result of step 1314 is "yes"), process 1300 may proceed the voting-based diagnosis (step 1316). The voting-based diagnosis can be performed by fault diagnoser 1138 and is described in greater detail with reference to FIG. 14.

Process 1300 is shown to include determining whether the voting-based diagnosis has identified any of the stored operating states as the current operating state (step 1318). If the voting-based diagnosis successfully identifies a stored operating state (i.e., the result of step 1318 is "yes"), process 1300 may select the identified state as the current operating state (step 1320). However, if the voting-based diagnosis does not successfully identify a stored operating state (i.e., the result of step 1318 is "no"), process 1300 may select an unknown state as the current operating state (step 1322). If an unknown state is selected as the current operating state, the unknown operating state can be added to the library of operating states (step 1324). Step 1324 can include performing some or all of the steps of process 1200 to generate a PCA model for the unknown operating state.

Voting-Based State Identification

Figure 14:
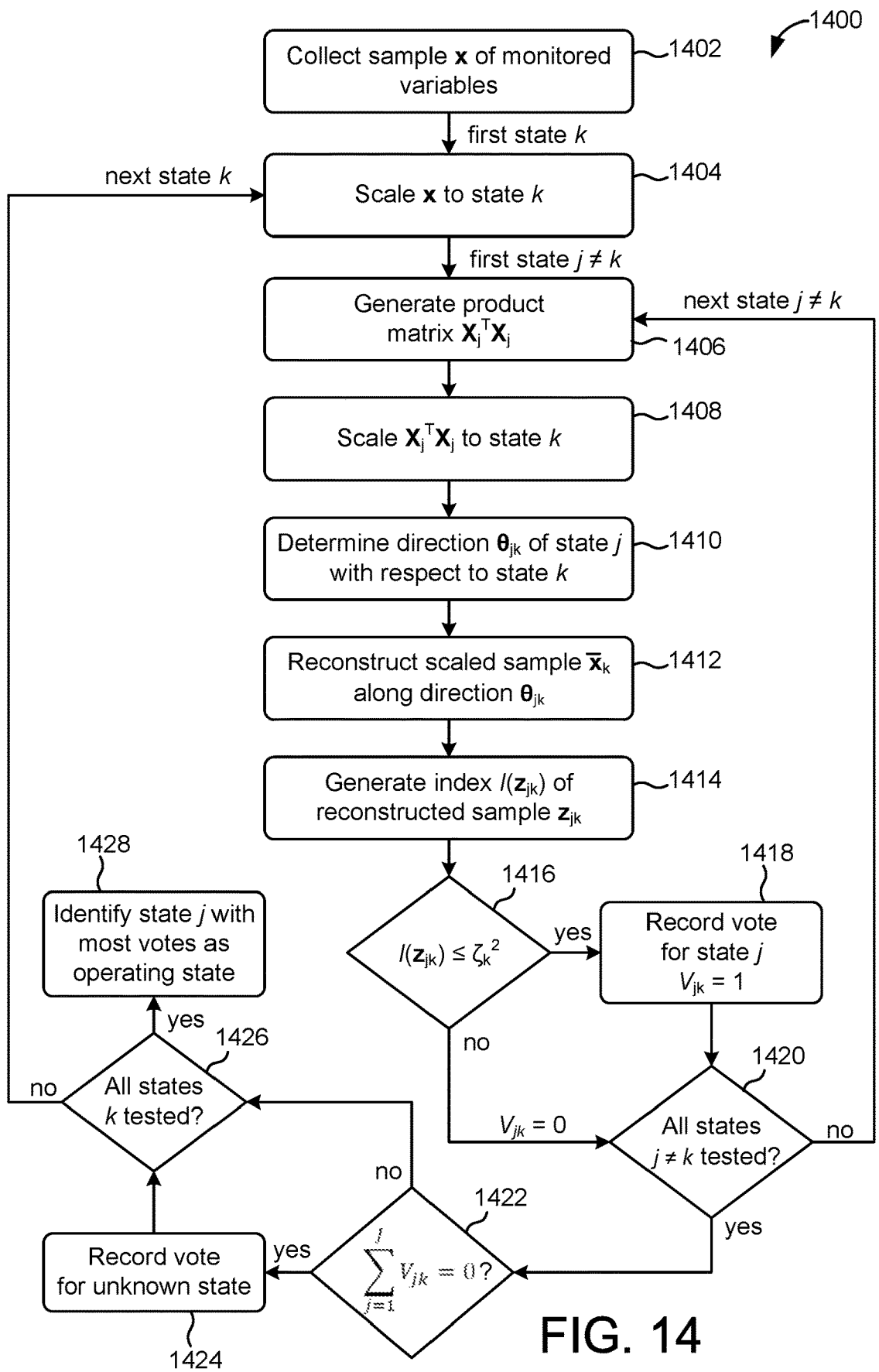
FIG. 14 is a flow diagram of a voting-based state identification technique which can be used by the predictive diagnostics system to identify an operating state associated with a sample of one or more monitored variables, according to some embodiments.

Referring now to FIG. 14, a flowchart of a voting-based state identification process 1400 is shown, according to some embodiments. Process 1400 can be performed by predictive diagnostics system 502 and/or various components thereof to identify an operating state associated with a sample x of the monitored variables. In some embodiments, process 1400 is performed when steps 1304-1312 of process 1300 fail to identify any of the stored states as the current operating state. Process 1400 can be used to accomplish step 1316 of process 1300.

Process 1400 is shown to include collecting a sample x of monitored variables (step 1402). In some embodiments, step 1402 is performed by variable monitor 1118, as described with reference to FIG. 11. The monitored variables may indicate the performance of a monitored system, device, or process. For example, the monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1202 can include organizing samples of the n time-series variables in a sample vector x, where $x \in \Re^n$. The values of the monitored variables in a sample vector x can be recorded or collected at the same time (e.g., measurements of the monitored variables at a particular time).

Process 1400 is shown to include scaling the sample x to state k (step 1404). State k can be any of the operating states for which a model is stored in the library. Models for various operating states can be generated and stored using process 1200, as described with reference to FIG. 12. Step 1404 can include scaling the sample x to state k using the following equation:

$$\bar{x}_k = V_k^{-1}(x - b_k)$$

where $V_k$ is the standard deviation for state k, $b_k$ is the mean for state k, and $\bar{x}_k$ is the sample vector x scaled to state k.

Still referring to FIG. 14, process 1400 is shown to include generating a product matrix $\bar{X}_j^T \bar{X}_j$ for another of the operating states j (step 1406). State j can be any of the stored operating states other than state k. Step 1406 can include generating a sample matrix $X_j$ which includes a collection of samples obtained while the monitored system or process was operating in state j. The transpose of the sample matrix $X_j$ can be multiplied by the sample matrix $X_j$ to generate the product matrix $\bar{X}_j^T \bar{X}_j$.

Process 1400 is shown to include scaling the product matrix $\bar{X}_j^T \bar{X}_j$ to state k (step 1408). Step 1408 can include generating a scaled product matrix $\bar{X}_{jk}^T \bar{X}_{jk}$, where the subscript jk indicates that the matrix includes sample data from state j scaled with respect to state k. In some embodiments, the scaled product matrix $\bar{X}_{jk}^T \bar{X}_{jk}$ is generated by scaling the sample matrix $X_j$ to state k using the following equation:

$$\bar{X}_{jk} = (X_j - 1_m b_k^T) V_k^{-1}$$

where $V_k$ is the standard deviation for state k, $b_k$ is the mean for state k, and the matrix $\bar{X}_{jk}$ is the sample matrix $X_j$ scaled with respect to operating state k. The transpose of the scaled sample matrix $\bar{X}_{jk}$ may then be multiplied by the scaled sample matrix $\bar{X}_{jk}$ to calculate the scaled product matrix $\bar{X}_j^T \bar{X}_j$.

In some embodiments, step 1408 includes generating the scaled product matrix $\bar{X}_{jk}^T \bar{X}_{jk}$ using the following equation:

$$\bar{X}_{jk}^T \bar{X}_{jk} = V_k^{-1}(X_j^T - b_k 1_{m_j}^T)(X_j - 1_{m_j} b_k^T) V_k^{-1}$$

$$\bar{X}_{jk}^T \bar{X}_{jk} = (X_j^T X_j + m_j(b_j - b_k)(b_j - b_k)^T - m_j b_j b_j^T) V_k^{-1}$$

where $V_k$ is the standard deviation for state k, $b_k$ is the mean for state k, $b_j$ is the mean for state j, $m_j$ is the number of samples in the sample vector $X_j$, and the vector $1_{m_j}$ is a ones vector of length $m_j$ (i.e., $1_{m_j} = [1_1 \ldots 1_{m_j}]$)

Still referring to FIG. 14, process 1400 is shown to include determining the direction $\theta_{jk}$ of state j with respect to state k (step 1410). In some embodiments, step 1410 is performed by direction extractor 1126, as described with reference to FIG. 11. Determining the direction $\theta_{jk}$ can include performing singular value decomposition (SVD) on the scaled sample matrix $\bar{X}_{jk}$. For example, step 1410 can include factoring the scaled sample matrix $\bar{X}_{jk}$ as shown in the following equation:

$$\bar{X}_{jk} = L_{jk} D_{jk} L_{jk}^T$$

where the matrix $L_{jk}$ consists of n singular vectors $L_{jk} = [I_1 \ I_2 \ldots I_n]$. Step 1410 can include extracting the direction $\theta_{jk}$ from the matrix $L_{jk}$. In some embodiments, step 1410 includes selecting the left or right singular vector in $L_{jk}$ as the direction $\theta_{jk}$ (e.g., $\theta_{jk} = [I_1]$ or $\theta_{jk} = [I_n]$).

In some embodiments, step 1410 includes selecting the first l singular vectors in $L_{jk}$ as the direction $\theta_{jk}$, where l is the number of singular vectors that brings the fault detection index of all of the reconstructed samples $z_{jk}$ within the control limit $\zeta_k^2$ (e.g., $\theta_{jk} = [I_1 \ I_2 \ldots I_l]$). The reconstructed samples $z_{jk}$ can be generated by sample reconstructor 1136 by reconstructing each of the samples in $\bar{X}_{jk}$ along the direction $\theta_{jk}$ (e.g., by subtracting a multiple of $\theta_{jk}$ from each sample, described in greater detail below). The notation $z_{jk}$ indicates that a sample $x_j$ from state j is scaled with respect to state k and reconstructed along the direction $\theta_{jk}$ of state j from the perspective of state k.

In some embodiments, step 1410 includes augmenting $\theta_{jk}$ with the next singular vector in $L_{jk}$ until the direction $\theta_{jk}$ causes the fault detection indices of all the reconstructed samples $z_{jk}$ to be within the control limit q. For example, step 1410 can include initially selecting $\theta_{jk} = [I_1]$. Step 1410 can include reconstructing all of the samples $\bar{X}_{jk}$ along the direction $\theta_{jk} = [I_1]$ to generate reconstructed samples $z_{jk}$. Step 1410 can include calculating fault detection indices $I(z_{jk})$ of the reconstructed samples $z_{jk}$, which can be compared with the control limit $\zeta_k^2$. If the fault detection indices $I(z_{jk})$ of all the reconstructed samples are within the control limit $\zeta_k^2$, step 1410 can include determining that $\theta_{jk}=[l_1]$. If the fault detection indices $I(z_{jk})$ of all the reconstructed samples are not within the control limit $\zeta_k^2$, step 1410 can include augmenting $\theta_{jk}$ with the next singular vector in $L_{jk}$ (e.g., $\theta_{jk}=[l_1\ l_2]$). This process can be repeated until the fault detection indices of all of the samples $z_{jk}$ reconstructed along direction $\theta_{jk}$ are within the control limit $\zeta_k^2$.

In some embodiments, step 1410 uses a simplified direction extraction process based on the observation that the right singular vectors of $\overline{X}_{jk}$ and $\overline{X}_{jk}^T\overline{X}_{jk}$ are the same. For example, step 1410 can include performing singular value decomposition on the smaller matrix $\overline{X}_{jk}^T\overline{X}_{jk}$ as shown in the following equation:

$$\overline{X}_{jk}^T\overline{X}_{jk}=L_{jk}D_{jk}^2L_{jk}^T$$

where the matrix $L_{jk}$ consists of n singular vectors $L_{jk}=[l_1\ l_2\ ...\ l_n]$. Step 1410 can include extracting the direction $\theta_{jk}$ from the matrix $L_{jk}$ as previously described. For example, step 1410 can include initially selecting $\theta_{jk}=[l_1]$ and iteratively augmenting $\theta_{jk}$ with the next singular vector in $L_{jk}$ (e.g., $\theta_{jk}=[l_1\ l_2]$, $\theta_{jk}=[l_1\ l_2\ l_3]$, etc.) until the direction $\theta_{jk}$ causes the fault detection indices of all the reconstructed samples $z_{jk}$ to be within the control limit $\zeta_k^2$.

In some embodiments, step 1410 uses a further simplified direction extraction process based on the observation that when all of the fault detection indices $I(z_{jk})$ of the reconstructed samples are less than or equal to the control limit q, the sum of all these indices will be less than the control limit $\zeta_k^2$ multiplied by the number of samples m in the scaled sample matrix $\overline{X}_{jk}$. This relationship is shown in the following equation:

$$\sum_{k=1}^{m} x_k^T Q_{jk} x_k \leq m\zeta_k^2$$

where the product $x_k^T Q_{jk} x_k = I(z_{jk})$. Step 1410 can include calculating the matrix $Q_{jk}$ as follows:

$$Q_{jk}=M-M\theta_{jk}(\theta_{jk}^T M\theta_{jk})^{-1}\theta_{jk}^T M$$

where M is calculated based on the model parameters for state k.

Step 1410 can include applying the trace operator to the sum $\Sigma_{k=1}^m x_k^T Q_{jk} x_k$ and simplifying the preceding inequality as follows:

$$tr\left\{\sum_{k=1}^{m} x_k^T Q_{jk} x_k\right\} \leq m\zeta_k^2$$

$$\sum_{k=1}^{m} tr\{x_k^T Q_{jk} x_k\} \leq m\zeta_k^2$$

$$\sum_{k=1}^{m} tr\{Q_{jk} x_k x_k^T\} \leq m\zeta_k^2$$

$$tr\left\{Q_{jk}\sum_{k=1}^{m} x_k x_k^T\right\} \leq m\zeta_k^2$$

$$tr\{Q_{jk}\overline{X}_{jk}^T\overline{X}_{jk}\} \leq m\zeta_k^2$$

$$tr\{Q_{jk}\overline{S}_{jk}\} \leq \zeta_k^2$$

where $\overline{S}_{jk}$ is the covariance of the scaled sample matrix $$\overline{X}_{jk}\ \left(i.e.,\ \overline{S}_{jk}=\frac{1}{m}\overline{X}_{jk}^T\overline{X}_{jk}\right).$$

Advantageously, this formulation allows process 1400 determine the number l of singular vectors in $\theta_{jk}$ using only the trace of the product $Q_{jk}\overline{S}_{jk}$ and the control limit $\zeta_k^2$. For example, step 1410 can include initially selecting $\theta_{jk}=[l_1]$ and iteratively augmenting $\theta_{jk}$ with the next singular vector in $L_{jk}$ (e.g., $\theta_{jk}=[l_1\ l_2]$, $\theta_{jk}=[l_1\ l_2\ l_3]$, etc.) until the direction $\theta_{jk}$ causes the trace of $Q_{jk}\overline{S}_{jk}$ to be within the control limit $\zeta_k^2$ (i.e., $tr\{Q_{jk}\overline{S}_{jk}\}\leq\zeta_k^2$)

Still referring to FIG. 14, process 1400 is shown to include reconstructing the scaled sample $\overline{x}_k$ along the direction $\theta_{jk}$ (step 1412). In some embodiments, step 1412 is performed by sample reconstructor 1136, as described with reference to FIG. 11. Step 1412 can include characterizing samples $\overline{x}_k$ of the monitored variables as having a fault-free part $x_k^*$ and a faulty part f$\theta$ with respect to a particular operating state. For example, each sample can be broken into parts, as shown in the following equation:

$$\overline{x}_k=x_k^*+f\theta$$

where the fault-free part $x_k^*$ is representative of a sample from the operating state (e.g., the mean $b_k$ of state k) and the faulty part consists of a fault magnitude f and a fault direction $\theta$. In some embodiments, step 1412 includes finding the value $f_{jk}$ that minimizes the fault detection index of the reconstructed sample $z_{jk}$, where $z_{jk}$ is defined as follows:

$$z_{jk}=\overline{x}_k-f_{jk}\theta_{jk}$$

Process 1400 is shown to include generating an index $I(z_{jk})$ of the reconstructed sample (step 1414). In some embodiments, step 1414 includes calculating the fault detection index $I(z_{jk})$ using the following equation:

$$I(z_{jk})=\overline{x}_k^T(M-M\theta_{jk}(\theta_{jk}^T M\theta_{jk})^{-1}\theta_{jk}^T M)\overline{x}_k=\overline{x}_k^T Q_{jk}\overline{x}_k$$

where $Q_{jk}=M-M\theta_{jk}(\theta_{jk}^T M\theta_{jk})^{-1}\theta_{jk}^T M$ and M is calculated based on the model parameters for state k.

Still referring to FIG. 14, process 1400 is shown to include comparing the fault detection index $I(z_{jk})$ to the control limit $\zeta_k^2$ for state k (step 1416). If the index $I(z_{jk})$ for a particular sample reconstructed along the direction $\theta_{jk}$ to state j is within the control limit for operating state k (i.e., $I(z_{jk})\leq\zeta_k^2$ and the result of step 1416 is "yes"), process 1400 may record a vote for state j as the current operating state (step 1418). Recording a vote for state j as the current operating state indicates that the direction of the sample x from the perspective of state k is the same or similar to the direction $\theta_{jk}$ of state j from the perspective of state k. Recording a vote for state j as the current operating state can include storing a value $V_{jk}=1$, where k is the identifier of the base state selected in step 1404 and j is the identifier of the potential operating state selected in step 1406.

However, if the index $I(z_{jk})$ of the scaled reconstructed sample is not within the control limit for operating state k (i.e., $I(z_{jk})>\zeta_k^2$ and the result of step 1416 is "no"), process 1400 may record a vote for state j as not the current operating state. Recording a vote for state j as not the current operating state indicates that the direction of the sample x from the perspective of state k is not the same or similar to the direction $\theta_{jk}$ of state j from the perspective of state k. In some embodiments, process 1400 stores a value $V_{jk}=0$ when a vote is recorded for state j as not the current operating state from the perspective of state k. Process 1400 may then proceed to step 1420.

Process 1400 is shown to include determining whether all states j≠k have been tested (step 1420). Step 1420 can include determining whether steps 1406-1418 have been performed for each state j for a given base state k. As previously described, state j can be any of the stored operating states other than state k. If not all states j≠k have been tested (i.e., the result of step 1420 is "no"), process 1400 may return to step 1406 and select the next state j≠k. Steps 1406-1420 can be repeated until each state j has been evaluated for a given base state k. Each iteration of steps 1406-1420 may result in a vote being recorded for one or more of states j from the perspective of state k. The vote can be an affirmative vote for state j (e.g., $V_{jk}=1$) or a non-affirmative vote for state j (e.g., $V_{jk}=0$). Affirmative votes indicate that state j has the same or similar direction as the sample x from the perspective of state k, whereas non-affirmative votes indicate that state j does not have the same or similar direction as the sample x from the perspective of state k. Once all states j≠k have been tested (i.e., the result of step 1420 is "yes"), process 1400 may proceed to step 1422.

Still referring to FIG. 14, process 1400 is shown to include determining whether any affirmative votes have been recorded from the perspective of base state k (step 1422). In some embodiments, step 1422 includes adding all of the votes from the perspective of base state k as shown in the following equation:

$$\sum_{j=1}^{J} V_{jk}$$

where J is the total number of states j other than state k (i.e., one less than the total number of stored states) and $V_{jk}$ is a variable representing the value of the vote for state j from the perspective of state k. $V_{jk}$ may have a value of zero (i.e., $V_{jk}=0$) if state k did not record an affirmative vote for state j, or non-zero if state k did record an affirmative vote for state j (e.g., $V_{jk}=1$). This formulation allows process 1400 to determine whether any of the votes from the perspective of state k were affirmative. In other words, this formulation allows process 1400 to determine whether any of the tested states j have the same or similar direction $\theta_{jk}$ as the sample x from the perspective of state k.

Process 1400 is shown to include recording a vote for an unknown state (step 1424). Step 1424 can be performed in response to a determination in step 1422 that none of the votes from the perspective of state k were affirmative (i.e., $\Sigma_{j=1}^{J} V_{jk}=0$ and the result of step 1422 is "yes"). This situation may occur when none of the stored operating states j have the same or similar direction as the sample x from the perspective of state k. Process 1400 may proceed to step 1426 after recording a vote for an unknown state. If any of the states j received an affirmative vote from the perspective of state k (i.e., $\Sigma_{j=1}^{J} V_{jk} \neq 0$ and the result of step 1422 is "no"), process 1400 may proceed directly to step 1426 without recording a vote for the unknown state.

Still referring to FIG. 14, process 1400 is shown to include determining whether all states k have been tested (step 1426). Step 1426 can include determining whether steps 1404-1424 have been performed for each state k in the library of stored operating states. If not all states k have been tested (i.e., the result of step 1426 is "no"), process 1400 may return to step 1404 and select the next state k. Steps 1404-1426 can be repeated until each state k has been evaluated. Each iteration of steps 1404-1426 may evaluate one or more of the other states j relative to a base state k. In some embodiments, all of the other states j are evaluated relative to each base state k (e.g., recording an affirmative or non-affirmative vote for each state j from the perspective of base state k). In other embodiments, the other states j are evaluated only until an affirmative vote is recorded, at which point process 1400 proceeds directly to step 1426 without evaluating the remaining states j. Once all states k have been tested (i.e., the result of step 1426 is "yes"), process 1400 may proceed to step 1428.

Process 1400 is shown to include identifying the state j with the most votes as the current operating state (step 1428). Step 1428 can include counting the number of votes for each of the stored operating states j and for the unknown state. In some embodiments, step 1428 counts votes using the following counting algorithm:

$$V_j^T = \sum_{k=1}^{N} V_{jk}$$

where $V_j^T$ is a variable representing the cumulative number of votes for state j recorded during all of the iterations of steps 1404-1426. The variable $V_{jk}$ may have a non-zero value (e.g., $V_{jk}=1$) if an affirmative vote was recorded in step 1418 for state j from the perspective of state k, or a zero value (i.e., $V_{jk}=0$) if a non-affirmative vote (or no vote) was recorded state j from the perspective of state k. The summation shown in the previous equation adds all of the votes for state j from the perspectives of each of the N operating states.

In some embodiments, process 1400 includes generating a control signal for building equipment based on the current operating state. The control signal can be generated by a building controller and can be used by the building equipment to affect a variable state or condition within the building (e.g., temperature, humidity, airflow, etc.). The current operating state can be used to select a control algorithm, select control parameters, select an operating mode, or otherwise affect the process by which control signals are generated. For example, a different models can be used to control the building equipment when the building equipment is operating in different states. The current operating state allows the building controller to determine which model to use as a basis for generating the control signals for the building equipment. The control signals can be provided to the building equipment and used to operate the building equipment. Operating the building equipment may affect a variable state or condition in the building (e.g., one or more of the monitored variables)

Advantageously, process 1400 improves the accuracy of the state identification for a given sample x of the monitored variables by allowing each operating state to vote for one or more of the other operating states. Each operating state k may vote for one or more of the other operating states j that have the same or similar direction as the sample x from the perspective of state k. Process 1400 takes advantage of the fact that each of the operating states k has a different perspective in order to provide information from the perspective of one operating state that might not be available from the perspective of another of the operating states. For example, referring again to FIG. 10A, state 1 can be unable to distinguish between samples x within state 3 and samples x within state 5 because both states 3 and 5 have similar directions (i.e., $\theta_2$ and $\theta_4$, respectively) from the perspective of state 1. However, as shown in FIG. 10B, state 4 has a different perspective and can more easily distinguish between states 3 and 5 because states 3 and 5 have significantly different directions (i.e., $\psi_3$ and $\psi_4$, respectively) from the perspective of state 4. In this situation, state 1 might vote for both states 3 and 5. However, state 4 might vote for only state 3. The additional information provided by the perspective of state 4 allows predictive diagnostics system 502 to accurately identify various operating states.

Example Graphs

Figure 15:
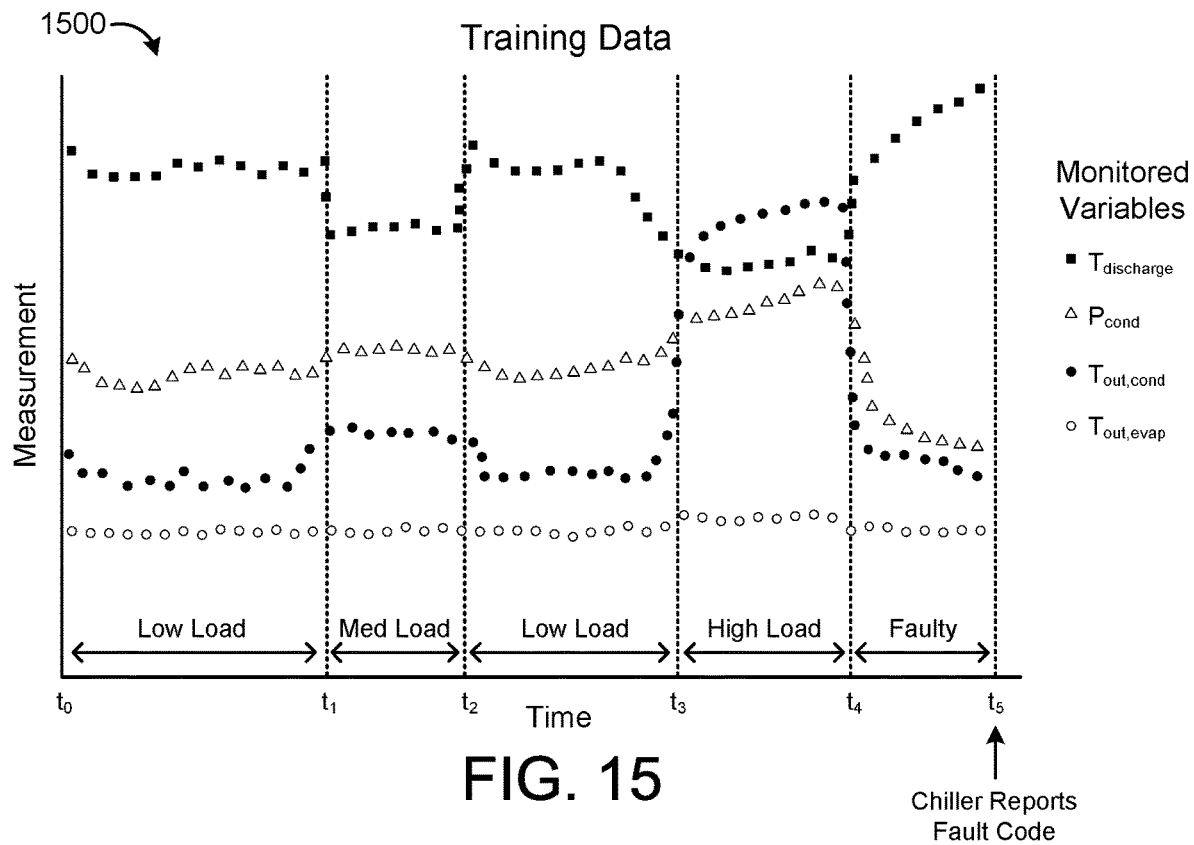
FIG. 15 is a graph of several monitored variables reported by connected equipment to the predictive diagnostics system as a function of time, according to some embodiments.

Referring now to FIGS. 15-19, several graphs illustrating the operation of predictive diagnostics system 502 are shown, according to some embodiments. FIG. 15 is a graph 1500 of several monitored variables reported by connected equipment 610 as a function of time. In graph 1500, the connected equipment 610 is a chiller and the monitored variables are shown to include discharge temperature $T_{discharge}$, condenser pressure $P_{Cond}$, condenser outlet temperature $T_{out,cond}$, and evaporator outlet temperature $T_{evap,out}$. However, it should be understood that the connected equipment 610 can be any type of BMS device and the monitored variables can include any of a variety of variables that characterize the operation of the BMS device. Additionally, although graph 1500 only shows four monitored variables for simplicity, it should be understood that the monitored variables in a chiller can include any of a variety of variables that characterize chiller operation. Several other variables which can be monitored in a chiller are described in greater detail with reference to FIG. 6B.

As shown in graph 1500, the chiller operates in several different operating states (e.g., operating modes) corresponding to different load conditions. Between times $t_0$ and $t_1$, the chiller operates in a low load state corresponding to a low load condition. Between times $t_1$ and $t_2$, the chiller operates in a medium load state corresponding to a medium load condition. Between times $t_2$ and $t_3$, the chiller returns to the low load state. Between times $t_3$ and $t_4$, the chiller operates in a high load state corresponding to a high load condition. The operating state of the chiller can be reported to predictive diagnostics system 502 along with the monitored variables or automatically determined by predictive diagnostics system 502 by analyzing the values of the monitored variables. Predictive diagnostics system 502 can use the data collected from the chiller between times $t_1$ and $t_4$ as training data to construct PCA models for low load state, the medium load state, and the high load state.

At time $t_4$, the chiller begins to exhibit faulty operation. Between times $t_4$ and $t_5$, the chiller is still operating under the high load condition. However, the values of the monitored variables received from the chiller are not characteristic of normal operation under the high load state, but rather characterize a faulty state. At time $t_5$, the chiller reports a fault code and automatically shuts down. Predictive diagnostics system 502 can use the data collected from the chiller between times $t_4$ and $t_5$ as training data to construct a PCA model for the faulty state.

Figure 16:
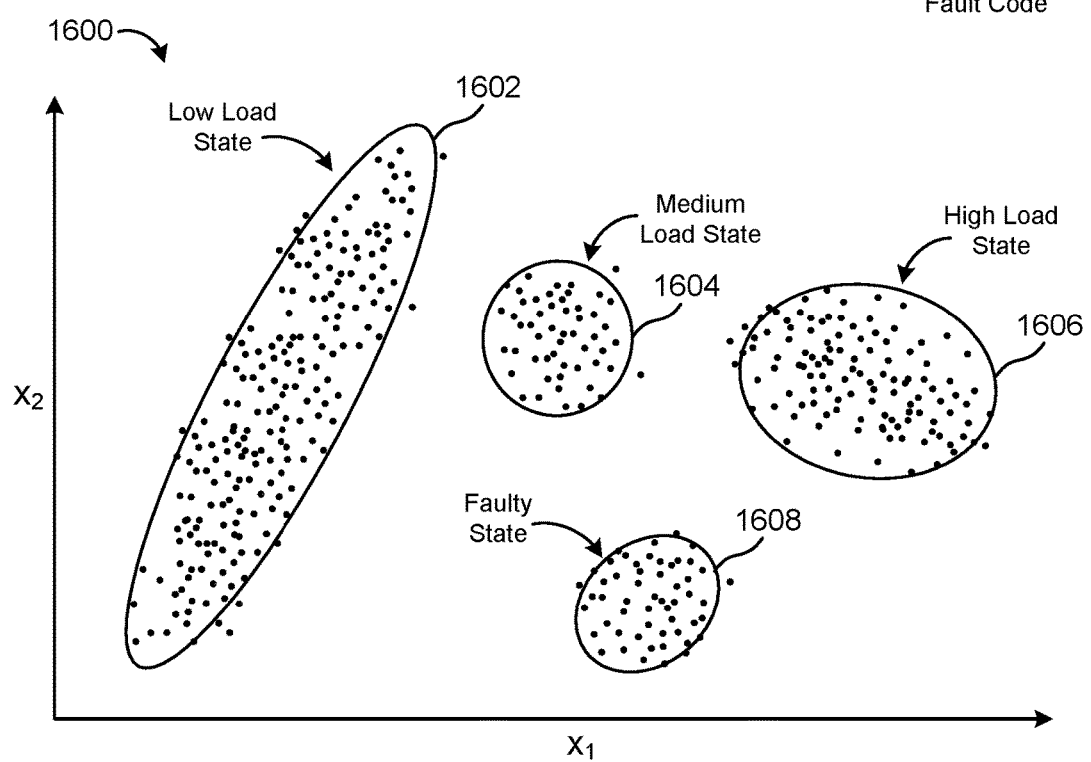
FIG. 16 is a PCA model illustrating several operating states which can be modeled using the monitored variables received from the connected equipment, according to some embodiments.

Referring now to FIG. 16, a PCA model 1600 illustrating the operation of the chiller in several operating states is shown, according to some embodiments. PCA model 1600 captures a correlation between two or more of the monitored variables by transforming the monitored variables into principal components, shown in FIG. 16 as $x_1$ and $x_2$. The first principal component has the largest variance (accounting for the largest variability in the data), whereas the successive principal components have decreasing variances. Each principal component can be constructed as a linear combination of the original monitored variables. Formally, PCA transforms the original coordinate system of the monitored variables into a new coordinate system, where each axis lies along its respective principal component. This produces a mapping between the original coordinate system and the PCA coordinate system.

PCA model 1600 is shown to include a low load state 1602, a medium load state 1604, a high load state 1606, and a faulty state 1608. In two-dimensional space, each operating state 1602-1608 can be conceptualized as an ellipse that spans the principal components $x_1$ and $x_2$. Data points within each ellipse are characteristic of chiller operation during the corresponding operating state. Predictive diagnostics system 502 can automatically generate each ellipse using training data collected from the chiller while operating in the low load state, the medium load state, the high load state, and the faulty state. For example, predictive diagnostics system 502 can use the data from graph 1500 to generate PCA model 1600 and the various operating states thereof, as described with reference to FIG. 11.

Although only two principal components are shown in PCA model 1600, it should be understood that any number of the monitored variables and/or principal components can be modeled by PCA model 1600. For example, if a third principal component is added, each of the operating states 1602-1608 shown in PCA model 1600 can be conceptualized as an ellipsoid in three-dimensional space. In general, PCA model 1600 may have any number of dimensions to accommodate any number of principal components. PCA model 1600 can be represented as a multi-dimensional ellipsoid in multi-dimensional space. Each sample of the monitored variables can be represented by a point in the multi-dimensional space.

Figure 17:
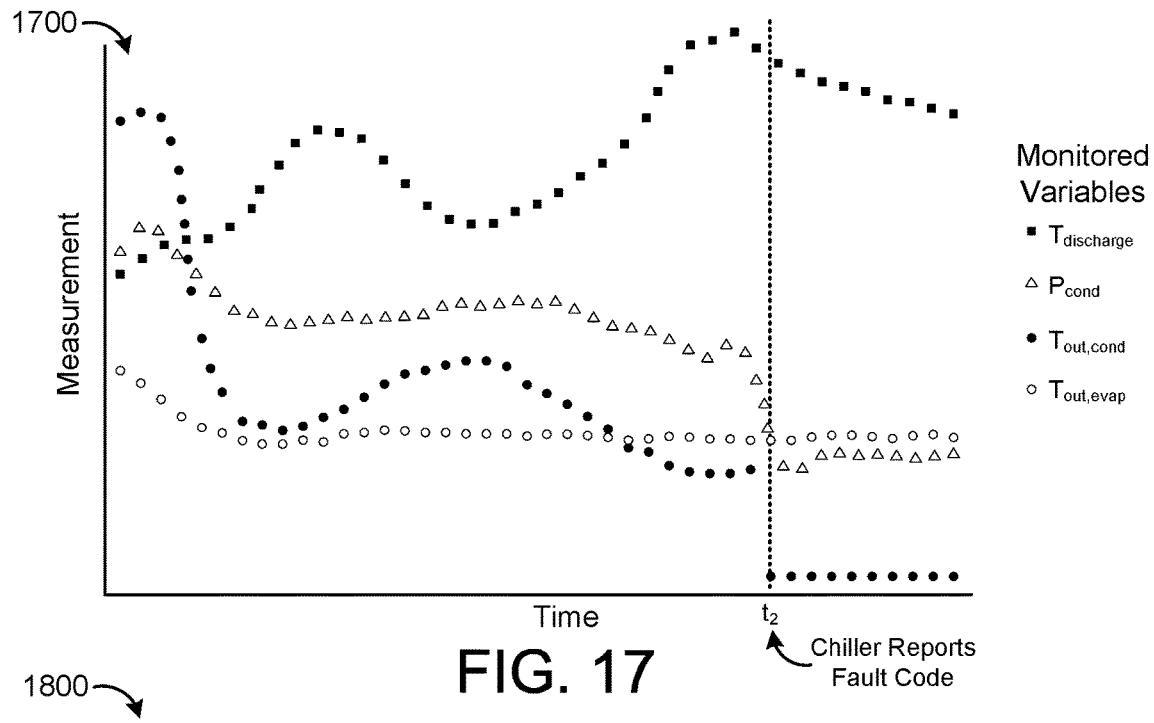
FIG. 17 is another graph of the monitored variables received from the connected equipment as a function of time, according to some embodiments.

Referring now to FIG. 17, another graph 1700 of the monitored variables as a function of time is shown, according to some embodiments. The samples of the monitored variables shown in graph 1700 can be collected periodically and provided to predictive diagnostics system 502. Predictive diagnostics system 502 can use the samples of the monitored variables from graph 1700 in combination with the operating states shown in PCA model 1600 to identify an operating state associated with each sample of the monitored variables (as described with reference to FIGS. 11-14).

Predictive diagnostics system 502 can also use the samples of the monitored variables and the modeled operating states to predict the occurrence of a particular fault. For example, predictive diagnostics system 502 can determine a direction $\theta_{jk}$ in which the samples are moving and/or an operating state j toward which the samples are moving. If the operating state j toward which the samples are moving is a faulty operating state, predictive diagnostics system 502 can predict the occurrence of a fault associated with the faulty state j. Advantageously, the fault can be predicted significantly before the chiller reports a fault code associated with the fault.

Figure 18:
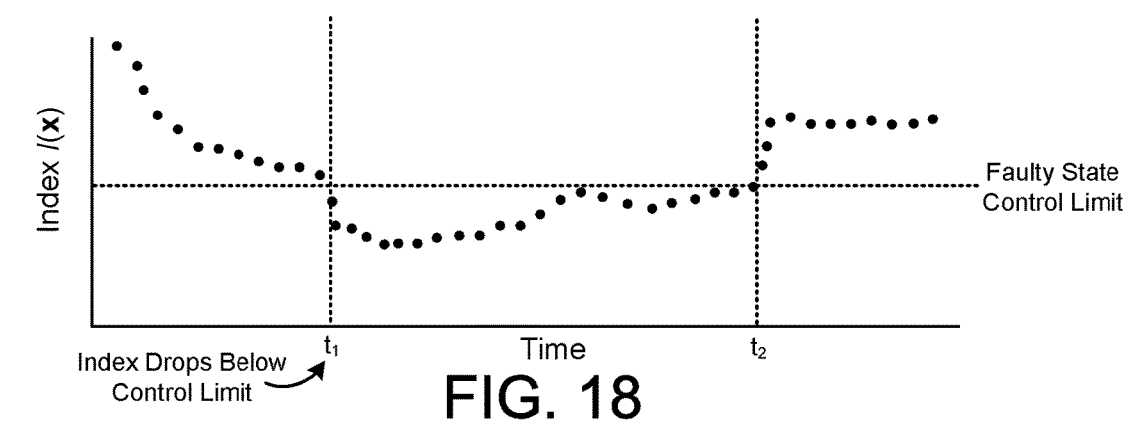
FIG. 18 a graph of an index of the samples of the monitored variables as a function of time, according to some embodiments.

Referring now to FIG. 18, a graph 1800 of the index $I(x)$ of each sample x as a function of time is shown, according to some embodiments. In some embodiments, the index $I(x)$ shown in graph 1800 is the index $I(x)_j$ of each sample x with respect to a particular faulty state j. The fault detection index $I(x)_j$ can be calculated by sample indexer 1122, as described with reference to FIG. 11. In some embodiments, predictive diagnostics system 502 predicts the occurrence of a fault using the fault detection indices $I(x)_j$. For example, predictive diagnostics system 502 can compare the fault detection index $I(x)_j$ to a threshold value. In some embodiments, the threshold value is the control limit $\zeta_j^2$ for faulty state j. If the fault detection index $I(x)_j$ is within the control limit $\zeta_j^2$ (i.e., $I(x)_j \le \zeta_j^2$), predictive diagnostics system 502 can determine that faulty state j is the current operating state and can predict the occurrence of a fault associated with faulty state j.

As shown in FIG. 18, the fault detection index $I(x)_j$ drops below the faulty state control limit $\zeta_j^2$ at time $t_1$, which occurs significantly before the chiller reports the fault code at time $t_2$. Predictive diagnostics system 502 can calculate the fault detection index $I(x)_j$ for each sample x and compare the fault detection indices $I(x)_1$ with the faulty state control limit $\zeta_j^2$. Predictive diagnostics system 502 can predict the occurrence of a fault associated with state j in response to the fault detection index $I(x)_j$ dropping below the faulty state control limit $\zeta_j^2$ (i.e., $I(x)_j \le \zeta_j^2$).

Figure 19:
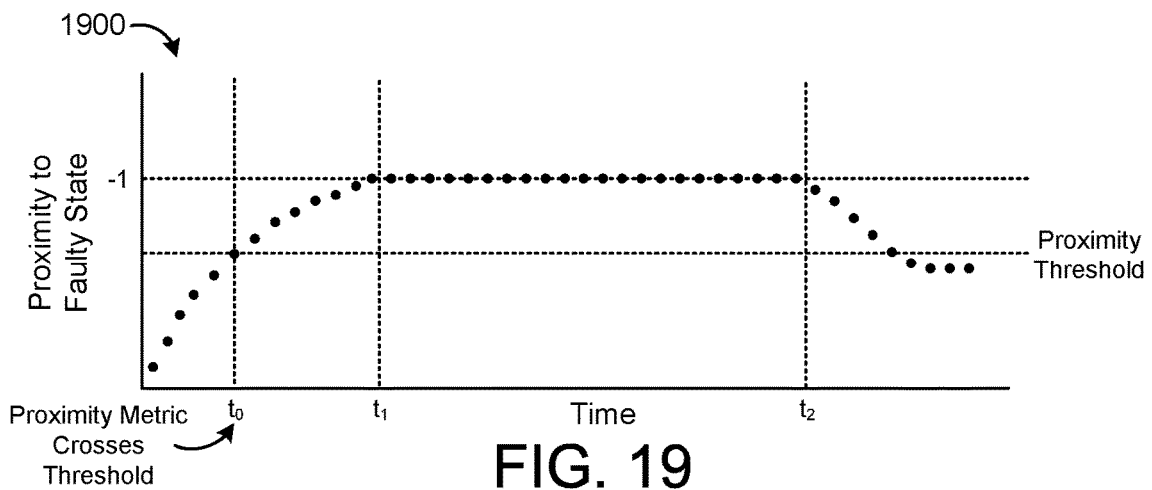
FIG. 19 is a graph of a proximity metric as a function of time which indicates the proximity of the samples of the monitored variables to an identified operating state of the connected equipment, according to some embodiments.

Referring now to FIG. 19, a graph 1900 of the proximity metric $p_j(x)$ as a function of time is shown, according to some embodiments. In some embodiments, the proximity metric $p_j(x)$ shown in graph 1900 is the proximity of each sample x to an identified faulty state j. The values of the proximity metric $p_j(x)$ can be calculated by fault predictor 1146, as described with reference to FIG. 11. In some embodiments, predictive diagnostics system 502 predicts the occurrence of a fault using the proximity metric $p_j(x)$. For example, predictive diagnostics system 502 can compare the proximity metric $p_j(x)$ to a proximity threshold. If the proximity metric $p_j(x)$ is greater than the proximity threshold, predictive diagnostics system 502 can determine that the sample x is proximate to faulty state j and can predict the occurrence of a fault associated with faulty state j.

As shown in FIG. 19, the proximity metric $p_j(x)$ crosses the proximity threshold at time $t_0$, which occurs significantly before the chiller reports the fault code at time $t_2$, and even before the fault detection index $I(x)_j$ drops below the faulty state control limit at time $t_1$. Predictive diagnostics system 502 can calculate the proximity metric $p_j(x)$ for each sample x and compare the proximity metric $p_j(x)$ with the proximity threshold. In some embodiments, the proximity metric $p_j(x)$ is set to a value of $p_j(x)=-1$ if the sample x is determined to be within the faulty state j. Sample x can be determined to be within the faulty state j if the fault detection index $I(x)_j$ is below the faulty state control limit $\zeta_j^2$ (e.g., between times $t_1$ and $t_2$). Predictive diagnostics system 502 can predict the occurrence of a fault associated with state j in response to the proximity metric $p_j(x)$ crossing (e.g., rising above) the proximity threshold.

Fault Prediction

Figure 20:
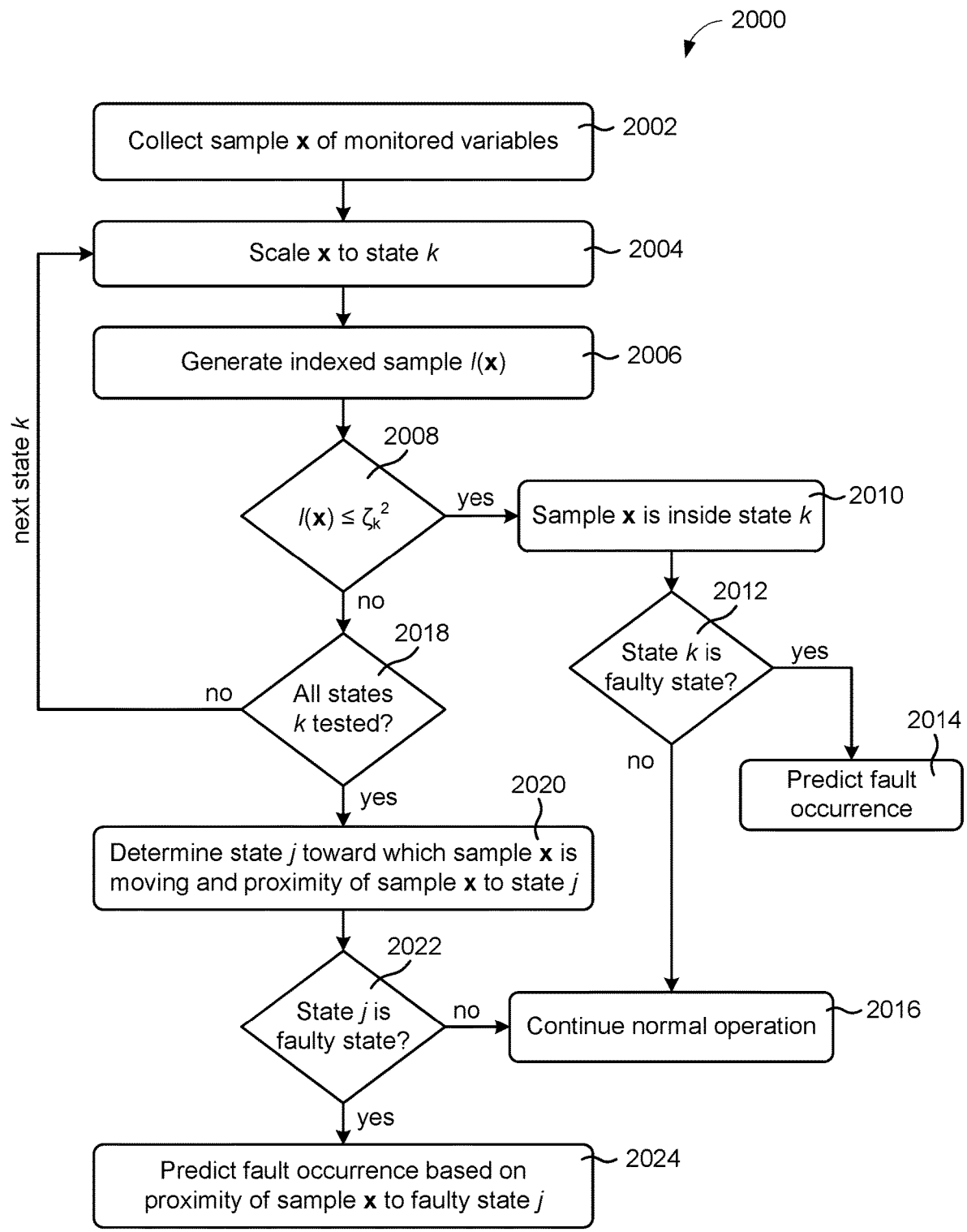
FIG. 20 is a flow diagram of a fault prediction technique which can be used by the predictive diagnostics system to predict fault occurrences, according to some embodiments.

Referring now to FIG. 20, a flowchart of a process 2000 for predicting fault occurrences is shown, according to some embodiments. Process 2000 can be performed by predictive diagnostics system 502 and/or various components thereof to predict faults in connected equipment 610 before the connected equipment 610 report the faults. Process 2000 can be used to determine whether a given sample x is within a faulty state or moving toward a faulty state.

Process 2000 is shown to include collecting a sample x of monitored variables (step 2002). In some embodiments, step 2002 is performed by variable monitor 1118, as described with reference to FIG. 11. The monitored variables may indicate the performance of connected equipment 610 or any other monitored system, device, or process. For example, the monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that characterize the performance of connected equipment 610.

In some embodiments, the monitored variables are received from connected equipment 610 and/or from various devices thereof. For example, the monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 2002 can include organizing samples of the n time-series variables in a sample vector x, where $x \in \mathfrak{R}^n$. The values of the monitored variables in a sample vector x can be recorded or collected at the same time (e.g., measurements of the monitored variables at a particular time).

Process 2000 is shown to include scaling the sample x to state k (step 2004) and generating a sample index $I(x)$ (step 2006). State k can be any of the operating states for which a model is stored in the library of operating states. Models for various operating states can be generated and stored using process 1200, as described with reference to FIG. 12. Step 2004 can include scaling the sample x to state k using the following equation:

$$\bar{x}_k = V_k^{-1}(x - b_k)$$

where $V_k$ is the standard deviation for state k, $b_k$ is the mean for state k, and $\bar{x}_k$ is the sample vector x scaled to state k.

Step 2006 can include using the scaled sample vector $\bar{x}_k$ to generate a fault detection index according to the following equation:

$$I(x) = x^T M x$$

where $I(x)$ is the fault detection index, x is the scaled sample $\bar{x}_k$ and M is the matrix $M_k$ retrieved as a parameter of the model for state k.

Process 2000 is shown to include comparing the fault detection index $I(x)$ to the control limit $\zeta_j^2$ for state k (step 2008). If the index $I(x)$ for a particular scaled sample $\bar{x}_k$ is within the control limit for operating state k (i.e., $I(x) \le \zeta_k^2$), process 2000 may determine that the sample x is inside state k (step 2010). If the sample x is inside state k, process 2000 may determine whether state k is a faulty operating state (step 2012). If state k is a faulty operating state, process 2000 may predict a fault occurrence (step 2014). However, if state k is not a faulty operating state, process 2000 may continue normal operation (step 2016). Returning to step 2008, if the index $I(x)$ of the scaled sample $\bar{x}_k$ is not within the control limit for operating state k (i.e., $I(x) > \zeta_k^2$), process 2000 may determine that the sample x is not inside state k and may proceed to step 2018.

Process 2000 is shown to include determining whether all of the stored operating states k have been tested (step 2018). Testing a stored operating state k can include performing steps 2004-2008 with respect to the operating state k. Steps 2004-2008 can be repeated until each of the stored operating states k have been tested. In other words, steps 2004-2008 can be repeated for each operating state k to determine whether the sample x is inside any of the stored states k. If all of the stored operating states k have been tested without identifying any of them as containing the sample x (i.e., the result of step 2018 is "yes"), process 2000 may proceed to step 2020.

Process 2000 is shown to include determining a state j toward which the sample x is moving and a proximity of the sample x to state j (step 2020). In some embodiments, step 2020 is performed by fault predictor 1146 as described with reference to FIG. 11. In some embodiments, step 2020 is accomplished by performing process 2100, described in greater detail with reference to FIG. 21. Step 2020 can include determining a direction $\theta_{jk}$ of each state j with respect to a current monitoring state k. Step 2020 can include calculating a reconstructed contribution $RBC_{jk}$ of the sample x along each direction $\theta_{jk}$ and identifying the direction with the greatest $RBC_{jk}$ value as the direction the sample x is moving. The state j corresponding to direction $\theta_{jk}$ can be identified as the state toward which the sample x is moving.

The proximity of the sample x to operating state j indicates how close the sample x is to operating state j. In some embodiments, the proximity metric is calculated using the following equation:

$$p_j(x) = -\log(I(x)_j)$$

where $p_j(x)$ is the proximity of sample x to operating state j, and $I(x)_j$ is the fault detection index of the sample x with respect to operating state j. The fault detection index $I(x)_j$ can be calculated by sample indexer 1122 as previously described. The values for the proximity metric $p_j(x)$ range from negative infinity to negative one (i.e., $-\infty \leq p_j(x) \leq -1$). If the sample x is already inside the operating state j, fault predictor 1146 may set the proximity metric $p_j(x)$ equal to negative one. Larger values of the proximity metric $p_j(x)$ indicate that the sample x is closer to the operating state j, whereas smaller values of the proximity metric $p_j(x)$ indicate that the sample x is further from the operating state j.

Process 2000 is shown to include determining whether the state j identified in step 2020 is a faulty state (step 2022). In some embodiments, state j is a faulty state if the PCA model representing state j was constructed using operating data collected while the connected equipment was experiencing faulty operation. For example, state j can be identified as a faulty state if the connected equipment reported a fault shortly after the set of data points used to construct the PCA model for state j was collected. In some embodiments, state j is identified as a faulty operating state using attributes of the PCA model associated with state j. For example, the PCA model for state j may identify state j as a faulty state. If state j is not identified as a faulty state, process 2000 may continue normal operation (step 2016). However, if state j is a faulty operating state, process 2000 may proceed to step 2024.

Process 2000 is shown to include predicting a fault occurrence based on the proximity of the sample x to the faulty state j (step 2024). In some embodiments, step 2024 is performed by fault predictor 1146, as described with reference to FIG. 11. Step 2024 can include predicting a fault occurrence in response to the proximity metric $p_j(x)$ crossing a proximity threshold. In other embodiments, step 2024 can include predicting the occurrence of a fault using the fault detection index $I(x)_j$ of a sample x for the faulty state j. For example, step 2024 can include comparing the fault detection index $I(x)_j$ to a threshold value. In some embodiments, the threshold value is the control limit $\zeta_j^2$ for faulty state j. Step 2024 can include predicting a fault occurrence in response to a determination that the fault detection index $I(x)_j$ is within the control limit $\zeta_j^2$ (i.e., $I(x) \leq \zeta_j^2$).

In some embodiments, step 2024 includes identifying a particular fault associated with the faulty state j. Each faulty state j can be associated with a fault that occurs in a set of training data used to model the faulty state j. For example, predictive diagnostics system 502 may construct a PCA model for the faulty state j using a set of training data collected immediately prior to the connected equipment 610 providing a particular fault code. Predictive diagnostics system 502 can associate the fault code and/or fault identified by the fault code with the operating state j constructed from the set of training data collected prior to the fault code. When process 2000 determines that the samples x are moving toward the faulty state j, the fault associated with faulty state j can be retrieved from memory and identified as a predicted fault.

In some embodiments, step 2024 includes predicting when a particular fault will occur. For example, step 2024 can include extrapolating a series of values of the proximity metric $p_j(x)$ to determine when the proximity metric $p_j(x)$ will cross a threshold value. In some embodiments, the threshold value is the value of the proximity metric $p_j(x)$ at which the fault previously occurred in the training data used to construct the PCA model for the faulty state j. Step 2024 can include predicting that the fault will occur at a time when the proximity metric $p_j(x)$ is estimated to reach the threshold value based on the extrapolation.

In some embodiments, the threshold value is a value of the proximity metric $p_j(x)$ that occurs in the training data before the connected equipment 610 reports the fault. Step 2024 can include using the training data to determine a time interval $\Delta T$ between a time $t_1$ at which the proximity metric $p_j(x)$ crosses the threshold value and a time $t_2$ at which the fault occurs (i.e., $\Delta T = t_2 - t_1$). If the proximity metric $p_j(x)$ crosses the threshold value at a new time $t_3$, step 2024 can include estimating the time $t_4$ at which the fault will occur as the time $t_3$ plus the time interval $\Delta T$ (i.e., fault time $t_4 = t_3 + \Delta T$).

Proximity Determination

Figure 21:
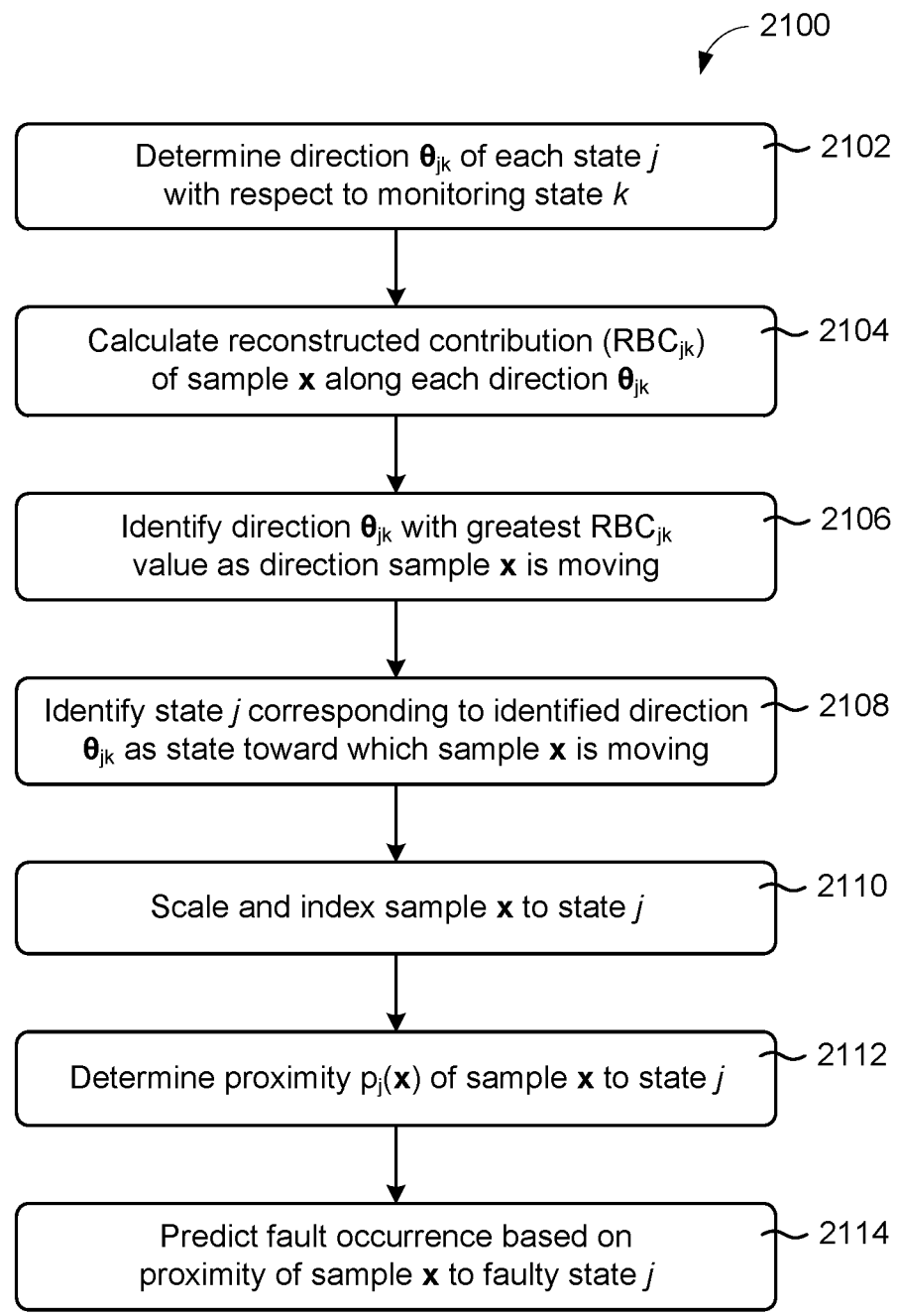
FIG. 21 is a flow diagram, of a proximity determination technique which can be used by the predictive diagnostics system to determine the proximity of a sample of the monitored variables to an identified operating state of the connected equipment, according to some embodiments.

Referring now to FIG. 21, a flowchart of a process 2100 for determining the proximity of a sample x to an identified operating state j is shown, according to some embodiments. Process 2100 can be performed by predictive diagnostics system 502 and/or various components thereof to identify an operating state j toward which a sample x is moving and calculate the proximity of the sample x to the identified operating state. Process 2100 can be performed to accomplish step 2020 of process 2000.

Process 2100 is shown to include determining the direction $\theta_{jk}$ of each state j for which a PCA model has been created with respect to the current monitoring state k (step 2102). In some embodiments, step 2102 is performed by direction extractor 1126, as described with reference to FIG. 11. Determining the direction $\theta_{jk}$ can include performing singular value decomposition (SVD) on the scaled sample matrix $\overline{X}_{jk}$. For example, step 2102 can include factoring the scaled sample matrix $\overline{X}_{jk}$ as shown in the following equation:

$$\overline{X}_{jk} = L_{jk} D_{jk} L_{jk}^T$$

where the matrix $L_{jk}$ consists of n singular vectors $L_{jk} = [l_1 \ l_2 \ldots l_n]$. Step 2102 can include extracting the direction $\theta_{jk}$ from the matrix $L_{jk}$. In some embodiments, step 2102 includes selecting the left or right singular vector in $L_{jk}$ as the direction $\theta_{jk}$ (e.g., $\theta_{jk} = [l_1]$ or $\theta_{jk} = [l_n]$).

In some embodiments, step 2102 includes selecting the first l singular vectors in $L_{jk}$ as the direction $\theta_{jk}$, where l is the number of singular vectors that brings the fault detection index of all of the reconstructed samples $z_{jk}$ within the control limit $\zeta_k^2$ (e.g., $\theta_{jk}=[l_1 \, l_2 \, \ldots \, l_l]$). The reconstructed samples $z_{jk}$ can be generated by sample reconstructor 1136 by reconstructing each of the samples in $\overline{X}_{jk}$ along the direction $\theta_{jk}$ (e.g., by subtracting a multiple of $\theta_{jk}$ from each sample, described in greater detail below). The notation $z_{jk}$ indicates that a sample $x_j$ from state j is scaled with respect to state k and reconstructed along the direction $\theta_{jk}$ of state j from the perspective of state k.

In some embodiments, step 2102 includes augmenting $\theta_{jk}$ with the next singular vector in $L_{jk}$ until the direction $\theta_{jk}$ causes the fault detection indices of all the reconstructed samples $z_{jk}$ to be within the control limit $\zeta_k^2$. For example, step 2102 can include initially selecting $\theta_{jk}=[l_1]$. Step 2102 can include reconstructing all of the samples $\overline{X}_{jk}$ along the direction $\theta_{jk}=[l_1]$ to generate reconstructed samples $z_{jk}$. Step 2102 can include calculating fault detection indices $I(z_{jk})$ of the reconstructed samples $z_{jk}$, which can be compared with the control limit $\zeta_k^2$. If the fault detection indices $I(z_{jk})$ of all the reconstructed samples are within the control limit $\zeta_k^2$, step 2102 can include determining that $\theta_{jk}=[l_1]$. If the fault detection indices $I(z_{jk})$ of all the reconstructed samples are not within the control limit $\zeta_k^2$, step 2102 can include augmenting $\theta_{jk}$ with the next singular vector in $L_{jk}$ (e.g., $\theta_{jk}=[l_1 \, l_2]$). This process can be repeated until the fault detection indices of all of the samples $z_{jk}$ reconstructed along direction $\theta_{jk}$ are within the control limit $\zeta_k^2$.

In some embodiments, step 2102 uses a simplified direction extraction process based on the observation that the right singular vectors of $\overline{X}_{jk}$ and $\overline{X}_{jk}^T \overline{X}_{jk}$ are the same. For example, step 2102 can include performing singular value decomposition on the smaller matrix $\overline{X}_{jk}^T \overline{X}_{jk}$ as shown in the following equation:

$$\overline{X}_{jk}^T \overline{X}_{jk} = L_{jk} D_{jk}^2 L_{jk}^T$$

where the matrix $L_{jk}$ consists of n singular vectors $L_{jk}=[l_1 \, l_2 \, \ldots \, l_n]$. Step 2102 can include extracting the direction $\theta_{jk}$ from the matrix $L_{jk}$ as previously described. For example, step 2102 can include initially selecting $\theta_{jk}=[l_1]$ and iteratively augmenting $\theta_{jk}$ with the next singular vector in $L_{jk}$ (e.g., $\theta_{jk}=[l_1 \, l_2]$, $\theta_{jk}=[l_1 \, l_2 \, l_3]$, etc.) until the direction $\theta_{jk}$ causes the fault detection indices of all the reconstructed samples $z_{jk}$ to be within the control limit $\zeta_k^2$.

In some embodiments, step 2102 uses a further simplified direction extraction process based on the observation that when all of the fault detection indices $I(z_{jk})$ of the reconstructed samples are less than or equal to the control limit $\zeta_k^2$, the sum of all these indices will be less than the control limit $\zeta_k^2$ multiplied by the number of samples m in the scaled sample matrix $\overline{X}_{jk}$. This relationship is shown in the following equation:

$$\sum_{k=1}^{m} x_k^T Q_{jk} x_k \leq m\zeta_k^2$$

where the product $x_k^T Q_{jk} x_k = I(z_{jk})$. Step 2102 can include calculating the matrix $Q_{jk}$ as follows:

$$Q_{jk} = M - M\theta_{jk}(\theta_{jk}^T M \theta_{jk})^{-1} \theta_{jk}^T M$$

where M is calculated based on the model parameters for state k.

Step 2102 can include applying the trace operator to the sum $\sum_{k=1}^{m} x_k^T Q_{jk} x_k$ and simplifying the preceding inequality as follows:

$$tr\left\{\sum_{k=1}^{m} x_k^T Q_{jk} x_k\right\} \leq m\zeta_k^2$$

$$\sum_{k=1}^{m} tr\{x_k^T Q_{jk} x_k\} \leq m\zeta_k^2$$

$$\sum_{k=1}^{m} tr\{Q_{jk} x_k x_k^T\} \leq m\zeta_k^2$$

$$tr\left\{Q_{jk} \sum_{k=1}^{m} x_k x_k^T\right\} \leq m\zeta_k^2$$

$$tr\{Q_{jk} \overline{X}_{jk}^T \overline{X}_{jk}\} \leq m\zeta_k^2$$

$$tr\{Q_{jk} \overline{S}_{jk}\} \leq \zeta_k^2$$

where $\overline{S}_{jk}$ is the covariance of the scaled sample matrix $\overline{X}_{jk}$ $$\left(\text{i.e., } \overline{S}_{jk} = \frac{1}{m} \overline{X}_{jk}^T \overline{X}_{jk}\right).$$

Advantageously, this formulation allows process 2100 to determine the number l of singular vectors in $\theta_{jk}$ using only the trace of the product $Q_{jk}\overline{S}_{jk}$ and the control limit $\zeta_k^2$. For example, step 2102 can include initially selecting $\theta_{jk}=[l_1]$ and iteratively augmenting $\theta_{jk}$ with the next singular vector in $L_{jk}$ (e.g., $\theta_{jk}=[l_1 \, l_2]$, $\theta_{jk}=[l_1 \, l_2 \, l_3]$, etc.) until the direction $\theta_{jk}$ causes the trace of $Q_{jk} \overline{S}_{jk}$ to be within the control limit $\zeta_k^2$ (i.e., $tr\{Q_{jk}\overline{S}_{jk}\} \leq \zeta_k^2$).

Still referring to FIG. 21, process 2100 is shown to include calculating a reconstructed contribution $RBC_{jk}$ of sample x along each direction $\theta_{jk}$ (step 2104). In some embodiments, step 2104 is performed by sample reconstructor 1136, as described with reference to FIG. 11. For example, step 2104 can include calculating the reconstructed contribution of the sample x using the following equation:

$$RBC_{jk} = x^T M \theta_{jk} (\theta_{jk}^T M \theta_{jk})^{-1} \theta_{jk}^T Mx$$

where $RBC_{jk}$ is the reconstruction-based contribution (RBC) of the sample x along the direction $\theta_{jk}$ and M is a matrix of the detection index for a particular operating state (described in greater detail with reference to sample indexer 1122).

Process 2100 is shown to include identifying the direction $\theta_{jk}$ with the greatest $RBC_{jk}$ value as the direction the sample x is moving (step 2106) and identifying the state j corresponding to the identified direction $\theta_{jk}$ as the state toward which the sample x is moving (step 2108). The direction $\theta_{jk}$ with the largest RBC value indicates that the sample x is moving in that direction. In some embodiments, step 2106 includes comparing the RBC values $RBC_{jk}$ calculated for each direction $\theta_{jk}$ ($j \in \Re^{N-1}$) with respect to the current monitoring state k and identifying the direction $\theta_{jk}$ with the largest RBC value $RBC_{jk}$. Step 2108 can include selecting the operating state j corresponding to the direction $\theta_{jk}$ as the operating state toward which sample x is moving.

In some embodiments, step 2104 includes calculating a set of RBC values $RBC_{jk}$ ($j \in \Re^{N-1}$) for multiple consecutive samples of the monitored variables. If the same direction $\theta_{jk}$ has the largest RBC value for multiple consecutive samples, steps 2106-2108 can include identifying the direction $\theta_{jk}$ as the direction the sample x is moving and selecting the operating state j corresponding to the direction $\theta_{jk}$ as the operating state toward which sample x is moving.

Still referring to FIG. 21, process 2100 is shown to include scaling and indexing the sample x to the identified operating state j (step 2110). In some embodiments, step 2110 is performed by data scaler 1120 and/or sample indexer 1122 as described with reference to FIG. 11. Step 2110 can include scaling the sample x to state j using the following equation:

$$\bar{x}_j = V_j^{-1}(x - b_j)$$

where $V_j$ is the standard deviation for state j, $b_j$ is the mean for state j, and $\bar{x}_j$ is the sample vector x scaled to state j. Step 2110 can include using the scaled sample vector $\bar{x}_j$ to generate a fault detection index according to the following equation:

$$I(x)_j = x^T M x$$

where $I(x)_j$ is the fault detection index, x is the scaled sample $\bar{x}_j$ and M is the matrix $M_j$ retrieved as a parameter of the model for state j.

Process 2100 is shown to include determining the proximity $p_j(x)$ of the sample x to state j (step 2112). The proximity of the sample x to operating state j can be represented by a proximity metric $p_j(x)$ that indicates how close the sample x is to operating state j. In some embodiments, the proximity metric is calculated using the following equation:

$$p_j(x) = -\log(I(x)_j)$$

where $p_j(x)$ is the proximity of sample x to operating state j, and $I(x)_j$ is the fault detection index of the sample x with respect to operating state j calculated in step 2110. The values for the proximity metric $p_j(x)$ range from negative infinity to negative one (i.e., $-\infty \leq p_j(x) \leq -1$). If the sample x is already inside the operating state j, step 2112 may set the proximity metric $p_j(x)$ equal to negative one. Larger values of the proximity metric $p_j(x)$ indicate that the sample x is closer to the operating state j, whereas smaller values of the proximity metric $p_j(x)$ indicate that the sample x is further from the operating state j.

Process 2100 is shown to include predicting a fault occurrence based on the proximity of the sample x to the state j (step 2114). In some embodiments, step 2114 is performed by fault predictor 1146, as described with reference to FIG. 11. Step 2114 can include predicting a fault occurrence in response to the proximity metric $p_j(x)$ crossing a proximity threshold. In other embodiments, step 2114 can include predicting the occurrence of a fault using the fault detection index $I(x)_j$ of a sample x for the faulty state j. For example, step 2114 can include comparing the fault detection index $I(x)_j$ to a threshold value. In some embodiments, the threshold value is the control limit for faulty state j. Step 2114 can include predicting a fault occurrence in response to a determination that the fault detection index $I(x)_j$ is within the control limit $\zeta_j^2$ (i.e., $I(x) \leq \zeta_j^2$).

In some embodiments, step 2114 includes identifying a particular fault associated with the faulty state j. Each faulty state j can be associated with a fault that occurs in a set of training data used to model the faulty state j. For example, predictive diagnostics system 502 may construct a PCA model for the faulty state j using a set of training data collected immediately prior to the connected equipment 610 providing a particular fault code. Predictive diagnostics system 502 can associate the fault code and/or fault identified by the fault code with the operating state j constructed from the set of training data collected prior to the fault code. When process 2100 determines that the samples x are moving toward the faulty state j, the fault associated with faulty state j can be retrieved from memory and identified as a predicted fault.

In some embodiments, step 2114 includes predicting when a particular fault will occur. For example, step 2114 can include extrapolating a series of values of the proximity metric $p_j(x)$ to determine when the proximity metric $p_j(x)$ will cross a threshold value. In some embodiments, the threshold value is the value of the proximity metric $p_j(x)$ at which the fault previously occurred in the training data used to construct the PCA model for the faulty state j. Step 2114 can include predicting that the fault will occur at a time when the proximity metric $p_j(x)$ is estimated to reach the threshold value based on the extrapolation.

In some embodiments, the threshold value is a value of the proximity metric $p_j(x)$ that occurs in the training data before the connected equipment 610 reports the fault. Step 2114 can include using the training data to determine a time interval $\Delta T$ between a time $t_1$ at which the proximity metric $p_j(x)$ crosses the threshold value and a time $t_2$ at which the fault occurs (i.e., $\Delta T = t_2 - t_1$). If the proximity metric $p_j(x)$ crosses the threshold value at a new time $t_3$, step 2114 can include estimating the time $t_4$ at which the fault will occur as the time $t_3$ plus the time interval $\Delta T$ (i.e., fault time $t_4 = t_3 + \Delta T$).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
connected equipment configured to measure a plurality of monitored variables; and
a predictive diagnostics system comprising:
a communications interface configured to receive samples of the monitored variables from the connected equipment;
a principal component analysis (PCA) modeler configured to construct PCA models for a plurality of operating states of the connected equipment using the samples of the monitored variables, each PCA model defining a location of one of the operating states in a multidimensional modeling space, the plurality of operating states comprising a plurality of normal operating states and one or more faulty operating states; and
a fault predictor configured to:
identify a current monitoring state of the plurality of normal operating states;
rescale the plurality of operating states to a reference frame having the current monitoring state at an origin from a previous reference frame having a different origin;
determine a direction of movement of a new sample of the monitored variables relative to a previous sample of the monitored variables, the direction of movement determined as a vector in the reference frame having the current monitoring state at the origin;
determine whether the vector points (a) from one of the plurality of normal operating states toward another of the plurality of normal operating states or (b) from one of the plurality of normal operating states toward one of the faulty operating states; and
in response to a determination that the vector points toward one of the faulty operating states, determine whether the new sample is within a threshold proximity of the one of the faulty operating states; and
predict a fault occurrence in response to determining that the vector points from one of the plurality of normal operating states toward one of the faulty operating states; and the new sample is within the threshold proximity of the one of the faulty operating states; and
a controller configured to automatically adjust an operation of the connected equipment based on the predicted fault occurrence.

2. The building management system of claim 1, wherein the fault predictor is configured to:
generate a proximity metric indicating a proximity of the new sample to the faulty operating state by performing a coordinate transformation from the reference frame having the current monitoring state at the origin to a reference frame centered on the one of the faulty operating states and calculating a distance from the new sample to an origin of the reference frame centered on the one of the faulty operating states; and
predict the fault occurrence using a value of the proximity metric.

3. The building management system of claim 2, wherein the fault predictor is configured to:
identify a fault associated with the faulty operating state; and
report the identified fault along with the predicted fault occurrence.

4. The building management system of claim 1, wherein the fault predictor is configured to:
estimate a time of the predicted fault occurrence; and
report the estimated time along with the predicted fault occurrence.

5. The building management system of claim 1, wherein the operating states comprise the current monitoring state and a plurality of other operating states, the building management system further comprising:
a direction extractor configured to use the locations of the operating states in the multidimensional modeling space to extract directions from the current monitoring state to each of the other operating states; and
a sample reconstructor configured to determine a reconstructed contribution of the new sample along each of the extracted directions.

6. The building management system of claim 5, wherein the fault predictor is configured to:
compare the reconstructed contributions of the new sample along each of the extracted directions;
identify which of the reconstructed contributions has a largest value; and
determine that the new sample is moving in the extracted direction along which the reconstructed contribution of the new sample has the largest value.

7. The building management system of claim 5, wherein the fault predictor is configured to identify an operating state toward which the new sample is moving by comparing the reconstructed contributions of the new sample along each of the extracted directions.

8. The building management system of claim 1, wherein each of the PCA models describes a corresponding operating state using a plurality of model parameters comprising:
a mean and standard deviation of a set of training samples associated with the corresponding operating state; and
a control limit for the corresponding operating state.

9. The building management system of claim 1, wherein the PCA modeler is configured to:
automatically identify an operating state associated with each of the samples of the monitored variables;
organize the samples into separate sets, each set corresponding to a different operating state and containing only the samples associated with a corresponding operating state; and
construct each PCA model using one of the sets of samples such that each PCA model is uniquely associated with a single operating state.

10. The building management system of claim 1, wherein the fault predictor is configured to rescale the plurality of operating states to the reference frame having the current monitoring state at the origin by rescaling covariance matrices for the plurality of operating states.

11. A method for predicting fault occurrences and controlling connected equipment in a building management system, the method comprising:

obtaining samples of a plurality of monitored variables from connected equipment of the building management system;

constructing principal component analysis (PCA) models for a plurality of operating states of the connected equipment using the samples of the monitored variables, each PCA model defining a location of one of the operating states in a multidimensional modeling space;

identifying a current monitoring state of the plurality of operating states, the plurality of operating states comprising the current monitoring state and a plurality of other operating states;

rescaling the plurality of operating states to a reference frame having the current monitoring state at an origin from a previous reference frame having a different origin;

obtaining a new sample of the monitored variables from the connected equipment;

using the locations of the plurality of operating states in the multidimensional modeling space to extract directions from the current monitoring state to each of the other operating states in the reference frame having the current monitoring state at the origin;

determining a reconstructed contribution of the new sample along each of the extracted directions;

determining a direction of movement of the new sample as the extracted direction along which the reconstructed contribution of the new sample has a largest value;

determining that the direction of movement points to a faulty operating state;

calculating a proximity metric indicating a proximity of the new sample to the faulty operating state;

determining whether the proximity metric satisfies a threshold;

in response to determining that the proximity metric satisfies the threshold, predicting a fault occurrence; and automatically adjusting an operation of the connected equipment in response to predicting the fault occurrence.

12. The method of claim 11, further comprising:
generating the proximity metric by:
performing a coordinate transformation from the reference frame having the current monitoring state at the origin to a reference frame centered on the faulty operating state; and
calculating a distance from the new sample to the origin of the reference frame centered on the faulty operating state.

13. The method of claim 12, further comprising:
identifying a fault associated with the faulty operating state; and
reporting the identified fault along with the predicted fault occurrence.

14. The method of claim 12, further comprising:
estimating a time of the predicted fault occurrence; and
reporting the estimated time along with the predicted fault occurrence.

15. The method of claim 11, wherein each of the PCA models describes a corresponding operating state using a plurality of model parameters comprising:
a mean and standard deviation of a set of training samples associated with the corresponding operating state; and
a control limit for the corresponding operating state.

16. The method of claim 11, further comprising automatically identifying an operating state associated with each of the samples of the monitored variables;
organizing the samples into separate sets, each set corresponding to a different operating state and containing only the samples associated with a corresponding operating state; and
constructing each PCA model using one of the sets of samples such that each PCA model is uniquely associated with a single operating state.

17. The method of claim 11, wherein rescaling the plurality of operating states to the reference frame having the current monitoring state at the origin comprises rescaling covariance matrices for the plurality of other operating states.

* * * * *